Oct. 5, 1926.

C. E. BEACH

REPEATER

Filed Feb. 28, 1921  14 Sheets-Sheet 1

1,602,065

INVENTOR
C. E. Beach

Oct. 5, 1926.

C. E. BEACH 1,602,065

REPEATER

Filed Feb. 28, 1921      14 Sheets-Sheet 2

INVENTOR
C. E. Beach

Oct. 5, 1926.

C. E. BEACH 1,602,065

REPEATER

Filed Feb. 28, 1921

INVENTOR
C. E. Beach

Oct. 5, 1926.

C. E. BEACH

REPEATER

Filed Feb. 28, 1921

INVENTOR
C. E. Beach,

Oct. 5, 1926.

C. E. BEACH 1,602,065

REPEATER

Filed Feb. 28, 1921    14 Sheets-Sheet 9

INVENTOR
C. E. Beach

Oct. 5, 1926.

C. E. BEACH 1,602,065

REPEATER

Filed Feb. 28, 1921

INVENTOR
C. E. Beach,

Oct. 5, 1926.

C. E. BEACH 1,602,065

REPEATER

Filed Feb. 28, 1921

INVENTOR
C. E. Beach

Oct. 5, 1926.

C. E. BEACH 1,602,065

REPEATER

Filed Feb. 28, 1921    14 Sheets-Sheet 14

INVENTOR
C. E. Beach,

Patented Oct. 5, 1926.

1,602,065

UNITED STATES PATENT OFFICE.

CLARENCE E. BEACH, OF BINGHAMTON, NEW YORK, ASSIGNOR TO THE GAMEWELL COMPANY, OF NEWTON, MASSACHUSETTS, A CORPORATION OF MASSACHUSETTS.

REPEATER.

Application filed February 28, 1921. Serial No. 448,340.

This invention relates to repeaters for signaling circuits whereby signals initiated on any one of a plurality of circuits will be repeated over other one or more circuits, and this invention is more particularly directed to repeaters suited for cooperation with non-interference and succession signal initiating boxes,—such as those commonly used in fire alarm signaling systems. Such repeaters have heretofore been so arranged that, in the event of concurrent formulation of signals in a plurality of the initiating circuits connected thereto, the signal of one of such circuits would be automatically selected to control the repeater.

Repeaters, such as those just referred to, are variously arranged to suit the diverse operating conditions of the signaling systems with which they are to be employed, but, as to general function, may be said to fall within one, the other, or a combination of the types frequently referred to as "reflex" and "non-reflex", respectively. Repeaters of both of said types are subject to control by signals initiated in any one of certain circuits,—circuits of this character being herein referred to as "initiating circuits"; and such repeaters may and may not be provided with facilities for formulating signals in certain circuits by which they are not controllable,—circuits of this character being herein sometimes referred to as "alarm circuits."

Repeaters are said to be of the reflex type when so arranged that they may act to formulate signals in initiating circuits by which they are controllable; as, for example, a repeater controllable by any one of four initiating circuits, which has facilities for formulating any signal initiated in any one of such circuits, in the other three thereof.

Repeaters are said to be of the non-reflex type, whose construction does not provide facilities for the formulation of signals thereby in any initiating circuits by which they are controllable.

Prior art repeaters of the reflex type have been so arranged that, when so conditioned as to act under the control of any one of their associated initiating circuits, interference will result in other of such initiating circuits should other signals be concurrently formulated therein, as by a distant initiating station.

Such prior automatic non-interference repeaters have been very expensive to manufacture, have required a very considerable time for the procurement or construction thereof, have required extremely delicate and exact adjustments, and have been so arranged that various individual parts differed widely in form and arrangement in order to meet various service conditions, and therefore rendered it impracticable to carry in stock completed repeaters or complete sets of parts therefor. For similar reasons it has been found to be impracticable to increase the initiating circuit capacity of any prior repeater without completely rebuilding same.

Furthermore, such prior repeaters have not been adapted for such embodiment as to provide, in a single instrument, for response to and reflex control of different classes of initiating circuits; as, for example, in a case where some initiating circuits are of the normally closed type in which the usual current flow is of as great intensity as that employed during the transmission of a signal, and other initiating circuits are of the normally open or normal weak test-current type in which the current flow during signal transmission greatly exceeds that normally effective therein.

When initiating circuits including the usual commercial forms of non-interference and succession initiating stations have been connected to prior repeaters, no means has been heretofore found whereby the benefit of the successive functioning of such stations would be available in the event that two or more of such circuits are simultaneously broken by initiating station signals.

In prior repeaters of reflex type (as said type is herebefore more fully defined), should signals be concurrently transmitted from two initiating circuits one of which controls and the other or others of which fail to control the repeater,—should the signal of the controlling circuit be completed more than a predetermined period (as measured by the running of the so-called "time-train" of the repeater) before the completion of the signal of the non-controlling circuit, such prior repeaters would respond to that portion of the signal of such initially noncontrolling circuit which is formulated subsequent to the termination of such predetermined period. Such fragmentary transmision of signals is extremely objectionable for reasons well understood by those skilled in this art; prominent among such reasons is the fact that false or misleading signals usually result therefrom in the circuits responsive to such a repeater.

Repeaters are sometimes employed in connection with initiating circuits containing initiating stations lacking, effectve non-interference mechanism. Any one of such stations is likely to act to formulate its signal at a time when its circuit is controlled by the repeater incident to the response thereof to a signal from some other initiating circuit; whereupon the signal of the station so acting is subjected to such mutilation as to render unintelligible the partial response thereto which may be effected by manifesting devices connected in the circuit therewith; although such manifesting devices are frequently provided in all initiating circuits of systems subject to such occurrences so that, should the repeater relinquish control of circuits so subjected to interfering signals, the succeeding rounds of such signals would be correctly disclosed.

Throughout this specification, the terms "signal impulses" and "impulses of any signal" are intended to designate that type of the changes in circuit condition to which interpretive signaling response should be made;—for example, breaks of a normally closed circuit or current flow increase of a normally weak test current circuit, such as should result in sounding action of bells or marking action of registers; as distinguished from closures of a normally closed circuit or reductions of current flow of a normally weak test current circuit to which no single interpretive response of bells or registers will be made.

The term "non-interference" as herein employed, is intended to designate that characteristic of mechanism associated with either initiating stations or repeater whereby such a station or repeater will not break a circuit controlled thereby as a result of an attempt made during a broken line interval of such circuit which commenced before such attempt was made, whereby should several such stations (or repeater and one or more stations) break simultaneously, all except one will relinquish control of said circuit before an improper break occurs; and whereby any station or repeater having found a circuit busy, or having relinquished it in favor of another which started simultaneously therewith, will refrain from breaking such circuit until it is fully relinquished by any or all previously breaking stations (or repeater).

The term "succession" as herein employed is intended to designate that characteristic of mechanism of initiating stations whereby any station having relinquished its circuit in favor of another station (or repeater) will automatically act to renew its attempt to transmit its signal after the elapse of a period the duration of which is sufficient for the formulation of a signal of another station.

An object of this invention is to provide a repeater adapted for differing embodiments so as to meet varying simple or complex service conditions, while employing substantially identical constituent parts for corresponding functions.

A further object is to provide a repeater adapted for such embodiment that facilities for the control of additional initiating circuits may be added to those previously provided for without altering or disturbing such previously provided facilities.

A further object is to provide a repeater adapted for such embodiment that the facilities provided for the response to and control of individual initiating circuits may be mounted upon independent panel-like sections suitable for association in groups of various sizes in connection with a standard form of mechanism common to all circuits.

A further object is to provide a repeater adapted for embodiment in a form in which all functions may be accomplished by ordinary commercial equipment, such as telegraph or telephone relays and registers having local contacts similar to those employed for the control of time stamp and other local circuits, so that the constituent parts of such repeaters can be obtained and assembled upon very short notice. The attainment of this object is particularly advantageous under circumstances requiring emergency replacements.

A further object is to provide a repeater adapted for embodiments which can be produced, assembled and maintained without delicate or exact adjustments, and without the exercise of skill greater than that possessed by ordinary telegraph or telephone instrument men.

Further object is to provide a repeater adapted for embodiments for reflex operation, the action of which, in response to a controlling initiating circuit, will be such as to avoid interference with any signal, the transmission of which may be attempted upon a non-controlling initiating circuit, at least as effectively as such interference is avoided by the most highly developed commercial non-interference signal initiating stations when concurrently acting in the same circuit.

A further object is to provide a repeater adapted for embodiments which will afford opportunity for as efficient functioning of well known commercial forms of succession initiating stations when connected in different initiating circuits of such a repeater as if such stations were connected in a single circuit.

A further object is to provide a repeater adapted for embodiments whereby, in the event of the termination of the signal of an initiating circuit controlling such repeater prior to the completion of the formulation of a concurrent signal of a non-controlling initiating circuit, no portion of the signal of such non-controlling circuit will be responded to by such repeater.

A further object is to provide a repeater adapted for embodiments whereby control by the repeater of any initiating circuit will be relinquished, during the action of such repeater in response to any other initiating circuit, if the responsive condition of such controlled circuit is impaired; as, for example, by an attempt to formulate a second signal therein.

A further object is to provide a repeater for embodiments suited for use where an attendant will not at all times be available for the purpose of disconnecting circuits which are abnormally conditioned through the development of faults therein.

Still further objects and the inherent advantages thereof will be in part obvious and in part specifically set forth in the following specifications.

In applying the broad features of this invention to repeaters of the non-reflex type,— an electromagnet is provided for each initiating circuit, a moving device is associated with each electromagnet for control thereby, locking mechanism is provided for all moving devices, and suitable signaling mechanism is arranged for response to any or all of said moving devices subject to the control of said locking mechanism.

Said locking mechanism comprises a retarded operative device variously responsive to the positioning of said moving devices, as hereinafter more fully explained, and suitably controlled locking members, one of which is provided for each of said moving devices so as to render said signaling mechanism unresponsive to individual moving devices only when such devices are normally positioned at a time when the moving device of some other section is abnormally positioned.

From the foregoing it will be evident that when any signal is transmitted over any one of the initiating circuits at a time when all of the other initiating circuits are normally conditioned, the retarded operative device and signaling mechanism will act in response to such signal, and that such signal may be repeated to one or more other circuits, as desired, by providing contacts for such circuits operable by such signaling mechanism.

In order to insure response to the signal of but one initiating circuit by the signaling mechanism (and any circuits which should respond to such signal) in the event that signals are concurrently formulated in a plurality of such initiating circuits, the locking mechanism is so associated with the moving devices and the signaling mechanism that the condition of any locking member will be changed from normal to abnormal only when the moving device associated therewith is normally positioned and the retarded operated device is abnormally conditioned at a time when the moving device associated with some other locking member is abnormally positioned, and inversely the condition of any locking member will not be changed from normal to abnormal when the final one of two or more busy moving devices is normally positioned, so that alteration of the condition of any locking member from normal to abnormal will render such locking member unresponsive to subsequent movements of moving members during continuation of abnormal conditioning of the retarded operated device; and so that alteration of the condition of the retarded operated device from abnormal to normal will cause corresponding restoration of all locking members then abnormally conditioned.

In the use of repeaters equipped only as just described, it is evident that should the condition of any initiating circuit remain changed from normal to abnormal for an extended period,—as by a fault in the signaling circuit,—the repeater would remain unresponsive to all other initiating circuits throughout such period; and that, should signals be concurrently formulated in two or more of the originating circuits, but one of such signals would be responded to by the signaling device (or by any circuit or circuits acting concurrently therewith). It will also be evident that in the event of the concurrent formulation of signals in two or more initiating circuits, should the formulation of the signal automatically selected to control the repeater be completed so long in advance of the completion of the signal of some other circuit that the retarded operated device will be resorted to normal following the completion of the formulation of the controlling signal at a time subsequent to which additional signaling impulses will be formulated in such other initiating circuit, such additional impulses will be responded to by the signaling device and by any circuit or circuits operating concurrently therewith.

In cases where initiating circuits contain instrumentalities such as non-interference initiating stations or signal manifesting devices which should be responsive to signals of all initiating circuits, repeaters of the reflex type should be employed. Hence, in the application of this invention to such repeaters,—make and break mechanism is provided for all initiating circuits, and such mechanism is so associated with the various locking devices that individual ones of the initating circuits will be responsive to the make and break mechanism only when the locking member associated with such circuits is abnormally positioned and so that abnormal positioning of any moving device whose associated locking member is normally positioned will cause action of said make and break mechanism.

In applying this invention to repeaters which should automatically act to maintain intended relationships between all circuits as far as compatible with avoidance of false signals, and should automatically act to isolate any circuits which are abnormally conditioned for an excessive period or such as are subjected to the formulation of signals of initiating stations connected thereby under conditions when continued control thereof by the repeater would result in the formulation of objectionably false signals therein, such repeaters should be of the reflex type and should comprise revised and additional instrumentalities as follows:

The retarded operative device should be responsive to abnormal positioning of moving devices whose associated locking members are abnormally positioned, as well as to those which are normally positioned; thus assuring that after the completion of a signal of a controlling initiating circuit, the locking member of a non-controlling circuit will not be restored to normal until after the expiration of a period subsequent to the termination of the signal of such controlling circuit during which period no signaling impulses are formulated in such non-controlling circuit, and which period is longer than the longest interval between the impulses of any signal.

Restoring devices should be so associated with respective moving devices and locking members and with the make and break mechanism that response of such mechanism to abnormal positioning of any moving device will render such mechanism unresponsive to such devices until after same has been restored to normal position and will prevent action of the repeater to change any non-controlling initiating circuit from normal to abnormal, which circuit failed to be altered from abnormal to normal in response to the action of said mechanism,—as, for example, because of the formulation of a concurrent signal therein.

When it is desired to utilize commercial forms of relays and other readily obtainable instruments in constructing such a repeater, ordinary single and multiple contact relays are utilized as needed to provide electromagnets and moving devices for originating mechanisms, locking mechanisms, repeating mechanism and restoring devices, and a commercial instrument having a suitably retarded member, such as a register having a self starting and stopping paper feed is utilized as a retarded operative device. Contacts such as are frequently provided upon such registers for lighting a signal lamp, or other similar purpose, are utilized for controlling locking mechanism current paths. Each relay used as an originating mechanism has associated therewith a multiple contact relay for use as a locking member and so arranged that two sets of contacts are closed when the armature of any one of said relays is in its retracted position; and so that, during movement of such armature from retracted to attracted position, a current path is first established from a contact of one of said sets to a contact of the other of said sets and the current paths between one and the other of the contacts of said respective sets are thereupon broken.

Conductors are provided for establishing current paths for the electromagnets and contacts of such relays and of such register or other retarded operative device; and a current source, such as a suitable battery is provided for the energization of the electromagnets of the relays other than the originating relays and of the register or other suitable retarded operative device.

Such conductors are so connected that when the armatures of all of the originating magnets are normally positioned the current path through the magnet of the retarded operative device is normally conditioned, and so that whenever the armature of any originating relay is abnormally positioned at a time when its associated locking relay armature is normally positioned the electromagnet of said retarded operative device will be abnormally conditioned.

The electromagnets of originating relays are respectively included in the current paths of the initiating circuits to which the repeater should respond. If such circuits are of the ordinary normally closed type, it is evident that the armatures of the relays responsive thereto will be normally maintained in their attracted position, and if such circuits are of the normally open type, or are normally traversed by a test current insufficient for the effective energization thereof, the armatures of such relays will be normally in their retracted positions.

In order to insure the response of the signaling device (and any other devices to which signals should be repeated) to the signal of but one initiating circuit in the event that signals are concurrently formulated in a plurality of such initiating circuits, the current path initially controllable by each individual originating relay is furthermore so controlled by its respective associated locking relay that said path will be effective for causing response of such signaling device or devices only when the armature of said locking relay is normally positioned; and the electromagnet of each locking relay is so connected with contacts of the retarded operative device, with the contacts of that locking relay and its associated originating relay, and with the contacts of the originating and locking relays associated with other initiating circuits,—that when the armature of any locking relay is normally positioned the condition of the current path of the electromagnet of such relay will be changed from normal to abnormal only when the retarded operative device contacts are abnormally positioned and the originating relay armature associated with such locking relay is normally positioned at a time when the originating relay armature of some other initiating circuit is abnormally positioned while its associated locking relay is normally positioned,—and so that whenever the armature of any locking relay is moved from its normal to its abnormal position such movement will disconnect such magnet from the portion of the current path just described which includes the armature of its associated originating relay and the armatures of the originating and locking relays of other initiating circuits, and will therefore render such relay magnet unresponsive to subsequent changes in the positions of such other relay armatures while maintaining such circuit relation between such magnet and the retarded operative contacts of such signal device that whenever such contacts are restored to their normal condition the current paths through all locking relay magnets then in abnormal condition will be restored to normal.

Relays utilized as restoring devices or as parts of the repeating mechanism are connected by similar conductors so as to enable the devices and repeating mechanism to accomplish functions such as those hereinbefore described in a manner consistent with the service conditions of individual repeaters.

The facilities hereinbefore described are suited for mounting in independent groups each comprising all instrumentalities individual to one initiating circuit, and it is a feature of this invention to mount such groups upon independent panel-like sections each having a plurality of connecting mediums for communication with the retarded operated device and an extraneous operative force. and for interconnection of locking members, moving devices, restoring devices and repeating mechanisms, such mediums being so positioned and arranged as to facilitate such interconnection thereof between adjacent panels as to be operatively continuous from section to section.

In accordance with this feature of this invention, such panels may be completed and carried in stock, for assembly in such groups as are required for individual repeaters; and any repeater comprising such repeaters may have the initiating circuit capacity thereof increased from time to time, as needed, by installing additional panels and operatively interconnecting the respective intercommunicating mediums.

Certain more detailed features of this invention, as well as the foregoing features thereof, will be better understood by a reference to the appended claims, which, merely for purposes of illustration, are directed to the illustrative embodiments of this invention set forth in the following specification and shown in the accompanying drawings, in which like characters designate similar parts throughout the several views, in which diagrammatic illustrations are almost exclusively employed and structural details are conventionally represented or typified as far as practical in the interests of clearness, and in which Figure 1 illustrates an embodiment of this invention in a reflex repeater arranged for fully automatic elimination and restoration of responsiveness of faulty initiating circuits and to provide full non-interference between initiating circuits where not exposed to overlapping concurrent signals;

Figure 5:
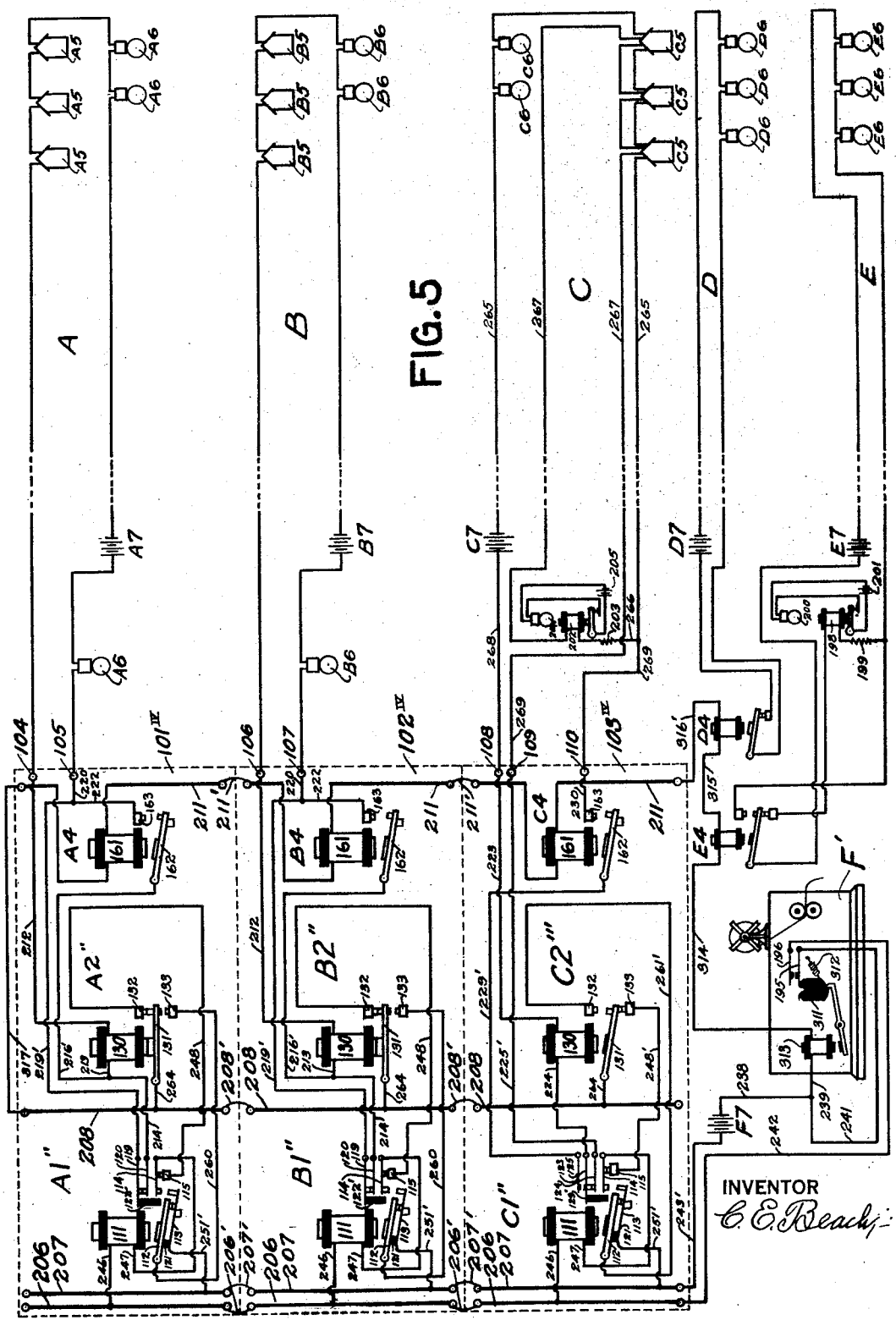
Fig. 5 illustrates an embodiment of this invention in a repeater which is reflex but otherwise similar to that illustrated in Fig. 4.
Figure 6:
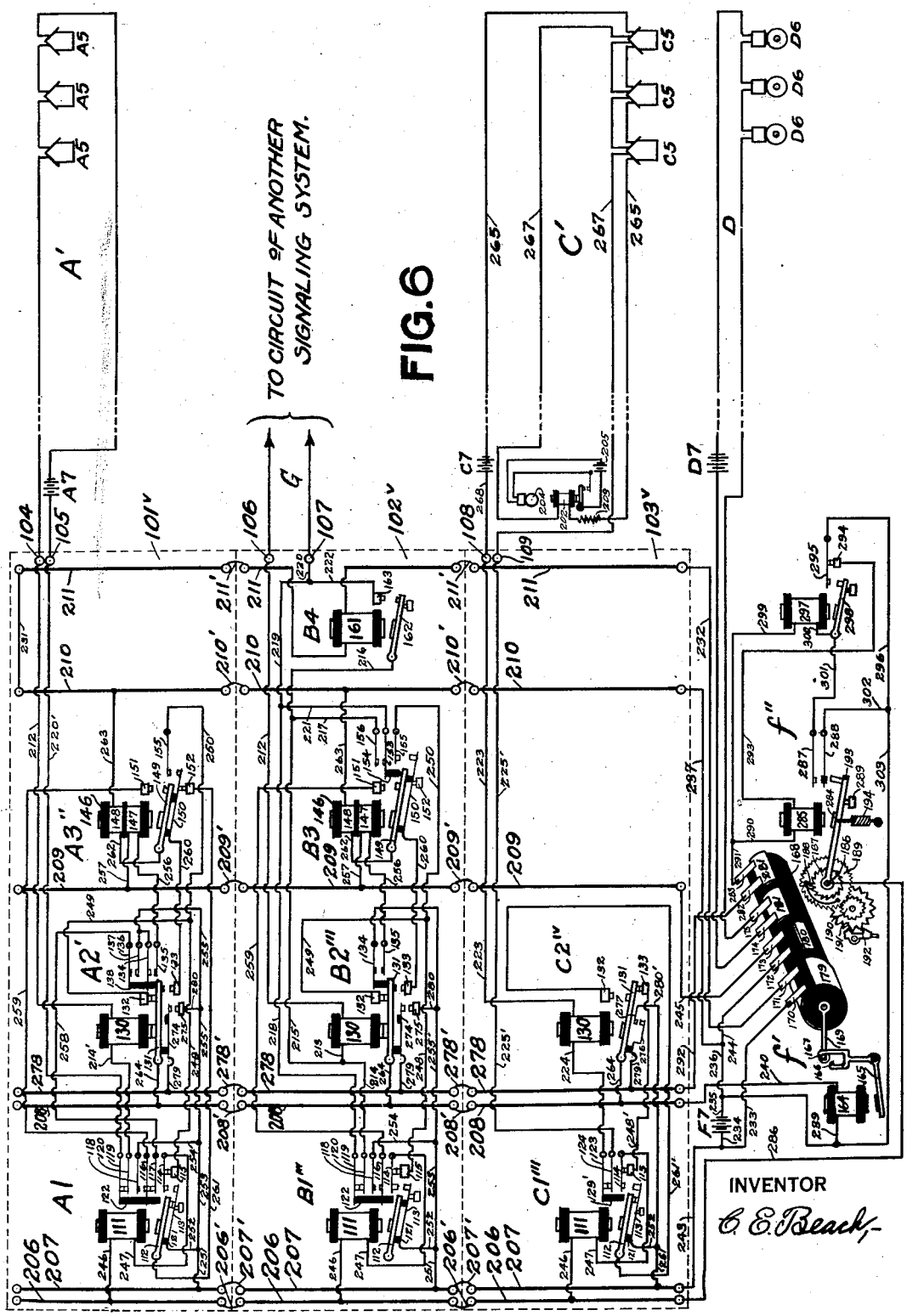
Fig. 6 illustrates an embodiment of this invention in a repeater suited for accomplishing certain special functions to be hereinafter more fully described.
Figure 7:
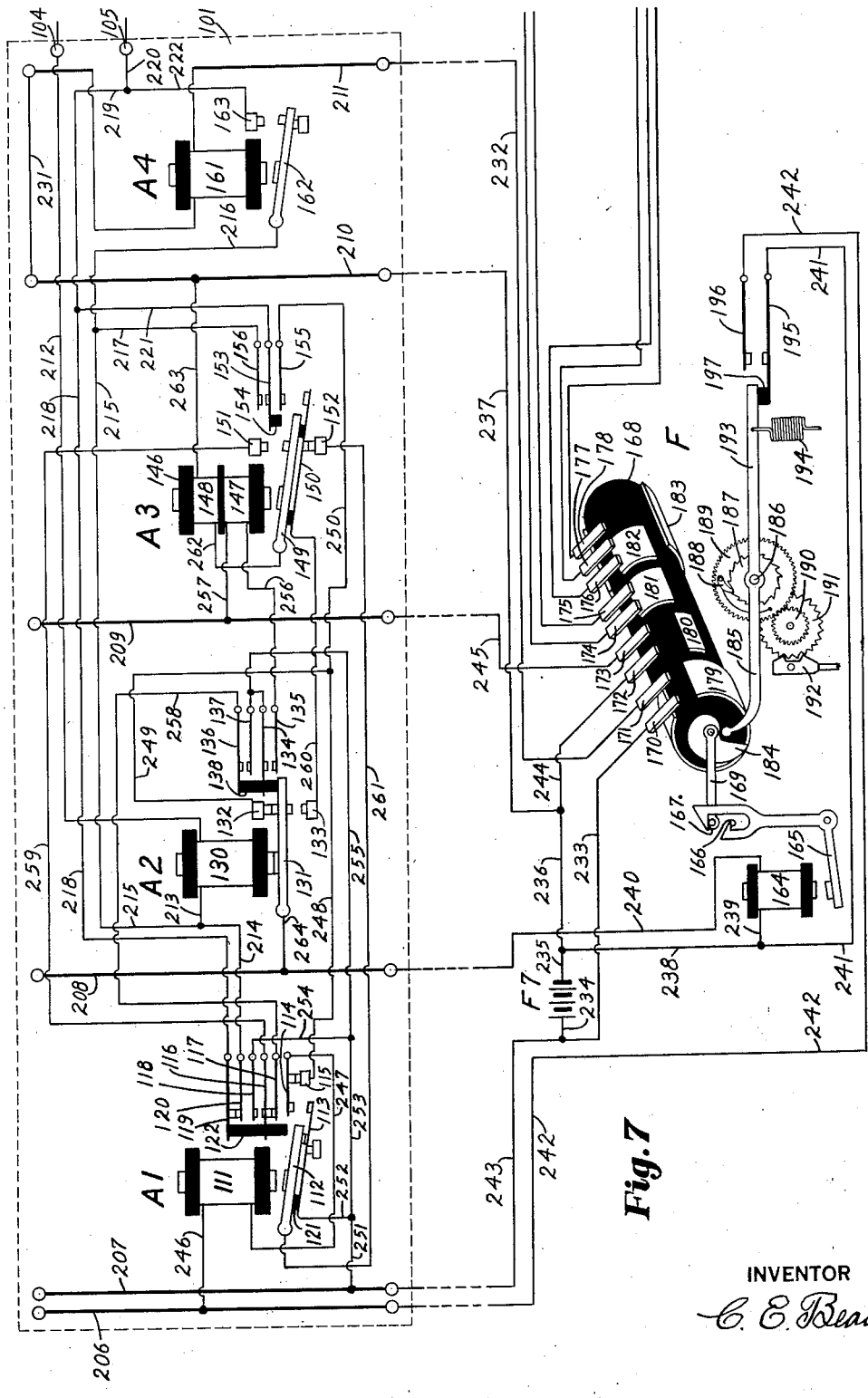
Fig. 7 is an enlarged view of the mechanism of panel 101 of circuit A and of the device F of Fig. 1.
Figure 8:
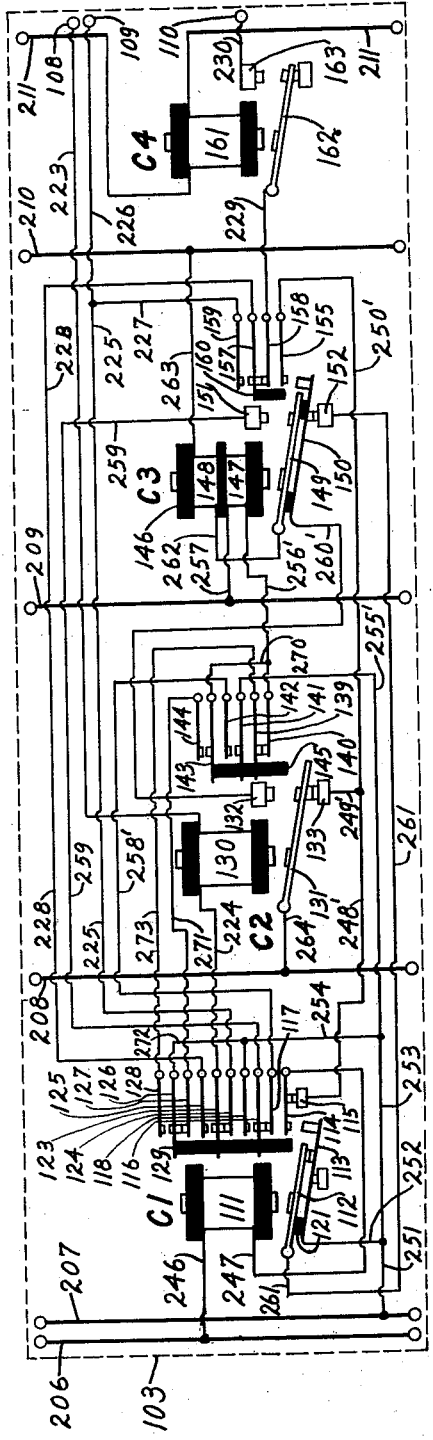
Fig. 8 is an enlarged view of the mechanism of panel 103 of circuit C of Fig. 1.
Figure 9:
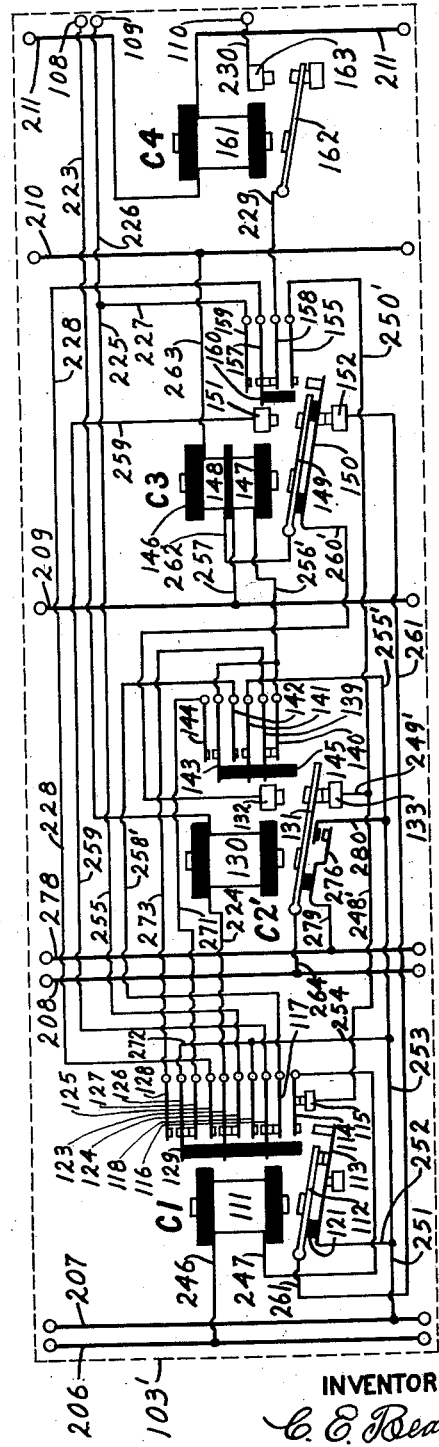
Fig. 9 is an enlarged view of the mechanism of panel 103' of circuit C of Fig. 2.
Figure 10:
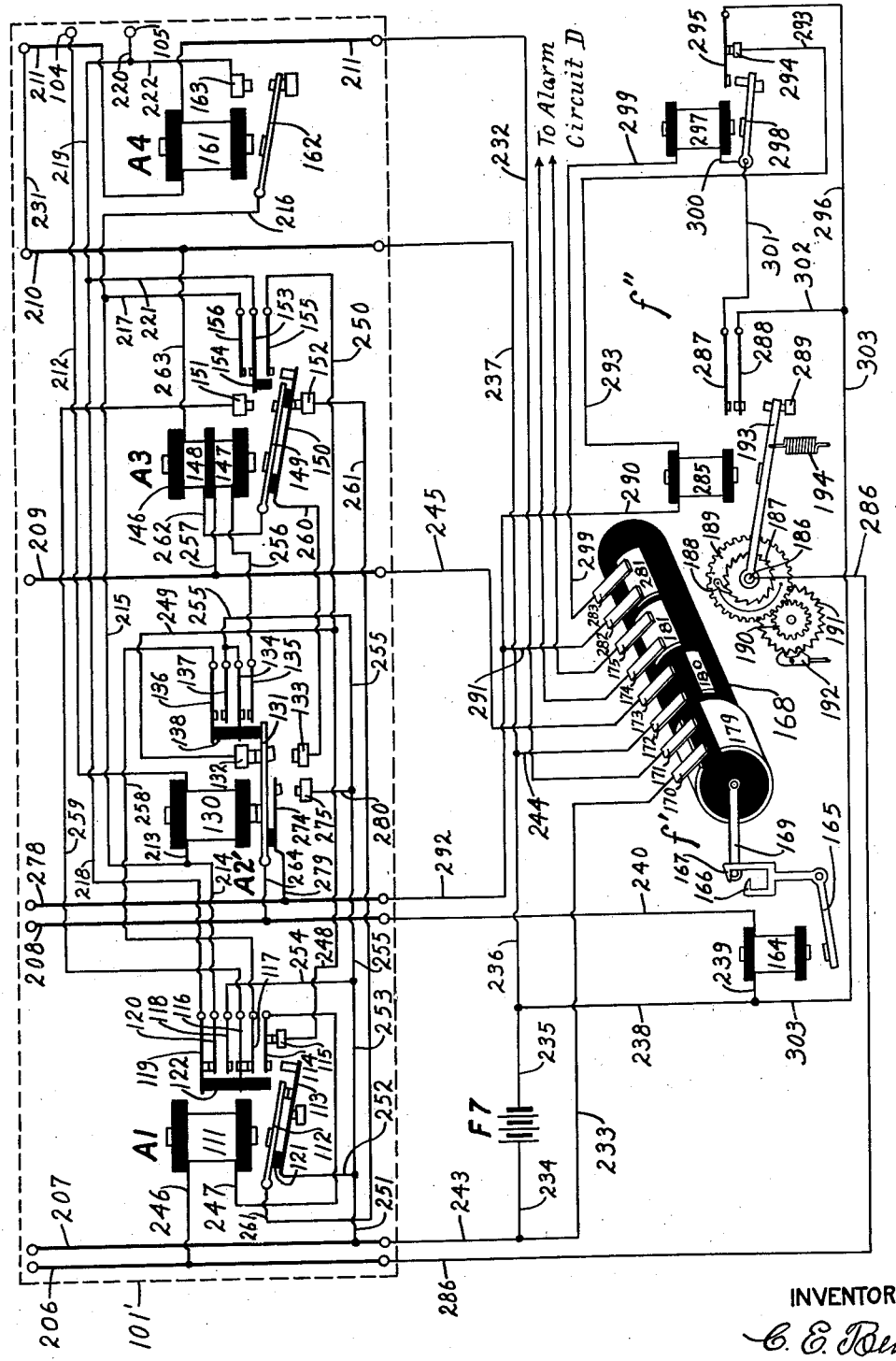
Fig. 10 is an enlarged view of the mechanism of panel 101' of circuit A and the device $f'$ and $f''$ of Fig. 2.
Figure 11:
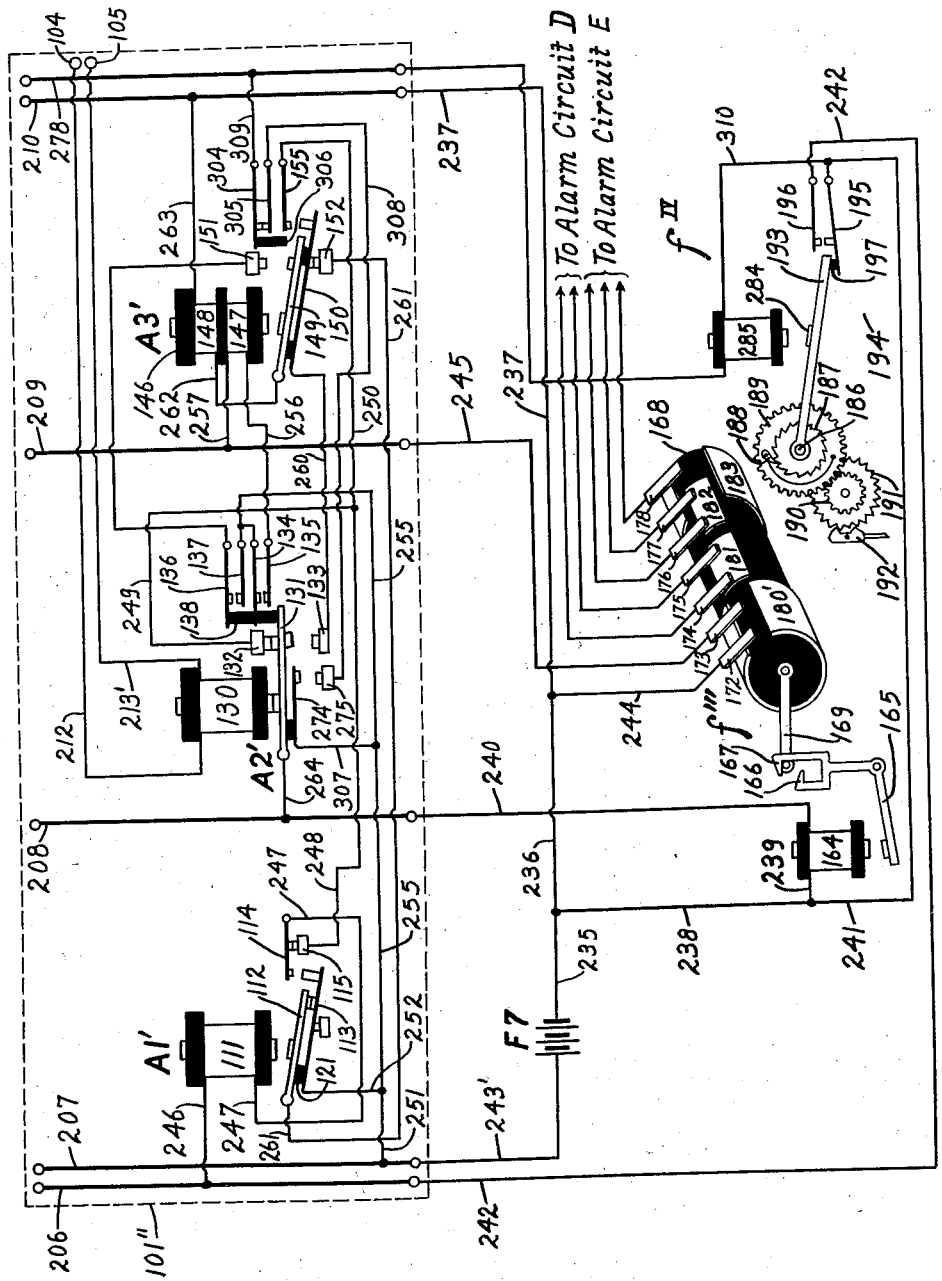
Fig. 11 is an enlarged view of the mechanism of panel 101'' of circuit A and the device $f'''$ and $f^{iv}$ of Fig. 3.
Figure 12:
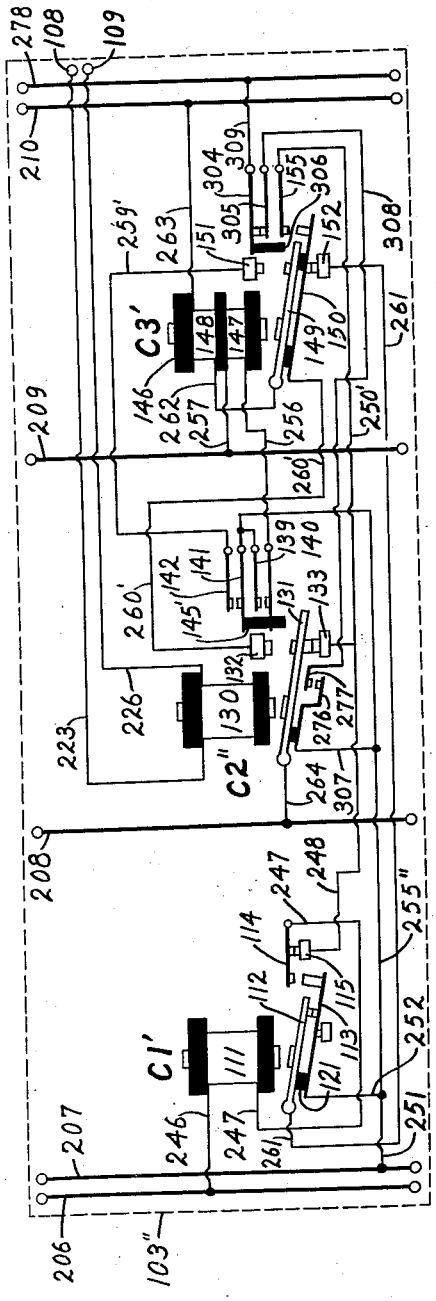
Fig. 12 is an enlarged view of the mechanism of panel 103'' of circuit C of Fig. 3.
Figure 13:
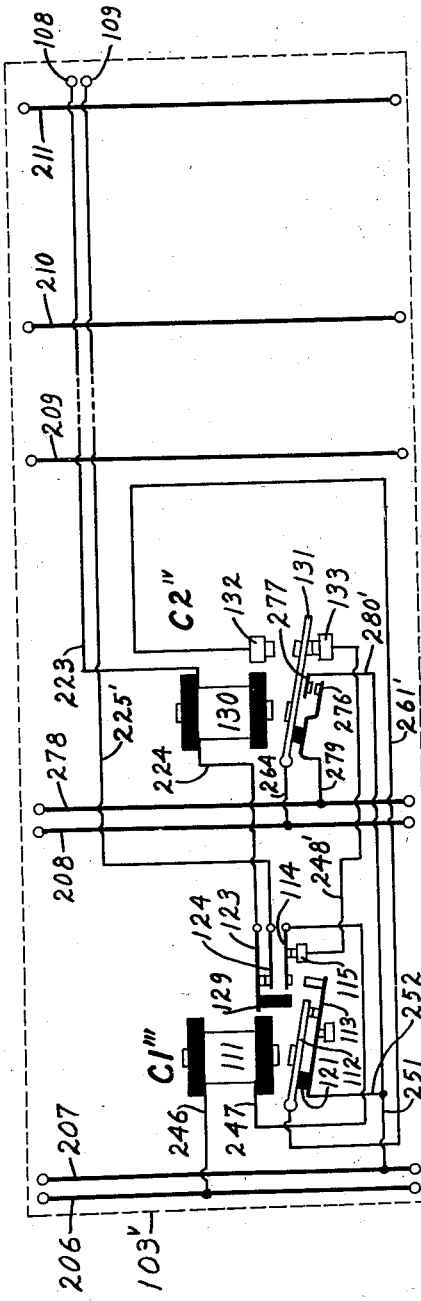
Fig. 13 is an enlarged view of the mechanism of panel $103^v$ of circuit C' of Fig. 6.
Figure 14:
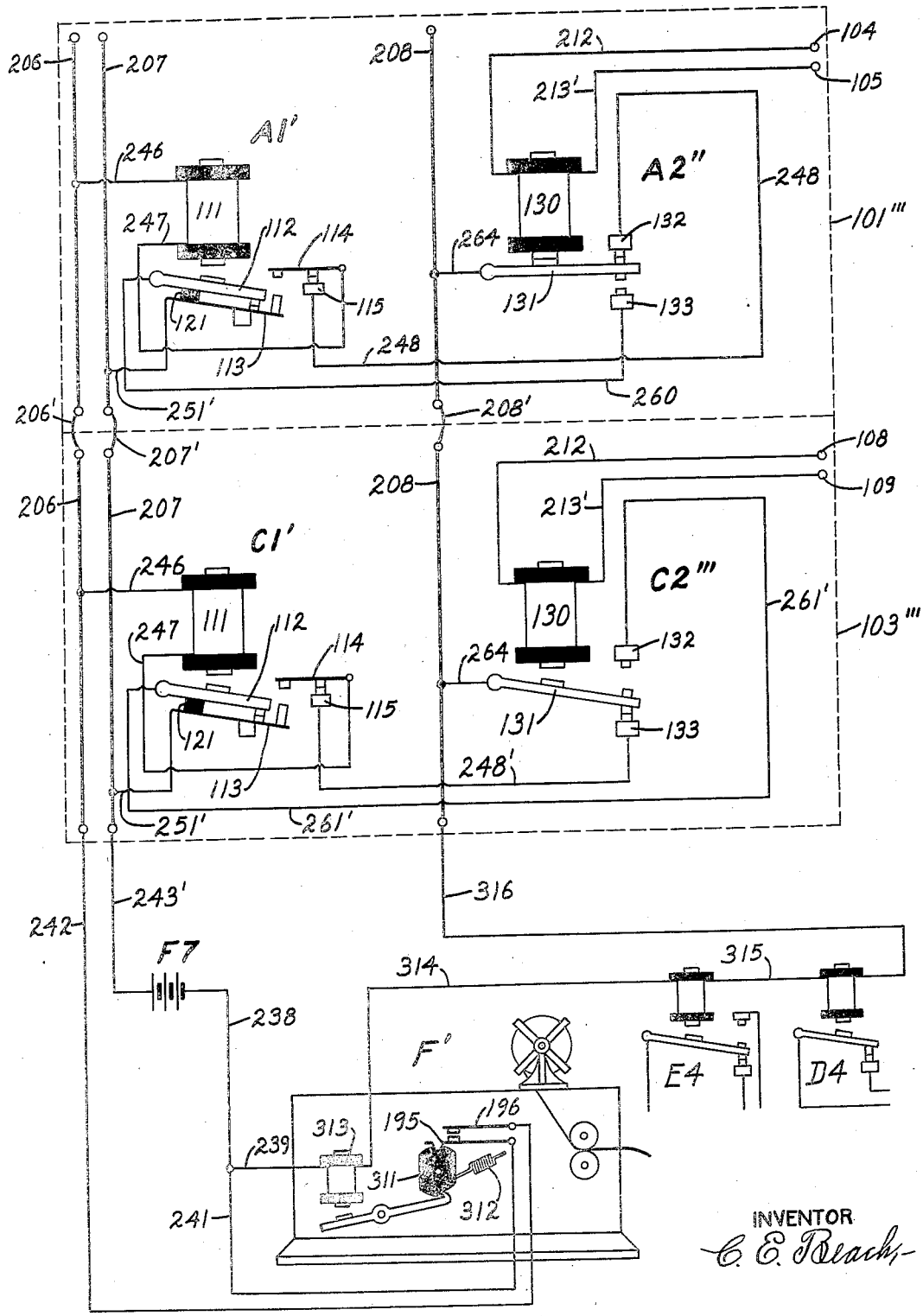
Fig. 14 is an enlarged view of the mechanism of panels 101''' and 103''' of circuits A and C, respectively, and the device F' of Fig. 4.
Figure 15:
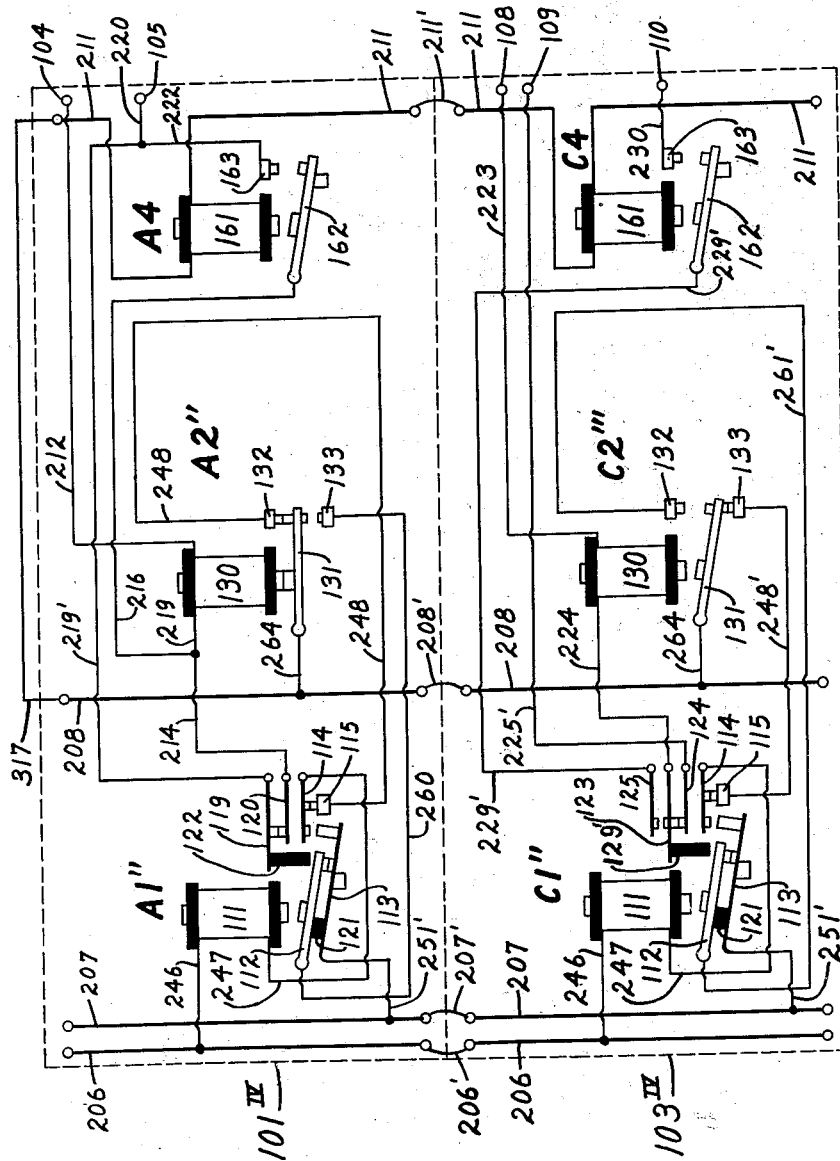
Fig. 15 is an enlarged view of the mechanism of panels $101^{iv}$ and $103^{iv}$ of circuits A and C, respectively, of Fig. 5.
Figure 16:
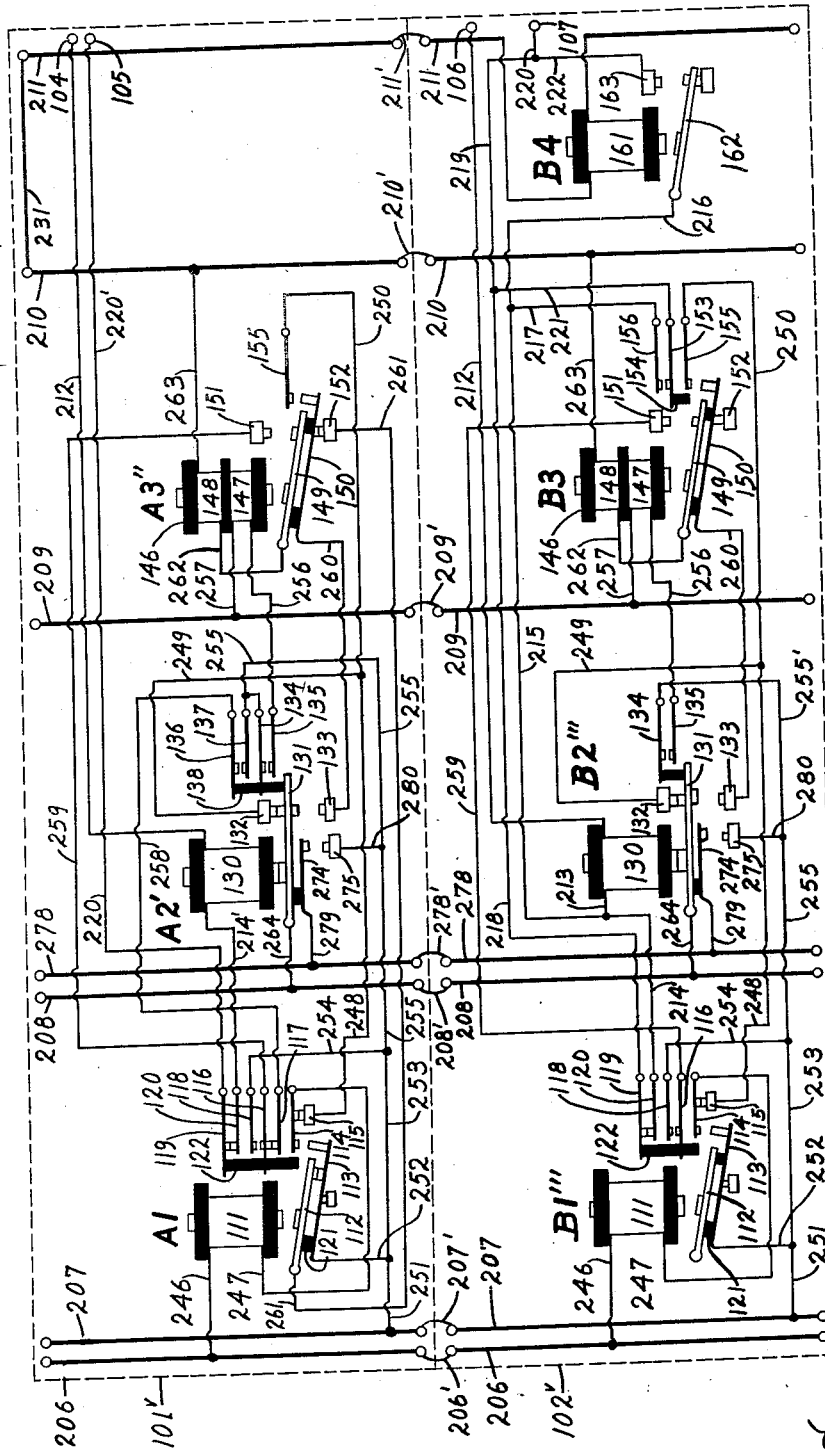
Fig. 16 is an enlarged view of the mechanism of panels $101^v$ and $102^v$ of circuits A' and G, respectively, of Fig. 6.

As to Figs. 1–6, inclusive, each represents a different embodiment of the invention and each embodiment is formed by the combination of two or more of the elements shown in Fig. 7, each of said elements performing a definite function and having various modifications.

Throughout these drawings, the following notation is used: A, B, C, D, E, A', C' and G are circuits; A, B and C being combined initiating and alarm circuits, D and E alarm circuits only, A' and C' initiating circuits only, and G an (initiating) circuit of another signaling system.

There are four fundamental elements, two or more of which are used in each of the various embodiments, and said elements are indicated by the numerals 1, 2, 3 and 4, to which are prefixed the letter of the circuit with which they are associated.

The numeral 1 in all cases indicates the so-called "locking member", the function of which is to so modify the various circuits as to render the signaling mechanism unresponsive to all but the initiating circuit which is at any given time in control; and, when the reflex function is present, to render its circuit, when another is in control, responsive to its associated repeating contactor.

The numeral 2 likewise indicates the so-called "originating mechanism", which, by starting the actuation of the retarded operative device F or $f$, initiates the cycle of operation effected in response to abnormal conditioning of the associated initiating circuit (as A, B or C), except when the repeater is conditioned for exclusive control by another circuit or circuits.

The numeral 3 likewise indicates the so-called "circuit restoring device", an important function of which is to so modify the various circuits that the repeater may be rendered responsive to other initiating circuits during the abnormal conditioning of the originating mechanism of any circuit, and another function of which is to render its initiating circuit unresponsive to its associated repeating contactor in the absence of current flow in such circuit when its contactor has acted to close same.

The numeral 4 likewise indicates the so-called "make and break mechanism" or "contactors" which provide repeating or make and break mechanism for formulating signals in their associated circuits.

Each of these four fundamental elements occur in various modifications indicated by primes as $'$ $''$ $'''$ $^{iv}$, used as exponents.

Figure 3:
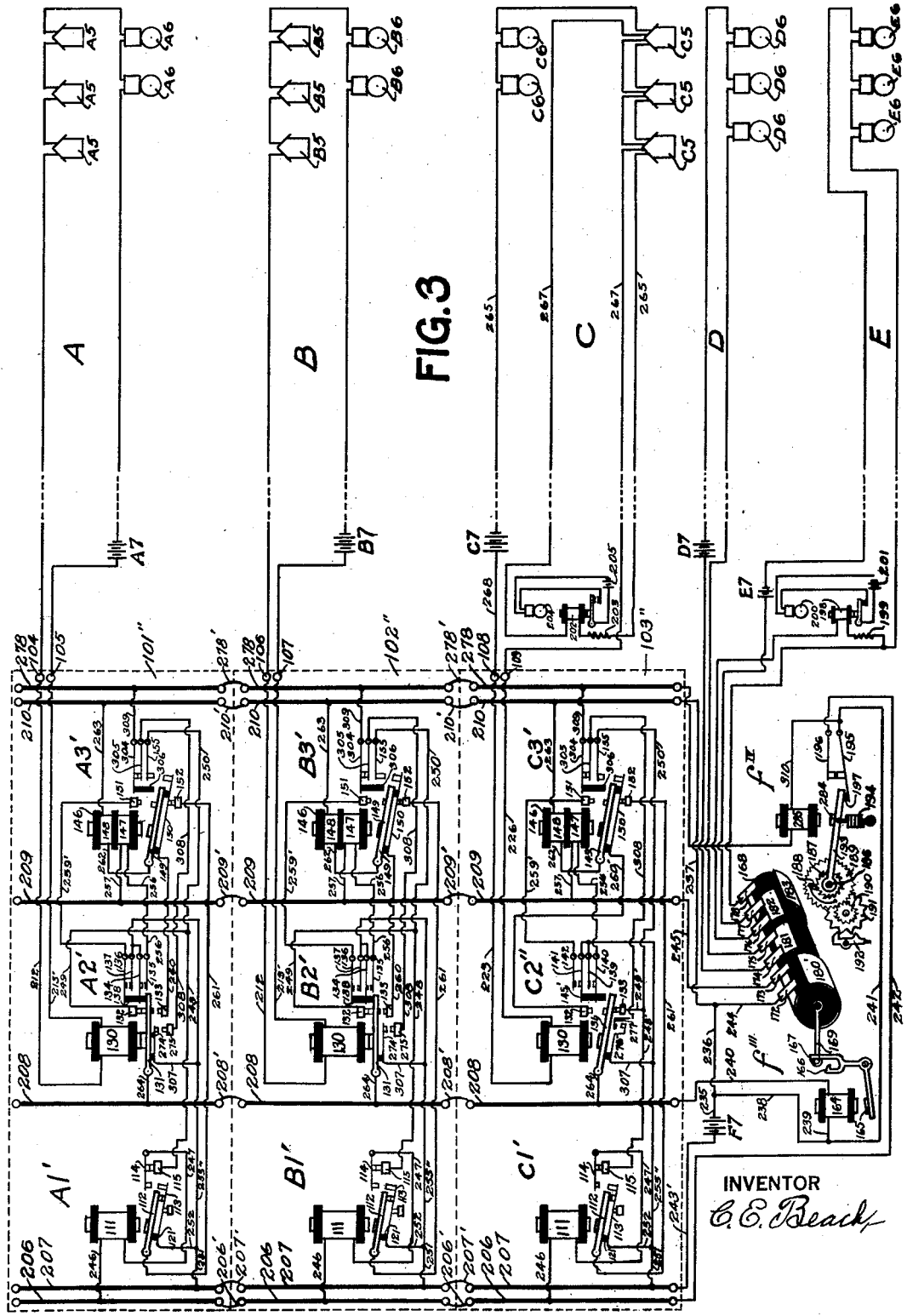
Fig. 3 illustrates an embodiment of this invention in a repeater which is non-reflex but is otherwise similar to that illustrated in Fig. 2.

Thus, for example, in Fig. 3, the character $C^{2''}$ indicates the third variation (indicated by the prime $''$) of the originating mechanism 2 associated with circuit C.

In the various illustrated embodiments of this invention, the following forms or modifications of the various fundamental elements occur solely in the embodiments named and may therefore be said to be specific characteristics differentiating each embodiment from all the others, e. g.

Figure 1:
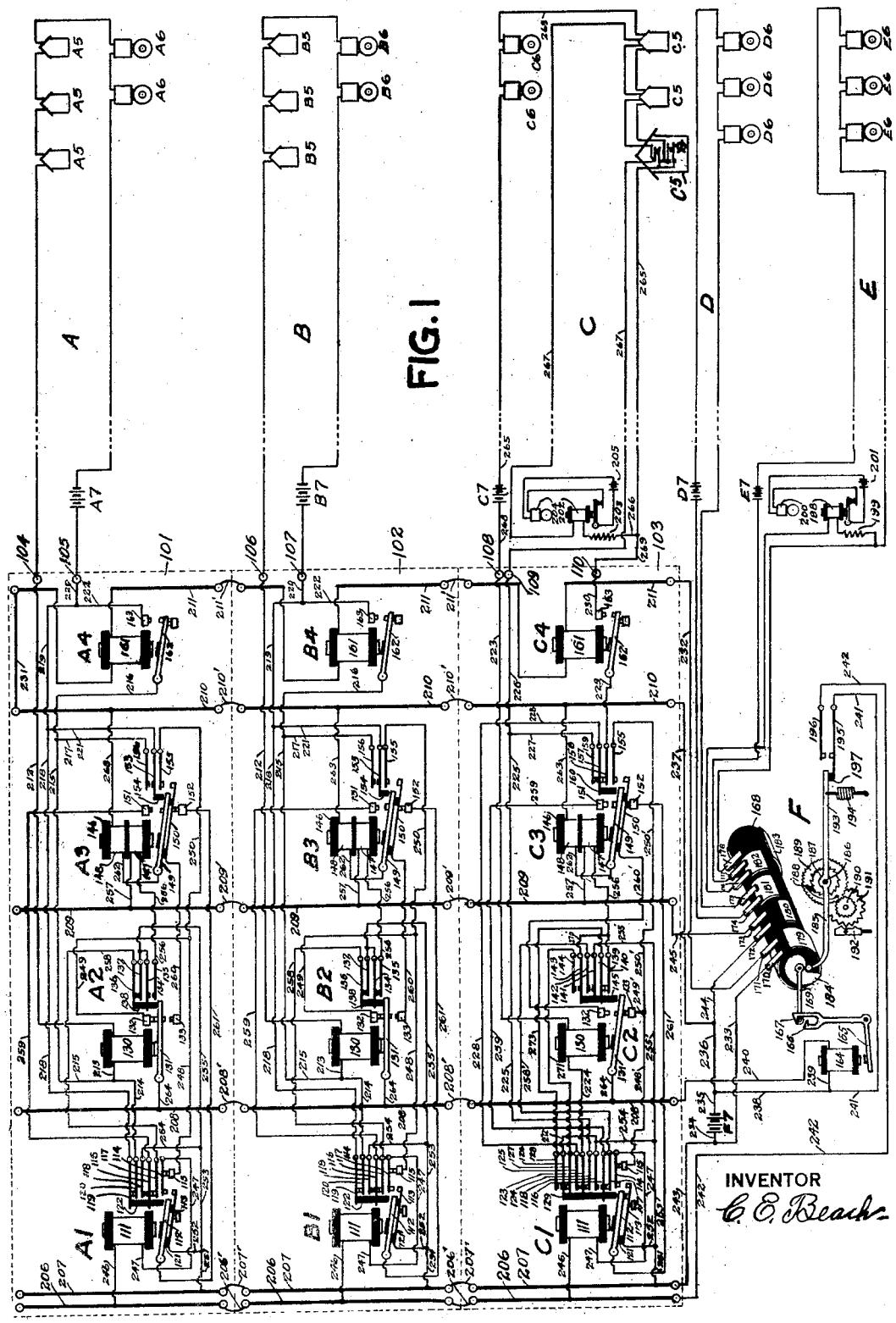
Figure 2:
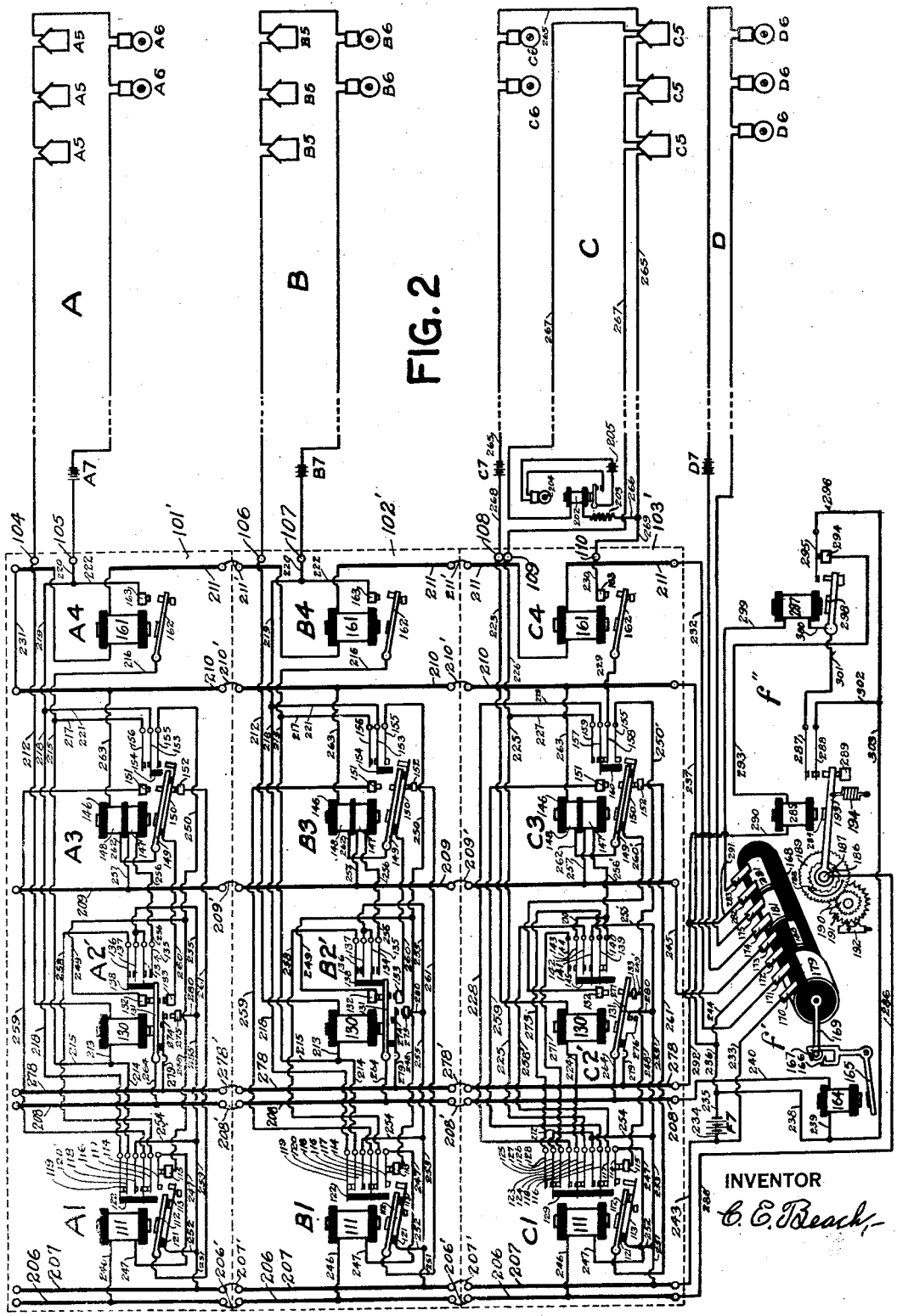
Fig. 2 illustrates an embodiment of this invention in a repeater arranged to prevent objectionable fragmentary transmission of overlapping concurrent signals and otherwise corresponding to the repeater of Fig. 1.

In embodiment 1 of Fig. 1, the elements $A^2$, $B^2$, $C^2$ and F;

In embodiment 2 of Fig. 2, the element $C^{2'}$;

In embodiment 3 of Fig. 3, the elements $C^{2''}$, $A^{3'}$, $B^{3'}$ $C^{3'}$ $f'''$ and $f^{iv}$;

In embodiment 5 of Fig. 5, the elements $A^{1'''}$, $B^{1'''}$, $C^{1'''}$ and F';

In the embodiment 6 of Fig. 6, the circuits A' and C' and the elements $B^{1''''}$, $C^{1''''}$, $B^{2''''}$, $C^{2iv}$ and $A^{3''}$.

Figure 4:
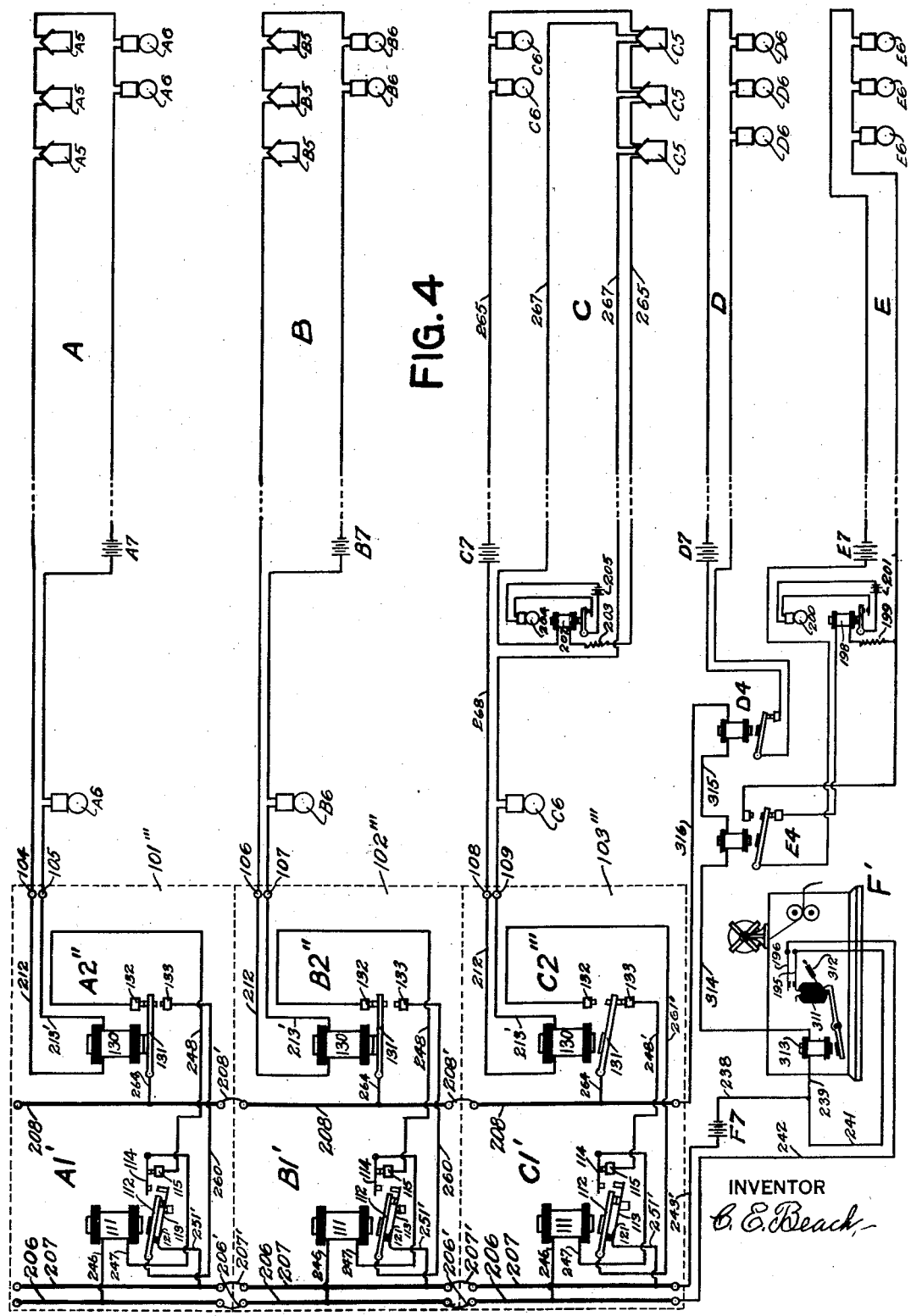
Fig. 4 illustrates an embodiment of this invention in a non-reflex repeater suited for use where it is desired to manually accomplish elimination and restoration of initiating circuits which are abnormally conditioned for an excessive period or are subjected to a non-controlling concurrent signal likely to overlap a controlling signal.

While the embodiment of Fig. 4 contains no element in a form or modification not found in other of the five other embodiments, it nevertheless distinguishes from each of them, since no one of the other embodiments contains elements having all of the particular forms or modifications which it contains.

*Detailed description of embodiment of Fig. 1.*

In the illustrative embodiment of this invention which is diagrammatically shown by Fig. 1, the dotted line rectangles 101, 102 and 103 represent the outlines of three circuit panels of an extensible repeater; the apparatus mounted upon panels 101 and 102 being suited for connection therewith of initiating circuits of the ordinary normally closed type which includes non-interfering and succession initiating stations having so-called "closed type break wheels", while that shown upon panel 103 is suited for connection thereto of a circuit the normal test current flow through which is insufficient to cause effective energization of the electromagnet of said panel which is arranged for inclusion in such a circuit, but which circuit includes non-interfering and succession initiating stations having so-called "open type break wheels" arranged for increased current flow during the formulation of signals therein such as will cause effective energization of said magnet.

The panel 101 is provided with line terminals 104 and 105 which terminals are connected with the respective ends of the outside circuit generally indicated by the reference character A. The ends of the outside circuit B are correspondingly connected to the terminals 106 and 107 of panel 102, and circuit C is connected to the terminals 108, 109 and 110 of panel 103 in a manner which will be hereinafter more fully explained.

*Locking members.*

As most clearly shown in Fig 7 panel 101 is provided with a locking member $A^1$, and originating mechanism $A^2$, a circuit restoring device $A^3$ and with a repeating or make and break mechanism $A^4$. Panels 102 and 103 are correspondingly equipped with the instrumentalities $B^1$, $B^2$, $B^3$ and $B^4$, and $C^1$, $C^2$, $C^3$ and $C^4$, respectively. The locking members $A^1$ and $B^1$ consist of an electromagnetically controlled circuit changing device comprising the electromagnet 111, an armature 112 therefor, a flexible contact arm 113 carried by said armature and the contacts 114, 115, 116, 117, 118, 119 and 120, the relative positioning of which is controlled by said armature. One end of the contact arm 113 is secured to the armature 112 by means of an insulating block 121 and said arm 113 is so formed that the free portion thereof tends to move into engagement with the armature 112 and when so moved forms an electrical connection therewith.

The flexible contact 114 is mounted adjacent to the stationary contact 115 and is so formed as to tend to engage therewith, the free end of said contact 114 being so disposed in the path of the free end of the arm 113 and such parts are so relatively positioned that when the armature 112 is in its retracted position the arm 113 is in electrical connection with said armature and separated from the contact 114 and so that during the movement of the said armature 112 from its retracted position the arm 113 will engage the contact 114 and when said armature is in its fully attracted position the contact 114 will be lifted away from the contact 115 and the armature 112 will be lifted away from the portion of the arm 113 which normally contacts therewith.

The contact 116 is mounted between the contacts 117 and 118 for movement into engagement with one or the other thereof. Said contact 116 is so formed that it tends to move into engagement and normally connects with the contact 117. Contacts 117 and 118 are flexible and are so adjusted that during the movement of the contact 116 from one to the other thereof, said contact 116 will not break its connection with one of said flexible contacts until it has established a connection with the other of said contacts.

Contact 119 is mounted adjacent to contact 120, and said contact 119 is so formed as to tend to move into enagement with said contact 120.

An insulating spacer 122 is secured to the free ends of the contacts 116 and 119, and said spacer projects into the path of the armature 112 so that, whenever said armature has moved from its retracted position sufficiently to bring the arm 113 into engagement with the contact 114 said armature will engage said spacer and will, during the further movement thereof to its attracted position, move the contact 116 into engagement with the contact 118 and away from the contact 117 and will move the contact 119 away from the contact 120.

The function of the locking member $A^1$ is to act, during closure of the contacts 195 and and 196 of the device F, whenever the armature of its associated originating mechanism $A^2$ is in normal or attracted position at a time when the armature of the originating mechanism of any other circuit is abnormally positioned while its associated locking member is normally conditioned, for the purpose of revising the current paths of panel 101 so as to (a) lock itself in actuated condition independent of continued abnormal positioning of the armatures of the originating mechanism of other circuits; (b) render the device F unresponsive to abnormal positioning of the armature of the originating mechanism $A^2$; (c) render the circuit A responsive to signal formulating actuation of the contactor $A^4$; and (d) render the restoring device $A^3$ suitably responsive to the armature of the originating mechanism $A^2$.

The locking member $C^1$ is provided with the corresponding magnet 111, armature 112, arm 113 and contacts 114 to 118 inclusive; said locking member is also provided with the contacts 123 to 128 inclusive, which are necessary for the control of circuits, such as the circuit C, which are of the weak test-current type above referred to, as distinguished from circuits such as the normally closed circuits A and B.

The contact 123 is mounted between the contacts 124 and 125 and is so formed as to tend to move into engagement with said contact 124. The contacts 124 and 125 are so formed that during the movement of the contact 123 from one to the other thereof, the connection between said contact 123 and one of the contacts cooperating therewith will not be interrupted until connection is established with the other of said contacts.

The contact 126 is mounted between the contacts 127 and 128 for similar cooperation therewith.

The insulating spacer 129 is secured to the contacts 116, 123 and 126 and projects into the path of the armature 112 for actuation thereby in a manner similar to that of spacer 122 as hereinbefore more fully described.

*Originating mechanism.*

The originating mechanisms A² and B² (enlarged view of which is shown in Fig. 7) comprise an originating magnet 130, a moving device or armature 131 controlled thereby, front and back contacts 132 and 133 respectively for said armature, and contacts 134 to 137 inclusive associated with said armature. The contacts 134 and 136 are mounted adjacent to the contacts 135 and 137 respectively and are so formed as to tend to move into engagement therewith. An insulating spacer 138 connects the free ends of the contacts 134 and 136, and said spacer projects into the path of the armature 131 for actuation thereby to move said contacts away from the contacts 135 and 137 when said armature is in attracted position.

The originating mechanism C² is also provided with an electromagnet 130, armature 131 and front and back contacts 132 and 133 therefor.

The originating mechanism C² is also provided with the contacts 139 to 144 inclusive; contact 139 being mounted adjacent to and so formed as to tend to rest against contact 140, contacts 141 and 143 being mounted adjacent to and so formed as to tend to be positioned in spaced relation to the contacts 142 and 144 respectively. The insulating spacer 145 is secured to the free ends of the contacts 139, 141 and 143, and said spacer projects into the path of the armature 131 so that when said armature is in attracted position the contact 139 will be moved away from the contact 140 and the contacts 141 and 143 will be moved into engagement with the contacts 142 and 144 respectively.

*Restoring devices.*

The circuit restoring devices A³ and B³ (enlarged view of which is shown in Fig. 7) are each provided with an electromagnet 146 which has an energizing circuit winding 147 and a holding circuit winding 148, and are also provided with a pivoted armature 149 which carries a flexible contact arm 150 insulated therefrom. Said devices are also provided with the front stop contact 151 and the back stop contact 152, which are mounted in the path of said armature and arm respectively; with the contact 155 which is mounted in the path of the free end of the arm 150 to be engaged thereby when the armature 149 is in its attracted position; and with the contacts 153 and 156. Said contact 153 is mounted adjacent to the contact 156 and is so formed as to tend to be positioned in spaced relation thereto. The free end of the said contact 153 carries the insulating spacer 154 and projects into the path of the free end of the armature 149 so as to be moved into engagement with said contact 156 whenever said armature 149 is in its attracted position.

The circuit restoring device C³ comprises an electromagnet 146 having windings 147 and 148, an armature 149, flexible contact arm 150, front end back stop contacts 151 and 152 and contact 155 cooperating with the arm 150 in a manner similar to that hereinbefore described in connection with the devices A³ and B³. The device C³ also comprises a contact 157 which is mounted between the contacts 158 and 159 and is so formed as to tend to move into engagement with the contact 158; the contacts 158 and 159 being so formed and arranged that when the contact 157 is moved from one to the other thereof said contact 157 will not break its connection with one of said coengaging contacts until it has established a connection with the other of said contacts. The insulating spacer 160 is secured to the free end of the contact 157 and extends into the path of the armature 149 so that when said armature is in attracted position the contact 157 will be held in engagement with the contact 159 and away from the contact 158.

*Repeating make and break mechanisms.*

The independent circuit controllers or contactors A⁴, B⁴ and C⁴, (see enlarged view shown in Fig. 7) which provide the repeating or make and break mechanism for the circuit panels 101, 102 and 103 respectively, each comprise an electromagnet 161 having an armature 162 arranged for cooperation with the front stop contact 163.

*Combined device F.*

The magnetically controlled combined repeating mechanism and retarded operative device F (enlarged view of which is shown in Fig. 7) comprises the controlling magnet 164 having a pivoted armature 165 together with escapement ledges 166 and 167 moving with said armature. An insulating cylinder 168 is mounted adjacent to the ledges 166 and 167, and the detent arm 169 is mounted for movement with said cylinder and arranged for engagement with said ledges, as hereinafter more fully explained.

Suitable driving mechanism (not shown) of any suitable well known type is provided for imparting to the cylinder 168 a tendency for clockwise rotation.

The contact pens 170 and 178 inclusive are suitably mounted adjacent to said cylinder so that the free ends thereof may be engaged by conducting plates carried upon the periphery of said cylinder.

The conducting plate 179 is so formed upon the cylinder 168 that when said cylinder is rotated said plate will connect the pens 170 and 171 throughout substantially the entire revolution of said cylinder but so that whenever said cylinder is so positioned that the arm 169 may be engaged by the ledges 166 or 167 said plate will not connect said pens. The plate 180 is secured to the periphery of the cylinder 168 in such relation to the pens 172 and 173 that said plate will connect said pens during the portion of the rotation of said cylinder when the pens 170 and 171 are connected by the plate 179, the form and arrangement of said plate 180 being such that the pens 172 and 173 will not be connected, during the rotation of the cylinder 168 from the normal position thereof, until the plate 179 has connected the pens 170 and 171 throughout a substantial portion of a revolution of the cylinder 168, and so that said plate 180 will cease to connect the pens 172 and 173 prior to the point in the rotation of the cylinder 168 when the plate 179 is withdrawn from engagement with the pens 170 and 171.

The plate 181 is mounted upon the periphery of the cylinder 168 in such relation to the pens 174 and 175 that when said cylinder is so positioned that the arm 169 may be engaged by either the ledge 166 of the ledge 167 said plate will connect said pens, and that during the rotation of the cylinder 168 immediately following the disengagement of the arm 169 from the ledge 167 said plate 181 will be withdrawn from engagement with the pens 174 and 175 and will not thereafter reengage said pens until said cylinder has rotated nearly to a point where the arm 169 may engage the ledge 166.

The plate 182 is secured to the periphery of the cylinder 168 in such position that the action thereof in relation to the pens 176 and 177 will be similar to the action of the plate 181 with relation to the pens 174 and 175, as just described. The plate 183 is secured to the periphery of the cylinder 168 in such relation to the plate 182 that when said plate 182 has been withdrawn from engagement with the pens 176 and 177 the further rotation of said cylinder will bring said plate 183 into engagement with the pens 177 and 178 and so that said plate 183 will be withdrawn from engagement with said pens before plate 182 is brought into engagement with the pens 176 and 177.

The ledges 166 and 167 and the arm 169 represent a typical form of escapement well understood by those skilled in this art whereby movement of the armature 165 from retracted to attracted position will withdraw the ledge 167 from the path of the end of the arm 169 arranged for engagement therewith and will carry the ledge 166 into the path of said end, so that the arm 169 and cylinder 168 will thereupon be permitted to rotate until the end of said arm may engage the ledge 166; and so that upon the subsequent movement of the armature 165 from attracted to retracted position the ledge 166 will be withdrawn from the path of the end of the arm 169, and said arm and the cylinder 168 will be permitted to rotate slightly so as to carry the cooperating end of said arm into engagement with the ledge 167.

A cam 184 is arranged for rotation with the cylinder 168 and for cooperation with the free end of the follower arm 185 so that when said cylinder and cam are rotated said arm will be moved downwardly and when said cylinder is so positioned that the arm 169 may be engaged by the ledges 166 or 167 said arm 185 will be allowed to move upwardly: the form of said cam being such that the rotation of the cylinder 168, which immediately follows movement of the ledge 167 out of engagement with the arm 169, will rapidly depress the arm 185 for a reason which will be hereinafter more fully explained.

The arm 185 is pivoted at 186 and is secured to a ratchet wheel 187 for cooperation with which a dog 188 is carried by an adjacent gear wheel 189, which gear wheel is mounted concentric with and for movement independently of said ratchet wheel 187. A pinion 190 and associated escapement wheel 191 and pallet 192 are driven by the gear 189 so as to suitably retard the movement thereof for a purpose which will be hereinafter more fully explained.

The lever 193 is secured to the arm 185 and has a spring 194 so applied thereto as to tend to so rotate said lever 193, and the ratchet wheel 187 around the pivot 186 as to carry the free end of the arm 185 into engagement with the cam 184.

The contacts 195 and 196 are mounted adjacent to the free end of the lever 193, the end of said contact 195 being disposed in the path of the free end of said lever and separated therefrom by the insulating spacer 197, and said contact 195 is so formed as to tend to move into engagement with said contact 196. Said contacts are so arranged with relation to the action of the cam 184 upon the arm 185 that when said arm is depressed by the initial operation of said cam immediately following the disengagement of the arm 169 from the ledge 167 the upward movement of the lever 193 will permit the contact 195 to move into engagement with the contact 196, and the retarding mechanism driven by the gear 189 is so arranged that, when the arm 185 has been depressed by the actuation thereof incident to one revolution of the cam 184, the movement of the lever 193 and parts moving therewith in response to the spring 194 will be so retarded that the contact 195 will not be moved away from the contact 196 until after the expiration of a period during which the cam 184 has remained at rest, which period is longer than the longest interval between the impulses incident to the formulation of any intended signal in circuits A, B or C.

*Initiating stations $A^5$ and $B^5$.*

The signal initiating stations $A^5$ and $B^5$ are serially connected in circuits A and B respectively. Such stations may be of any desired well known type, but, for the purpose of this description, and in order to better illustrate the capability of the repeater shown to enable non-interference and succession devices of such stations to efficiently perform their intended functions under all service conditions, such initiating stations will, for the purposes of this description hereinafter contained, be assumed to be of the so-called "perfect non-interference and succession" type ordinarily used in municipal fire alarm systems.

*Bells $A^6$ and $B^6$.*

The bells $A^6$ and $B^6$ shown serially connected in circuits A and B respectively, represent typical single stroke electromechanical bells arranged to sound upon each interruption of current flow in the circuit in which their electromagnets are connected.

*Initiating stations $C^5$ and bells $C^6$.*

The signal initiating stations $C^5$ represent typical code signaling mechanism arranged for operation in accordance with the disclosure of my Patent No. 1,520,394, dated Dec. 23rd, 1924, and the general arrangement of such circuit is in accordance with the disclosure of my copending application 428,969 filed December 7th, 1920, the bells $C^6$ being of a type similar to that described in connection with the bells $A^6$ and $B^6$, being responsive to signaling impulses of the circuit C but unresponsive to normal test current flow therein.

*Alarm circuit D.*

The alarm circuit D is connected to the pens 174 and 175 for control thereby and includes the typical alarm bells $D^6$. The alarm circuit E is connected to the pens 176, 177 and 178 and includes the alarm bells $E^6$ which bells are unresponsive to the normal test current flow through the path which includes the trouble relay 198 and resistance 199. Said circuit E being so arranged that when the cylinder 168 is normally positioned a current path is provided through all outside line conductors of said circuit E and through the bells $E^6$ serially connected therein, such current path including the relay 198 and the resistance 199 so that the current flow therein will be insufficient to cause effective energization of the electromagnets of the bells $E^6$, but sufficient to cause effective energization of the electromagnet of the relay 198, thus opening the contacts of said relay and thereby preventing the energization of the trouble bell 200 through the current path provided therefor from the trouble bell battery 201.

A trouble relay 202, resistance 203, trouble bell 204 and trouble bell battery 205 are similarly arranged in circuit C.

*Batteries.*

Main line batteries $A^7$, $B^7$, $C^7$, $D^7$ and $E^7$ are provided for the outside circuits A, B, C, D and E, respectively, and a local battery $F^7$ is provided for supplying local circuits which will be hereinafter more fully explained.

*Bus bar and wiring arrangement.*

The panels 101, 102 and 103 are each provided with the six bus bars 206 to 211 inclusive. Such bus bars are so positioned that when panels are assembled in their intended relationships ends of corresponding bus bars will be adjacently situated along contiguous edges thereof so as to facilitate correct and orderly coupling of the respective corresponding bus bars of the various sections.

As best shown by the enlarged view of Fig 7, on the panel of circuit A (and correspondingly on the panel of circuit B), one end of the winding of the electromagnet 130 is connected through conductor 212 to the terminal 104, the other end of said winding is connected through conductors 213 and 214 with the locking member contact 120, the conductors 215 and 216 connect the conductors 213 and 214 with the make and break mechanism armature 162, and conductor 217 connects the conductors 215 and 216 with the circuit restoring device contact 156. Conductors 218, 219 and 220 connect contact 119 with terminal 105, conductor 221 connects conductors 218 and 219 to the restoring device contact 153, and conductor 222 connects conductors 219 and 220 with the repeating make and break mechanism to stop contact 163.

On the panel of circuit C, the conductor 223 connects one end of the winding of the electromagnet 130 of the originating mechanism $C^2$ with the terminal 108, and the conductor 224 connects the other end of said winding to the contact 123. The conductors 225 and 226 connect contact 124 to terminal 109, and the conductor 227 connects the conductors 225 and 226 to the contact 159. The conductor 228 connects contact 125 to contact 157, the conductor 229 connects contact 158 to the armature 162 of the make and break mechanism $C^4$, and the conductor 230 connects the contact 163 to the terminal 110.

The bus bars 206 to 210 inclusive are continuous between opposite edges of the respective panels, and the adjacent ends of corresponding ones of said bus bars are connected by conductors 206', 207', 208', 209' and 210', respectively, so that said bus bars form continuous conductors across the group of panels employed in the repeater.

The windings of the electromagnets 161 of the make and break mechanisms A⁴, B⁴, and C⁴ are serially connected in the bus bars 211 of the respective panels upon which said mechanisms are mounted, and the adjacent ends of said bus bars are connected by the conductors 211' so as to provide a continuous current path across the group of panels employed in the repeater serially including the magnets 161 of the respective panels.

The conductor 231 connects one end of the current path of the bus bars 211 to bus bar 210, and the conductor 232 connects the other end of said bus bar current path to the pen 171 associated with cylinder 168. The conductors 233 and 234 connect pen 170 with one terminal of the battery F⁷, and the conductors 235, 236 and 237 connect the other terminal of said battery to the bus bar 210.

The conductors 238 and 239 connect conductors 235 and 236 to one end of the winding of the electromagnet 164 of the device F and the conductor 240 connects the other end of said winding to the bus bar 208.

The conductor 241 connects conductors 238 and 239 to contact 195, and the conductor 242 connects contact 196 to bus bar 206.

The conductor 243 connects conductors 233 and 234 to bus bar 207. The conductor 244 connects conductors 236 and 237 to pen 172, and the conductor 245 connects pen 173 to bus bar 209.

The local circuit wiring of panels 101 and 102 is identical, and one description will therefore suffice for both panels. (See enlarged view of Fig. 7.) The conductor 246 connects one end of the winding of the electromagnet 111 to the bus bar 206, and the conductor 247 connects the other end of said winding to contact 114. The conductors 248 and 249 connect contact 115 with contact 132, and the conductor 250 connects conductors 248 and 249 to contact 155.

The conductors 251 and 252 connect bus bar 207 to the arm 113, the conductors 253 and 254 connect conductors 251 and 252 to contact 118 and the conductor 255 connects conductors 253 and 254 to contacts 134 and 137.

The conductor 256 connects one end of the energizing circuit winding 147 of the magnet 146 to the contact 135 and the conductor 257 connects the other end of said winding to the bus bar 209. The conductor 258 connects contact 136 to contact 117, and the conductor 259 connects contact 116 to stop 151. The conductor 260 connects contact 133 to arm 150, and the conductor 261 connects stop 152 to armature 112.

The conductor 262 connects one end of the holding circuit winding 148 to the armature 149, and the conductor 263 connects the other end of said winding to the bus bar 210. The conductor 264 connects the armature 131 to the bus bar 208.

The local circuit wiring of panel 103 is the same as that of panels 101 and 102 except as follows: Instead of the conductors 248 and 249 connecting contact 115 with contact 132, the conductors 248' and 249' connect contact 115 with contact 133; the conductor 250' connects conductors 248' and 249' with contact 155; instead of the conductor 255 connecting conductors 253 and 254 to contacts 134 and 137, the conductor 255' connects conductors 253 and 254 to contact 140; the conductor 256' connects one end of winding 147 of magnet 146 of the restoring device C³ to contact 140; instead of the conductor 258 connecting contact 136 to contact 117, the conductor 258' connects contact 142 to contact 117; instead of the conductor 260 connecting contact 133 to arm 150, the conductor 260' connects contact 132 to arm 150; the conductor 270 connects conductor 256' to contact 143; the conductor 271 connects contact 144 to contact 127; the conductor 272 connects contact 126 to conductor 254; and the conductor 273 connects contact 128 to contact 139.

*Normally effective current paths of embodiment of Fig. 1.*

The armatures and other moving parts are shown in their respective normal positions, and it will therefore be apparent that current paths are normally established as follows:—

In circuit A, from terminal 104 through the outside circuit A and battery A⁷ to terminal 105, thence through conductors 220, 219 and 218 to and through contact 119, to and through contact 120, thence through conductors 214 and 213 to one end of the winding of the electromagnet 130, thence through said winding and from the other end thereof through conductor 212 to the terminal 104; thus causing the effective energization of the electromagnet 130 and thereby holding the armature 131 in its attracted position.

In circuit B, the normal current path corresponds with that just described for circuit A, and therefore need not be here repeated.

In circuit C, the normal current path extends from one terminal of battery C⁷, through conductor 265 and each of the bells C⁶ and one set of the normally closed contacts of each of the initiating stations C⁵ and the conductor 266 to an end of the resistance 203, thence through said resistance to and through the winding of the magnet of the trouble relay 202 to and through the conductor 267 and the other set of normally closed contacts of each of the initiating stations $C^5$ to the terminal 109, thence through conductors 226 and 225 to and through contact 124, to and through contact 123, thence through conductor 224 to and through the winding of magnet 130, thence through conductor 223, terminal 108 and conductor 268 to the other terminal of the battery $C^7$, thus effectively energizing the magnet of the trouble relay 202 but not effectively energizing the magnet 130.

Signals initiated by the stations $C^5$ are formulated by first interrupting the normal path just described and thereafter establishing a series of connections, each of comparatively short duration, between the portion of the conductor 265 extending from the active station toward the battery $C^7$ and the portion of the conductor 267 extending to the terminal 109; thus initially breaking the current path through the relay 202 and thereafter repeatedly establishing a current path which, because it excludes such relay and the resistance 203, will cause such current flow through the winding of the magnet 130 of the originating mechanism $C^2$ as to cause the armature 131 associated therewith to move to abnormal or attracted position.

It is believed that the normal current path of circuits D and E will be obvious from an inspection of the drawing and same will therefore not be herein described in detail.

The local circuits are normally deenergized, as no completed current paths are provided between the terminals of battery $F^7$ when the various parts occupy their respective normal positions as shown by the drawing.

*Detailed description of operation of embodiment of Fig. 1 responsive to signal from circuit A.*

The operation of the repeater shown in Figs. 1 and 7, in connection with circuits as herein shown, is as follows:

Assuming that the various parts and current paths are normally conditioned as hereinbefore just described, should the formulation of a signal be initiated by one of the stations $A^5$, upon the first signaling impulse (interruption) of the circuit A incident to the formulation of such signal the bells $A^6$ will sound and the magnet 130 will be deenergized, whereupon the armature 131 will leave the front contact 132 and move into engagement with the back contact 133, thereby permitting the contacts 134 and 136 to move into engagement with the contacts 135 and 137 respectively, of the originating mechanism $A^2$. Upon such movement of the armature 131 and its associated contacts, a current path for the electromagnet 164 of the device F will be established as follows: from one terminal of the battery $F^7$, through conductors 235, 238 and 239 to and through the winding of electromagnet 164, through conductor 240, bus bars 208 of panels 103, 102 and 101, and their associated conductors 208' to and through conductor 264 to the armature 131 of said originating mechanism $A^2$, thence through said armature to the back contact 133, through conductor 260 and arm 150 to and through contact 152 and conductor 261 to and through the armature 112 and arm 113, through conductors 252 and 251 to and through bus bar 207 of panel 101, thence through conductors 207' and bus bars 207 of panels 102 and 103, through conductors 243 and 234 to the other terminal of said battery $F^7$. As a result the establishment of the current path just described, the magnet 164 will be effectively energized and armature 165 will be moved to attracted position, thereby withdrawing the ledge 167 from the path of the coengaging portion of the arm 169, whereupon the cylinder 168 will rotate and thereby effect other circuit changes in the following order:

The plate 179 will connect the pens 170 and 171, the cam 184 will act upon the arm 185 and lever 193 so as to sufficiently withdraw such lever from the path of the contact 195 to permit said contact to move into engagement with the contact 196, the plates 181 and 182 will be withdrawn from engagement with the pens 174 and 175, and 176 and 177, respectively, the plate 183 will be brought into engagement with the pens 177 and 178, the plate 180 will be brought into engagement with the pens 172 and 173, the plate 183 will be withdrawn from engagement with the pens 177 and 178, the plates 181 and 182 will be brought into engagement with the pens 174 and 175, and 176 and 177, respectively, the plate 180 will be withdrawn from engagement with the pens 172 and 173, the plate 179 will be withdrawn from engagement with the pens 170 and 171, the cam 184 will have acted through the arm 185 to move the lever 193 away from the contact 195 a maximum intended travel and the dog 188 engaged the ratchet wheel 187 to retard the movement of the parts associated therewith in response to the tension of the spring 194, and the rise of said cam will have been withdrawn from the path of the end of the arm 185 so as to permit said arm and the parts moving therewith to be restored to normal position, and thereupon the end of the arm 169 will be engaged by the ledge 166.

Upon the engagement of the pens 170 and 171 by the plate 179, as just described, an operating current path will be established for the electromagnets of the contactors or make and break mechanisms A⁴, B⁴ and C⁴ as follows: from one terminal of the battery F⁷, through conductors 235, 236 and 237 to and through bus bars 210 and conductor 210' to and through conductor 231, to and through bus bars 211 and electromagnets 161 of panels 101, 102 and 103, the conductors 211' therebetween, to and through conductor 232 and to and through pen 171, plate 179 and pen 170, thence through conductors 233 and 234 to the other terminal of said battery F⁷. Upon the establishment of an operating current path for the contactors A⁴, B⁴ and C⁴ the electromagnets 161 of said contactors will be effectively energized and the armatures 162 thereof will move into engagement with the stop contacts 163 respectively associated therewith, thus establishing shunt current paths around contacts 119 and 120 so that neither the alarm bells B⁶ or the magnet 130 will be affected by the separation of these contacts pending the retraction of armatures 162, the paths for the circuits A and B being as follows: from the junction of conductors 219 and 220, through conductor 222, contact 163, armature 162, conductors 216 and 215, to the junction of conductors 213 and 214; thereby shunting the normal current path from conductor 220, through conductors 219 and 218, contacts 119 and 120, and conductor 214, to conductor 213. The movement of the armature 162 of the contactor C⁴ into engagement with the stop contact 163 associated therewith extends the previously existing path from the junction of conductors 265 and 266, through conductor 269, terminal 110 and conductor 230 to the contact 163, where such path is normally open through armature 162, conductor 229, contacts 158 and 157 and conductor 228 to the contact 125, which is at this time, separated from its co-operating contact 123.

The movement of contact 195 incident to the rotation of the cylinder 168, as just described, is so timed with relation to the engagement of the plate 179 with the pens 170 and 171 that the contactors A⁴, B⁴ and C⁴ will have closed their contacts, as just described, before the contact 196 is engaged by contact 195 and thereby establishes an actuating current path for the electromagnets of the locking members or circuit-changing devices A¹, B¹ and C¹ as follows: from one terminal of the battery F⁷, through conductors 235, 238 and 241, to and through contacts 195, and 196, thence through conductor 242 to the bus bars 206 and the conductors 206' therebetween; from the bus bars 206, multiple branch paths extend through the respective panels, such multiple branch path through panel 101 being interrupted because the armature 131 of said panel is in its abnormal position while such multiple paths are established in panels 102 and 103 as follows: in panel 102, from bus bar 206, through conductor 246, winding of electromagnet 111, conductor 247 and contact 114 to contact 115, thence through conductors 248 and 249 to contact 132, thence through armature 131 and conductor 264 to bus bar 208 where such multiple path of panel 102 joins the multiple path of panel 103 which extends in said panel through conductor 246, winding of electromagnet 111, conductor 247 and contact 114 to contact 115, and thence through conductors 248' and 249' to contact 133, thence through armature 131, conductor 264 and bus bar 208 of said panel 103, and conductor 208'; to bus bar 208 of panel 102,—from the bus bar 208 of panel 102 such multiple current paths of panels 102 and 103 pass through conductor 208' and bus bar 208 of panel 101 thence through conductor 264, and retracted armature 131 to contact 133, thence through conductor 260, and arm 150 to back contact 152, thence through conductor 261 and armature 112 to arm 113, thence through conductors 252 and 251 to bus bar 207 of said panel 101, thence through interconnecting conductors 207' and bus bars 207 of panels 102 and 103, and through conductors 243 and 234 to the other terminal of said battery F⁷.

Upon the establishment of current flow through the electromagnets 111 of panels 102 and 103, as just described, the armatures 112 associated with said magnets will be moved to attracted position and, during such movement, a locking current path will be established for the locking members of said panels which locking path will be identical with the actuating path just described from the first named terminal of the battery F⁷ to the contacts 114 of said locking members, from which contact said locking path will be completed through the arm 113, conductors 252 and 251 to the bus bars 207 of said panels and thence through the conductors 243 and 234 to the other terminal of said battery.

Inasmuch as the attractive movement of the armature 112 first causes the arm 113 to engage the contact 114 and thereafter causes said arm to move said contact away from the contact 115 it is evident that the locking path just described will be established and immediately thereafter the actuating path just previously described will be interrupted; and that the armatures 112 of the locking members B¹ and C¹ will therefore remain in attracted position regardless of subsequent interruptions of the actuating path hereinbefore described, such as will result from succeeding movements of the moving device or armature 131 of the originating mechanism A².

Upon the movement of the contact 119 away from the contact 120 incident to the attractive movement of the armature 112 of the locking member $B^1$ just described, the normal current path of the circuit B through said contacts will be broken, but the current flow of said circuit will nevertheless be maintained because of the closure of the contacts of the make and break mechanism $B^4$ and the establishment of a shunt current path therethrough as hereinbefore more fully described. Upon the movement of the contact 123 into engagement with the contact 125 and away from the contact 124 incident to the attractive movement of the armature 112 of the locking member $C^1$ just described, the normal current path of circuit C will be interrupted and a revised current path established as follows: from one terminal of the battery $C^7$, through conductor 265, the bells $C^6$, and one of the normally closed current paths through the initiating stations $C^5$, to and through the conductor 269, the terminal 110 and the conductor 230 to the contact 163, thence through the armature 162, the conductor 229, the contacts 158 and 157 and the conductor 228, to and through the contacts 125 and 123, the conductor 224, the winding of electromagnet 130, the conductor 223, the terminal 108 and conductor 268 to the other terminal of said battery $C^7$. Inasmuch as such current path excludes the resistance 203 and the winding of the magnet of the relay 202, the portion of the circuit C included in this current path will be traversed by a current of such intensity as will effectively energize electromagnet 130 of the originating mechanism $C^2$ as well as the electromagnets of the bells $C^6$, thereby causing said bells to sound, and the armature of the relay 202 will move to retracted position and thereby cause the trouble bell 204 to sound.

The sounding of the bells $C^6$, just referred to, will serve as an audible manifestation of the first stroke of the code signal of the acting station $A^5$; and the concurrent sounding of the trouble bell 204, just referred to, will serve as an audible indication of the fact that the circuit C is abnormally conditioned. Such bell 204 will sound because of current flow therethrough from the source 205 resulting from the retractive movement of the armature of relay 202.

Upon the withdrawal of the plate 181 from engagement with the pens 174 and 175 the current path of circuit D will be interrupted and the bells $D^6$ will sound, thereby audibly manifesting the first stroke of the code signal of the active station $A^5$. Upon the withdrawal of the plate 182 from engagement with the pens 176 and 177 the normal test current path of circuit E will be interrupted and the contacts of relay 198 will thereupon close and thus cause trouble bell 200 to sound, thus affording an audible indication of the abnormal conditioning of the circuit E. When the plate 183 engages the pens 177 and 178 a revised current path will be established for the circuit E, which path excludes the resistance 199 and the winding of the electro-magnet of the trouble relay 198 and therefore permits sufficient current flow to cause the bells $E^6$ to sound, such sounding of the bells $E^6$ affording an audible manifestation of the first stroke of the code signal of the active station $A^5$. When the plate 183 is withdrawn from engagement with the pens 177 and 178 and the plate 182 is again brought into engagement with the pens 176 and 177 the normal test current path of circuit E will be reestablished, and when the plate 181 reengages the pens 174 and 175 the normal current path of circuit D will be reestablished. When the rotation of the cylinder 168 has continued subsequent to the movement of the contact 195 into engagement with the contact 196 for a period sufficient to permit responsive action of the locking members and the moving devices of the originating mechanism $C^2$ as hereinbefore described, the plate 180 will be brought into engagement with the pens 172 and 173 and will thereby establish an energizing current path for restoring device electromagnet as follows: from one terminal of the battery $F^7$ through conductors 235, 236 and 244 to pen 172, thence through plate 180, pen 173, and conductor 245 to the bus bars 209 of the various panels as connected by the conductors 209', thence, in panel 101, through conductor 257 and winding 147 of electromagnet 146 and through conductor 256, contacts 135 and 134, conductors 255, 253 and 251 to bus bar 207, thence through bus bars 207 of the respective panels and their interconnecting conductors 207' through the conductors 243 and 234 to the other terminal of the battery $F^7$. It will be noted that the corresponding current path of panel 102 is interrupted between contacts 134 and 135 and that the corresponding current path of panel 103 is similarly interrupted between contacts 139 and 140 because the armatures 131 of said panels are in attracted position.

Upon establishment of the energizing current path through the winding 147 of the electromagnet of the restoring device $A^3$ just described, the armature 149 of said device will move into engagement with the stop 151 and will thereby establish a holding current path for said electromagnet as follows: from one terminal of the battery $F^7$, through conductors 235, 236 and 237, the bus bars 210 of the respective panels and their interconnecting conductors 210' and through conductor 263 to the holding circuit winding 148 of said electromagnet, thence through said winding and through conductor 262 to and through armature 149 and contact 151, through conductor 259 and contacts 116 and 117, through conductor 258 and contacts 136 and 137, through conductors 255, 253 and 251, through bus bars 207 and their interconnecting conductors 207' and through conductors 243 and 234 to the other terminal of said battery.

Upon the withdrawal of the plate 180 from engagement with the pens 172 and 173 the energizing current path just described will be interrupted, but the armature 149 of the restoring device A³ will thereafter be maintained in attracted position by the current flow through the holding current path just described.

When the armature 149 of the restoring device A³ moved into engagement with the stop contact 151, as just described, it carried the arm 150 out of engagement with the stop contact 152 and thereby interrupted the electromagnet current path for the device F, hereinbefore described, and this caused deenergization of the electromagnet 164 and permitted the armature 165 to move away from said magnet and to carry the ledge 167 into the path of the end of the arm 169.

Upon comparatively slight additional rotation of the cylinder 168 following the withdrawal of the plate 180, from the pens 172 and 173 the plate 179 will be withdrawn from engagement with the pens 170 and 171, and the electromagnets 161 of the make and break mechanisms A⁴, B⁴ and C⁴ will thereupon be deenergized and the contacts of said mechanism will thereupon open.

Upon the opening of the contacts of the make and break mechanisms, as just described, the current flow in circuits B and C is interrupted, thus deenergizing the bells B⁶ and C⁶ and thereby causing the bells B⁶ to sound.

When the circuit A is now closed incident to the operation of the active one of the initiating stations A⁵ therein, the normal current path of said circuit will be reestablished and the electromagnet 130 will be energized and cause its armature 131 to move to attracted position. Incident to such movement of the armature 131 the contact 136 associated therewith will be moved away from its cooperating contact 137 thereby interrupting the holding path hereinbefore described and causing deenergization of the electromagnet 146 the armature 149 of which will thereupon move to retracted position.

*Upon the next succeeding break of circuit A incident to the operation of the active initiating station A⁵ therein, the bells A⁶ will sound and the originating magnet 130 will be deenergized thereby permitting its armature 131 to move to retracted position. Upon the completion of such retractive movement of said armature 131 the electromagnet current path for the device F will be again established, as hereinbefore more fully explained; the magnet 164 will be energized, the armature 165 will move to attracted position and thereby carry the ledge 167 out of the path of the arm 169, and the cylinder 168 will make another revolution. During such revolution the operating current path for the contactors A⁴, B⁴ and C⁴ will be again established, and the contacts thereof will again close, thus establishing a current path therethrough for circuits B and C, thus causing the bells C⁶ to again sound and thereby afford an audible manifestation of the second stroke of the active station A⁵; and upon the subsequent interruption of said operating current path the circuits B and C will again break, all as hereinbefore more fully described, thus causing the bells B⁶ to again sound, for a like purpose. The bells C⁶ D⁶ and E⁶ will also be caused to sound, for like purpose in the manner hereinbefore more fully described.

During such second rotation of the cylinder 168 the energizing and holding current paths of the restoring device A³ will be altered through the succession of steps hereinbefore more fully described, so that the armature of said device will be moved to attracted position and there held until the armature 131 of the originating mechanism A² is again moved to attracted position, and such movement of the armature 149 will again interrupt the electromagnet current path of the device F, as hereinbefore more fully described.

Upon succeeding signaling impulses of the circuit A the cycle of operation just described will be repeated, so that incident to each break of circuit A the bells A⁶, B⁶, C⁶, D⁶ and E⁶ will sound.

Throughout the operation of the repeater in response to such a signal from the circuit A, it is evident that the locking current path for the locking members B¹ and C¹ will be maintained by the continued engagement of the contact 196 by the contact 195; inasmuch as the lever 193 will be moved away from the contact 195 incident to each rotation of the cylinder 168, and the retarding effect of the gearing upon the movement of the lever 193 toward contact 195 is such as to prevent said lever from acting to move said contact 195 away from the contact 196 until a time has elapsed during which the cylinder 168 has not rotated, which time is longer than the longest interval between impulses incident to the formulation of any signal of the initiating stations A⁵, B⁵ or C⁵.

When, however, the signal is completed, in response to which circuit A has been acting as hereinbefore described, unless the formulation of another signal in said circuit is sooner initiated, the lever 193 will move in response to the spring 194 until the free end of said lever moves the contact 195 away from the contact 196.

Should the formulation of a second signal be initiated in circuit A before the termination of such a period following the conclusion of the signal first formulated in said circuit, the various parts will act in a manner corresponding to that in which they acted in response to succeeding impulses of the first signal, as hereinbefore more fully described.

When the contact 195 is moved away from the contact 196, as just described, the locking paths for the electromagnets of the locking members $B^1$ and $C^1$ will be thereby interrupted, and the armatures 112 of said members will move to retracted position. Incident to such retractive movement of said armatures the contact 119 of locking member $B^1$ will move into engagement with the contact 120 associated therewith, and will thus reestablish the normal current path of circuit B; and the contact 126 will move into engagement with contact 127 and away from contact 128, and will thus reestablish the normal current paths of circuits B and C respectively.

It is evident that the final closure of circuit A, following the formulation of a signal therein, will cause the reenergization of electromagnet 130 of the originating mechanism $A^2$, whereupon the armature 131 associated therewith will move to attracted position and the armature 149 of the restoring device $A^3$ will move to retracted position, as hereinbefore more fully described. Although such final closing of circuit A will ordinarily occur prior to the movement of the contact 195 away from the contact 196, it is evident that the action of the various parts in response to the resultant attractive movement of the armature 131 will be the same regardless of whether the final closure of said circuit A occurs previously to, coincident with or subsequent to said movement of the contact 195 away from the contact 196. Should the formulation of a signal be initiated by any one of the stations $B^5$, at a time when the various current paths are normally conditioned, as hereinbefore described, the action of the various parts would be similar to that in response to a signal from one of the stations $A^5$, as already described, except that the foregoing descriptions of the actions of the instrumentalities of panels 101 and 102 would be transposed.

*Detailed description of operation of embodiment of Fig. 1 responsive to signal from circuit C.*

As hereinbefore stated, the formulation of code signals by the stations $C^5$ is preceded by interruption of the normal current path of the circuit C, and is accomplished by establishing a series of connections, one for each signaling impulse or stroke, between the portion of the conductor 265 extending from the active station toward the battery $C^7$ and the portion of the conductor 267 extending to the terminal 109; hence, should the formulation of a signal be initiated by one of the stations $C^5$, at a time when the various parts and current paths are normally conditioned, upon the first signaling impulse incident to the operation of such signaling station, the normally closed independent paths normally maintained through such stations for the conductors 265 and 267 will be interrupted and the portion of the conductor 265 extending toward the battery $C^7$ will be connected with the portion of the conductor 267 extending to the terminal 109, thus breaking the current path through the relay 202 and establishing a current path which excludes such relay and the resistance 203. Upon such interruption of the normal current path of the circuit C the contacts of the relay 202 will close and the bell 204 will sound, and upon the establishment of such revised current path there will be a current flow through the bells $C^6$ and through the magnet 130 of the originating mechanism $C^2$ such as will cause effective response thereto, the course of such current path being as follows: from one terminal of the battery $C^7$, through conductor 265 and the bells $C^6$ to the active station $C^5$, thence through the conductor 267 to the terminal 109, through conductors 226 and 225 to and through contacts 124 and 123, thence through conductor 224, winding of electromagnet 130, conductor 223, terminal 108 and conductor 268 to the other terminal of the battery $C^7$.

Upon the effective energization of the electromagnet 130 of panel 103 in response to current flow through the path just described, its armature 131 will move into engagement with its contact 132 and will thereby close a current path for the electromagnet 164 of the device F, which path will extend from the bus bar 208, through the conductor 264, armature 131, contact 132, conductor 260', to the arm 150, and thence through the contact 152 and conductor 261 through the remainder of a current path corresponding to that established by retractive movement of the armature 131 of the originating mechanism $A^2$ as hereinbefore more fully described. As a result of the establishment of the current path just described, the cylinder 168 will be released and its rotation will cause circuit changes such as those hereinbefore more fully described, whereby an operating current path will be established for the electromagnets of the contactors $A^4$, $B^4$ and $C^4$, and the armatures 162 thereof will move into engagement with the stop contacts 163 respectively associated therewith, and the electromagnets 111 of the circuit changing devices A¹ and B¹ will be energized, and circuits A and B will be interrupted in the manner more fully set forth in the foregoing description of the action of circuit B in response to a signal initiated by circuit A, and the circuits D and E will similarly respond to the rotation of the cylinder 168. When the plate 180 connects the pens 172 and 173 during the rotation of the cylinder 168 just referred to, an energizing current path will be established for the restoring device C³ as follows: from one terminal of the battery F⁷, through conductors 235, 236 and 244 to pen 172, thence through plate 180 and pen 173, through conductor 245, bus bar 209, conductor 257 and the winding 147 of the electromagnet 146, through conductors 256' and 270 to contact 143, thence through contact 144, and conductor 271 to contact 127, thence through contact 126 and conductors 272, 254, 253 and 251, bus bar 207 and conductors 243 and 234 to the other terminal of said battery F⁷.

Upon establishment of the energizing current path just described, the armature 149 of the device C³ will move into engagement with its coengaging stop contact 151 and thereby establish a holding path for its electromagnet 146 as follows: from one terminal of the battery F⁷, through conductors 235, 236 and 237, through bus bar 210 and conductor 263 to the winding 148 of said electromagnet, thence through said winding and through conductor 262 to and through the armature 149 and contact 151, through conductor 259 to contact 116, thence through contact 117 and conductor 258' to contact 142, thence through contact 141 and conductors 255, 253 and 251, bus bar 207 and conductors 243 and 234 to the other terminal of said battery F⁷.

From the foregoing it will be evident that the action of the armature 149 of the restoring device C³ while the circuit C is controlling the repeater will correspond to that of the armature 149 of the restoring device A³ when the circuit A is controlling the repeater, as hereinbefore more fully described, in that said armature 149 of the device C³ will move to abnormal position whenever the armature 131 of the originating mechanism C² has moved to its abnormal position and that said armature 149 will thereafter be maintained in abnormal position until said armature 131 is restored to its normal position whereupon said armature 149 will be likewise restored.

Incident to subsequent signaling impulses of the circuit C during the formulation of a signal therein, the bells A⁶, B⁶, C⁶, D⁶ and E⁶ will be caused to act in a manner corresponding to that in which said bells were caused to act incident to signaling impulses in circuit A, as hereinbefore more fully described; and after the conclusion of the formulation of such a signal in circuit C the various parts and current paths will be similarly restored to their respective normal conditions.

*Detailed description of operation of embodiment of Fig. 1 responsive to signals from circuits A and B.*

Should the formulation of signals be initiated by two or more circuits, (as, for example, by one of the stations A⁵ and one of the stations B⁵) so that the initial signaling impulses of such circuits are substantially simultaneous, the bells of such simultaneously acting circuits will sound and the moving devices 131 of the originating mechanisms of such circuits will move in response to such impulses from their normal to their abnormal positions; thereby jointly acting to establish the current path for the electromagnet 164 of the device F hereinbefore more fully described. The resultant rotation of the cylinder 168 will cause responsive action of the circuits other than those so simultaneously acting, as hereinbefore more fully explained, but the electromagnets 111 of the locking members of such simultaneously acting circuits will not be energized, as the armatures of the originating mechanisms associated therewith will now be abnormally positioned. For want of a better term, moving devices 131 of originating mechanisms which are acting in response to signaling impulses formulated in their associated circuits outside of the repeating mechanism, as, for example, under the circumstances just described, will be hereinafter referred to as "busy moving devices."

Upon the occasion of succeeding signaling impulses of such simultaneously acting circuits, the responses of the repeater, and therefore of circuits other than those so simultaneously acting will be the same as those which would occur were but one of such circuits acting alone, so long as such impulses are substantially simultaneous. Inasmuch as the signals formulated by different initiating stations are rarely identical, it is evident that a signaling impulse incident to one or another of such signals will eventually precede that of the other or others. Assuming, for example, that the circuits A and B have closed at or about the same time during the formulation of signals therein by closed type break-wheels and that, thereupon, the circuit B breaks while the circuit A remains closed; it is evident that when the armature 131 of the originating mechanism B² moves to retracted position in response to such break, the corresponding armature of the originating mechanism $A^2$ will remain in attracted position. The movement of the armature 131 of the originating mechanism $B^2$ to retracted position will establish a current path for the electromagnet 164 of the device F as hereinbefore described, and such magnet will thereupon be effectively energized and move its armature 165 to attracted position, thereby withdrawing the ledge 167 from the path of the coengaging portion of the arm 169, whereupon the cylinder 168 will commence to rotate and thereby move the plate 179 into engagement with the pens 170 and 171; thus establishing an operating current path for the electromagnets of the contactors $A^4$, $B^4$, and $C^4$, the armatures 162 of which will thereupon move into engagement with the stops 163 respectively associated therewith. Such retractive movement of the armature 131 of the originating mechanism $B^2$ will also serve to establish an actuating current path for the electromagnet 111 of the locking member $A^1$ as follows: from one terminal of the battery $F^7$, through conductors 235, 238 and 241 to the contact 195 (which contact had previously moved into engagement with the contact 196 upon the commencement of such concurrent signals and had subsequently remained in engagement therewith) thence through contact 196, conductor 242, bus bars 206 and their interconnecting conductors 206′ to the conductor 246 of panel 101, thence through said conductor and through the winding of electromagnet 111, through conductor 247 and contacts 114 and 115, through conductors 248 and 249 to contact 132 of originating mechanism $A^2$, thence through armature 131 of said mechanism and conductor 264, to bus bar 208, thence through said bar, interconnecting conductor 208′, and bus bar 208 and conductor 264 of panel 102, to the retracted armature 131 of the originating mechanism $B^2$, thence through said armature 131 and contact 133, through conductor 260, arm 150, stop 152, conductor 261, armature 112, arm 113, and conductors 252 and 251, to bus bar 207, thence through interconnecting conductors 207′ and bus bars 207 of the other panels, and through conductors 243 and 234, to the other terminal of the battery $F^7$. Upon the establishment of such actuating current path for the electromagnet 111 of the locking member $A^1$, said member will act to place the circuit A in control of the contactor $A^4$, and the circuit A will therefore be interrupted at said contactor when the magnet 161 thereof is deenergized because of the withdrawal of the plate 179 from engagement with the pens 170 and 171, incident to the continued rotation of the cylinder 168. It is therefore evident that if the active initiating station $A^5$ is equipped with effective non-interference mechanism the control of the circuit A will be surrendered to the repeater by such station and the signal of the controlling station $B^5$ will be correctly manifested by the bells $A^6$ notwithstanding the fact that one of the stations $A^5$ initially controlled the circuit A coincidentally with the control of the circuit B by one of the stations $B^5$.

It will be apparent that if the active initiating station $A^5$ is equipped with succession mechanism, as well as non-interference mechanism, such station will continue to act to test for the control of the circuit A, from time to time, in a manner such as is well understood by those skilled in this art, and that when the repeater relinquishes control of circuit A subsequent to the conclusion of the signal of the active station $B^5$, such active station $A^5$ will find the circuit A in normal condition for a period longer than the longest interval during which any circuit is in normal condition during the formulation of a signal therein, and such station $A^5$ will thereupon formulate its signal and the repeater will respond thereto in the manner hereinafter more fully described.

It would appear that there is a remote theoretical possibility that under conditions of concurrent initiating activity of two circuits, such as the circuits A and B, one of such circuits may be interrupted by its active initiating station slightly prior to a corresponding break in the other of such circuits, so that the repeater would relinquish control of and suspend responsiveness to one of such circuits while remaining responsive to the other of such circuits. It would appear from tests which have been made that the ordinary lag of the electromagnets of the various devices will be sufficient to prevent the actual development of this condition, as it can only occur when the circuit to be so relinquished remains closed long enough to permit the armature 112 of its locking member to move to attracted position and is thereafter interrupted soon enough to permit the armature 131 of its originating mechanism $A^2$ to move to retracted position in time to permit effective energization of the magnet 146 of the circuit restoring device $A^3$ to cause its associated armature 149 to move to attracted position before the plate 180 is withdrawn from engagement with the pens 172 and 173. Even assuming that such an action took place during the concurrent formulation of signals in circuits A and B, as hereinbefore described, whereupon circuit A was interrupted at the exact critical instant best suited to produce such a result following a previous interruption of circuit B, and further assuming that the various magnets and their armatures acted in such sequence as to isolate circuit A from control by or of the repeater, the bells $A^6$ would nevertheless correctly respond to the complete signal of the active station $A^5$ and the bells $B^6$, $C^6$ and $D^6$ and $E^6$ would correctly respond to the complete signal of the active station $B^5$.

Relationship of functions of embodiment of Fig. 1 to break wheels of initiating stations.

The form of repeater exemplified by Fig. 1 is arranged for operation with maximum efficiency in connection with non-interference and succession initiating stations of the so-called "closed break-wheel type"; i. e. those which produce circuit interruptions of substantially uniform duration and circuit closures of a duration varying with the interval between succeeding signaling impulses, and it is therefore evident that in response to concurrent signal formulations such as those just described, the action of the repeater and the response of the various bells will be as stated. Should initiating stations be employed in connection with such a repeater which have so-called "open type break-wheels"; i. e. those arranged to produce closed circuit periods of uniform duration separated by open circuit periods of a duration varying with the pauses between intended strokes of the signal, a condition might develop in which the repeater might act to close an initiating circuit at a time when said circuit was held open by an active initiating station therein.

For example, assuming the code number 25 for the active station $A^5$ and the code number 31 for the active station $B^5$, it is evident that when the repeater acted in response to the third impulse of the signal of station $B^5$, the circuit A would be held open by the active station $A^5$, and it would therefore be necessary for the repeater to relinquish control of the circuit A in order to avoid the formulation of an objectionably false signal therein. In the event of the establishment of conditions as just described, it will be seen that the armature 131 of the originating mechanism $B^2$ will move from attracted to retracted position after the third impulse of the signal formulation in circuit B, and that the armature 131 of the originating mechanism $A^2$ will be in retracted position and the armature 149 of the restoring device $A^3$ will be in attracted position. An actuating current path will therefore be established for the electromagnet 111 of the locking member $A^1$ as follows: from the battery $F^7$ to and through the winding of the electromagnet 111 of said locking mechanism through the path hereinbefore described, thence through conductor 247, contacts 114 and 115, conductors 248 and 250, contact 155 and arm 150, conductor 260, contact 133, armature 131 and conductor 264 to bus bar 208, and thence to the retracted armature 131 of originating mechanism $B^2$ through the path hereinbefore described to the other terminal of the battery $F^7$. As a result of the establishment of the current path just described, the armature 112 of the locking member $A^1$ will move to attracted position and thereby move the contact 116 into engagement with the contact 118 so as to thereafter insure the maintenance of the locking current path of the magnet 146 of the restoring device $A^3$ throughout the remainder of the formulation of the signal of circuit B as hereinbefore more fully explained.

The signal of the actuating station $A^5$ will therefore be completely and correctly responded to by the bells $A^6$ and the signal of the actuating station $B^5$ will be completely and correctly responded to by the bells $B^6$, $C^6$, $D^6$ and $E^6$.

If the time required for the formulation of the signals of initiating stations of the various circuits does not vary to a substantial extent, it is evident that there will be no overlapping of concurrent signals under any of the conditions thus far described, because the non-interference mechanisms of the various initiating stations will prevent such stations acting to commence the formulation of a signal in any initially inactive circuit after the first impulse of a controlling signal; and concurrent signal transmission will therefore be confined to instances in which signals are initiated at or about the same time. Should the operative speed of initiating stations of different circuits be such that the complete transmission of the signal of any one of such stations requires a time substantially longer than that required by any other of such stations, should the control of the circuit of a station requiring a comparatively long period for the transmission of its signal be relinquished by the repeater at a time when said repeater is controlled by a circuit acting in response to an initiating station requiring a comparatively short period for the transmission of its signal, it is evident that the contact 195 will be moved away from the contact 196 by the action of the device F subsequent to the completion of the signal in the controlling circuit, and that thereafter such repeater will respond to signaling impulses formulated in the previously non-controlling circuit, with the result that a fragmentary and therefore objectionably false signal may be responded to by the repeater and the various circuits controlled thereby, after the completion of the response thereof to the initially controlling circuit.

In view of the general operating scheme of the circuit C, it is evident that the non-interference problem between two or more of such circuits, or between such a circuit and a circuit such as the circuits A or B, is somewhat different than that between one and another of such circuits as the circuits A and B; and it will also be seen that, to obtain best results in connection with a repeater such as that exemplified by Fig. 1, the initiating stations of a circuit such as the circuit C should be arranged for so-called "open type break-wheel" operation. In view of the preceding description of the relative functioning of circuits A and B, it is believed that those skilled in this art will be able to understand the relative functioning between concurrently active circuits such as the circuit C, or between a circuit such as the circuit C and a circuit such as the circuits A and B; for this reason such activity will not be herein explained in detail.

Response of embodiment of Fig. 1 to broken circuit.

Should the circuit A be interrupted, as by the breaking of one of the line conductors therein, the bells $A^6$, $B^6$, $C^6$, $D^6$, $E^6$, 200 and 204 will sound as a warning that such a break has occurred, the restoring device $A^3$ will act to render the magnet 164 unresponsive to the retracted condition of the originating mechanism armature 131 of such circuit and, after the elapse of a suitable period of time the contact 195 will be moved away from the contact 196 thereby restoring the circuits B and C to normal condition.

While the repeater is conditioned, as just described, it is evident that the repeater will act in response to the formulation of signals of circuits B or C notwithstanding the continued disability of circuit A. Should an accidental connection be established between conductors 265 and 267 of circuit C, the armature 131 of originating mechanism $C^2$ will be moved to its abnormal position, whereupon the repeater will act to cause response by the other circuits as a warning signal and to render the electromagnet 164 unresponsive to the abnormal positioning of said armature 131, and will thereafter correspondingly reestablish responsive relationship with the other circuits.

After the repeater has acted in response to the development of an initiating circuit fault and has thereafter reestablished its responsive relationship to the remaining circuits, as just described, when such faulty circuit is restored to its normal condition, the movement of the armature 131 of the originating mechanism associated with such previously faulty circuit will be moved from its abnormal to its normal position, and will thereby cause deenergization of the restoring device electromagnet 146 associated therewith, whereupon such circuit will be automatically restored to its normal relationship with the repeater.

Should the circuit C be interrupted, as by the breaking of one of the line conductors therein, the trouble bell 204 will sound as a warning that such a break has occurred, but the repeater will not act in response thereto.

Applicability of embodiment of Fig. 1.

In view of the foregoing functional characteristics of the type of repeater illustrated by Fig. 1, it is evident that such a type of repeater is suited for use in connection either with the type of circuits illustrated by circuits A and B or with the type illustrated by circuits C or with both of such types; and that such a repeater will operate most effectively when subjected to the concurrent activity of two or more circuits, if initiating stations of circuits such as A and B function in accordance with so-called "closed type break-wheel" service, and initiating stations of circuits such as the circuit C function in accordance with so-called "open type break-wheel" service. It will also be evident that this type of repeater will give best results when all of the initiating stations connected thereto are arranged for operation to completely formulate their respective signals within a substantially uniform period; and that this type of repeater is adapted for use when the operating conditions are such that an attendant will not at all times be available for the purpose of disconnecting circuits which are abnormally conditioned through the development of faults therein.

Summary of the method of operation of the embodiment illustrated by Fig. 1.

1. Magnets 130 of panels 101 and 102 are normally effectively energized by batteries $A^7$ and $B^7$, respectively, but the current normally flowing in circuit C from battery $C^7$ is not strong enough to effectively energize magnet 130 of panel 103 or the magnets of bells $C^6$. The first signal impulse from any station $A^5$ causes bells $A^6$ to sound and, by deenergizing magnet 130 of $A^2$ and thus releasing armature 131, closes contact 133 of $A^2$, thereby energizing magnet 164 from battery $F^7$ and releasing cylinder 168, which is rotated, by clockwork or other means, nearly one complete revolution; the arm 169 being arrested by escapement ledge 166.

2. During such rotation of said cylinder, the following occurrences successively take place:

1st—Magnets 161 of the repeating make and break mechanisms $A^4$, $B^4$ and $C^4$ are energized from battery $F^7$ when pens 170 and 171 are connected by plate 179.

2nd—Resultant attraction of armatures 162 moves them into engagement with contacts 163, thus establishing shunt circuits through magnets 130 around contacts 119 and 120 of circuits A and B.

3rd—Just after contacts 163 have been closed, cam 184 of cylinder 168, acting through arm 185 and lever 193, permits closure of contacts 195 and 196.

4th—Magnets 111 of locking members B¹ and C¹ are energized from battery F⁷, upon the closing of contacts 195 and 196, through the cooperation of current paths established through normally positioned armatures 131 of B² and C² with their associated contacts 132 and 133, respectively, and the path established between the abnormally positioned busy armature 131 and contact 133 of A².

5th—Magnet 111 of locking member A¹ is not energized because the current path therethrough is interrupted at contact 132 of A².

6th—The energization of magnets 111 of B¹ and C¹ causes closure of contacts 113 and 114, thereby rendering the energizing paths therethrough independent of the relationship between armatures 131 and contacts 132 and 133 of A², B² and C², so that armatures 112 of B¹ and C¹ will thereafter be retained in abnormal or attracted position until said energizing paths are broken by the separation of contact 195 from contact 196.

7th—The movement of armatures 112 of B¹ and C¹, immediately following engagement of contact 114 by contact 113, will move contact 114 away from contact 115 for the purpose of preventing energization of magnet 111 of A¹ through the stick-up current paths of either B¹ or C¹, in the event of subsequent normal positioning of the busy armature 131 of A² at a time when armature 131 of either B² or C² is normally positioned; and the engagement therewith of contact 114 will thereupon so retard the movement of contact 113 that armature 112 will move out of electrical connection therewith, so as to render magnet 164 unresponsive to subsequent movements of armatures 131 of B² and C².

8th—Further movement of armature 112 of B¹ to fully retracted position breaks current path which normally shunts contacts 162 and 163 of B⁴, and corresponding action of C¹ establishes a new current path from battery C⁷ through a portion of initiating circuit C which excludes resistance 203 and magnet 202, but includes magnet 130 of C² and bells C⁶, and is subject to interruption between contacts 162 and 163 of C⁴.

9th—Magnet 202, when thus deenergized, releases its armature, thereby closing current path from battery 205 through trouble bell 204, causing said bell to sound.

10th—Upon establishment of such new path therethrough, the current flow through the bells C⁶ is sufficient to cause them to sound.

11th—Further rotation of cylinder 168 moves plate 181 away from pens 174 and 175, thereby interrupting the current path through circuit D, thus causing bells D⁶ to sound; and plate 182 is, at the same time, moved away from pens 176 and 177, thereby interrupting the current path through circuit E, thus deenergizing magnet 198, the armature of which drops, closing current path from battery 201 through trouble bell 200, causing said bell to sound.

12th—Still further rotation of cylinder 168 causes plate 183 to connect pens 177 and 178, thereby completing current path from battery E⁷ through circuit E, which path excludes magnet 198 and resistance 199, thereby allowing sufficient current to flow through said circuit to cause bells E⁶ to sound.

13th—Additional rotation of cylinder 168 causes plate 180 to connect pens 172 and 173, thereby completing current path from battery F⁷ through the winding 147 of magnet 146 of restoring device A³, thereby energizing said magnet; but the current path through winding 147 of B³ remains interrupted at contacts 134 and 135, and that of C³ at contacts 143 and 144 and at contacts 128 and 126, so that said magnets remain deenergized.

14th—Armature 149 of A³ moves in response to such energization of magnet 146, a current path being thereby completed through contact 151 from battery F⁷ through winding 148 of said magnet, so that when plate 180 is moved away from pens 172 and 173, by further rotation of the cylinder, said magnet will remain energized by said winding 148, and its armature will remain in attracted or abnormal position so long as armature 131 of A² remains in abnormal position.

15th—Such movement of armature 149 of A³ separates contact 150 from 152, thereby interrupting current path through and deenergizing magnet 164 of F, the armature of which then moves to retracted or normal position and carries ledge 166 out of, and ledge 167 into, the path of lever 169.

16th—Ensuing rotation of cylinder 168 restores all plates carried thereby to normal position, and thereby interrupts the current path though magnets 161 of A⁴, B⁴ and C⁴, the armatures of which then return to normal position, thus breaking the current paths controlled thereby.

17th—When said paths are thus broken, the current flow through circuits B and C is interrupted, thus deenergizing alarm bells B⁶ and C⁶, causing said bells B⁶ to sound.

18th—The movement of cam 184, incident to the revolution of cylinder 168 just described, elevates the free end of lever 193 and then permits it to be restored by spring 194, subject to such retarding effect by the escapement associated therewith as to prevent said lever from acting to move contact 195 from contact 196, after withdrawal of the high point of said cam from the path of arm 185, until the expiration of a time longer than the longest interval between the impulses of any signal.

3. When circuit A is now again closed, by the active station $A^5$, magnet 130 of $A^2$ is energized and its armature 131 moves contact 136 from contact 137; magnet 146 of $A^3$ is thereupon deenergized and its armature 149 retracted, thus restoring panel 101 to normal condition and completing the cycle of operations incident to one break and one make of any active station $A^5$.

4. The movement of the contact 136 of the armature 131 away from contact 137 of $A^2$, incident to the closing of circuit A just described, does not cause deenergization of the magnet 111 of $B^1$ and $C^1$ because current flow therethrough is now maintained by the engagement of contact 195 with contact 196; so that the armatures 112 of $B^1$ and $C^1$ will remain in attracted position for the purposes already explained.

5. When the circuit A is now again broken for the second signal impulse of the active station $A^5$, the result as to $A^1$, $A^3$, $A^4$, $B^4$ and $C^4$ is the same as already described, the cylinder 168 of F is again released, and the cam 184 acting upon the arm 185 moves the lever 193 to the position to which it was moved incident to the first signaling impulse of circuit A; all as hereinbefore more fully described, and thereby causing the formulation of a second signal impulse in circuits B, C, D and E.

6. When, as at the conclusion of the signal of the active station $A^5$, the previously busy moving device of armature 131 of $A^2$ remains inactive for a time longer than the longest interval between the impulses of the signal of any of the stations $A^5$, $B^5$ and $C^5$, the lever 193 will be permitted, by the escapement associated therewith, to move contact 195 from contact 196, thus causing deenergization of magnets 111 of $B^1$ and $C^1$ and permitting their armatures 112 to return to normal position; thereby restoring operative relationship between moving devices of $B^2$ and $C^2$ and magnet 164 of F.

The embodiment of Fig. 1 differs, in functional characteristics, from the embodiments of Figs. 3 and 4, and circuits A' and C' of Fig. 6, in that it provides reflex control of initiating circuits; differs from Figs. 4 and 5 and circuit C' of Fig. 6 in that it provides fully automatic elimination and restoration of responsiveness of faulty initiating circuits; and differs from Figs. 2 and 3 in that it does not provide full non-interference between initiating circuits in the event of overlapping concurrent signals.

*Detailed description of embodiment of Fig 2.*

In the illustrative embodiment of this invention which is diagrammatically shown by Fig. 2, the apparatus mounted upon the panels 101', 102' and 103' is identical with that of the panels 101, 102 and 103 of Fig. 1 hereinbefore more fully described, except as to the originating mechanisms $A^{2'}$, $B^{2'}$ and $C^{2'}$; which mechanisms are provided with auxiliary contacts for the control of the retarded operated device $f''$ in a manner which will be hereinafter more fully explained. Such auxiliary contacts of the originating mechanisms $A^{2'}$ and $B^{2'}$ are alike, and each comprises a flexible arm 274 which is secured to and insulated from the armature 131, and the stationary contact 275 which is mounted in the path of the free end of the arm 274 to be engaged thereby when the armature 131 is in its retracted position. The originating mechanism $C^{2'}$ has a flexible auxiliary contact arm 276 and stationary contact 277 for cooperation therewith; said contacts being so arranged that when the armature 131 of said mechanism $C^{2'}$ is in attracted position, the arm 276 will be held in engagement with the contact 277.

From the foregoing it will be observed that the auxiliary contacts of the originating mechanisms shown by Fig. 2 are arranged to normally stand open, and that said contacts are closed while such mechanisms are abnormally conditioned.

The circuit panels illustrated by Fig. 2 are provided with bus bars corresponding with those shown by Fig. 1, together with the additional bus bars 278. The adjacent ends of the bus bars 278 are connected by the conductors 278'. The conductor 279 of every panel connects each associated bus bar 278 to the flexible arm 274 or 276 (as the case may be) and the conductor 280 connects the conductor 255 to the stationary contact 275 or 277 (as the case may be).

The electromagnetically controlled repeating mechanism $f'$ and the independent retarded operated device $f''$ collectively comprise instrumentalities similar to those embodied in the combined repeating mechanism and retarded operated device F of Fig. 1.

The mechanism $f'$ comprises the electromagnet 164, its armature 165, the ledges 166 and 167, the arm 169 cooperating with said ledges, the cylinder 168 moving with said arm, the plates 179, 180, 181 and 281 carried by said cylinder, and the pens 170, 171, 172, 173, 174, 175, 282 and 283 cooperating with said plates. The plate 281 is so positioned upon the cylinder 168 that when the arm 169 moving therewith is in engaging relation to either the ledge 166 or the ledge 167, said plate 281 will engage the pens 282 and 283; and so that during the rotation of said cylinder after disengagement of the ledge 167 from the arm 169, said plate will be moved out of engagement with said pens. The operative relation of the other parts of the mechanism $f'$ is similar to that of the corresponding parts of the device F hereinbefore more fully described.

The retarded operative device $f''$ comprises the lever 193 pivoted at 186 and cooperating with a retarding train comprising the parts 187, 188, 189, 190, 191 and 192, as hereinbefore more fully described. The arm 185 and cam 184 shown for the actuation of retarding lever 193 in Fig. 1 are not present in the arrangement of Fig. 2; but in lieu thereof Fig. 2 shows an armature 284 secured to said lever and an electromagnet 285 mounted in such relation to said armature that, upon the effective energization of said magnet, the lever 193 will be moved to its fully elevated position for purposes which will be hereinafter more fully explained.

The conductor 286 connects the lever 193 to the bus bar 206, and the contacts 287 and 288 are mounted in path of the free end of said lever. A stop 289 is provided in the path of the downward movement of the lever 193, and a spring 194 is arranged to constantly impart to said lever a tendency to move toward said stop.

The contact 288 is mounted in such relation to the lever 193 and to the contact 287 that said lever will engage said contact 288 at the commencement of the upward movement of said lever, and so that just before the completion of such movement of said lever, said contact 288 will be brought into engagement with the contact 287. Said parts being shown in distorted relationship for the purpose of clearly indicating the spaces between said contacts. It should be understood that when the lever 193 is resting against the stop 289 said lever will be separated from the contact 288 by a comparatively small space and said contact will be separated from the contact 287 by a comparatively large space; so that during the upward movement of the lever 193 the contact 288 will not be brought into engagement with the contact 287 until the armature 284 has moved substantially into engagement with the end of the magnet 285, and so that during the downward movement of the lever 193 from the fully elevated position thereof, the contact 288 will quickly move away from the contact 287, but the lever 193 will not move out of engagement with the contact 288 until the expiration of a time longer than the longest interval between the impulses of any signal.

One end of the winding of the electromagnet 285, is normally connected to the bus bar 278 through the conductors 290 and 292. The other end of the winding of said electromagnet is connected through the conductor 293 to a stationary contact 294, which contact is normally engaged by the flexible contact 295. The flexible contact 295 is connected through the conductor 296 to the conductors 302 and 303. The electromagnet 297 and its armature 298 are mounted in suitable relation to the contact 295, so that when said armature is moved to its attracted position the free end thereof will engage the contact 295 and move same away from the contact 294. One end of the winding of the electromagnet 297 is connected through the conductor 299 to the pen 283; the other end of said winding is connected through the conductor 300 to the armature 298. The conductor 301 connects the armature 298 to the contact 287, and the conductor 302 connects the contact 288 to the conductors 296 and 303.

The armatures and other moving parts are shown in their respective normal positions, and it will therefore be apparent that current paths will be normally established such as those hereinbefore described in connection with Fig. 1; except as to the circuit E of Fig. 1, for which there is no counterpart in Fig. 2; although it will be apparent that additional circuits such as the circuits D and E of Fig. 1 may, if desired, be correspondingly controlled by the repeating mechanism $f'$ of Fig. 2.

*Detailed description of operation of embodiment of Fig. 2.*

The operation of the repeater shown in Fig. 2, in connection with circuits as therein shown, is as follows:

Assuming that the various parts and current paths are normally conditioned, as hereinbefore more fully described, should the formulation of a signal be initiated by one of the stations $A^5$, upon the first signaling impulse of the circuit A incident to the formulation of such signal, the bells $A^6$ will sound and the magnet 130 of the originating mechanism $A^{2'}$ will be deenergized. Whereupon the associated armature 131 will move into engagement with its back contact 133, thereby carrying the arm 274 into engagement with the contact 275, and permitting the contacts 134 and 136 to move into engagement with the contacts 135 and 137 respectively. The winding of the electromagnet 164 will be energized through a current path corresponding to that hereinbefore more fully described, and the electromagnet 285 will be concurrently energized by a current flow through the following path: from one terminal of the battery $F^7$ through conductors 235, 238, 303 and 296; to and through contacts 295 and 294, thence through conductor 293, winding of electromagnet 285, conductors 290 and 292, bus bar 278 and the interconnecting conductors 278' to conductor 279 of panel 101'; thence through arm 274 and contact 275, through conductors 280, 255, 253 and 251 to bus bar 207 of said panel 101', thence through the bus bars 207 and the interconnecting conductors 207', and conductors 243 and 234 to the other terminal of said battery F⁷.

Upon the effective energization of the electromagnet 285 through the current path just described, the lever 193 will be raised until the armature 284 is brought into engagement with said magnet 285, thereby bringing the free end of said lever into engagement with the contact 288 and flexing said contact upwardly into engagement with the contact 287. The engagement of the contact 288 by the lever 193, as just described, will establish an actuating current path for the electromagnet of the locking members or circuit changing devices A¹, B¹ and C¹, such as that established by engagement of the contacts 195 and 196 (shown by Fig. 1) as hereinbefore more fully described. The engagement of the contact 287 by the contact 288, just described, will establish an energizing current path through the winding of the electromagnet 297 as follows: from one terminal of the battery F⁷, through conductors 235, 238, 303 and 302 to and through said contact 288, through contact 287, conductor 301, conductor 300, winding of magnet 297 and conductor 299 to pen 283, thence through plate 281, pen 282, and conductor 291 to conductor 292, and thence to the other terminal of said battery F⁷ through the current path utilized for the energization of the electromagnet 285, as hereinbefore more fully described.

When the current flow has been established through magnet 297, as just described, the armature 298 will move to attracted position, thus engaging the flexible contact 295 and moving same away from the contact 294. The engagement of the contact 295 by the armature 298 will establish a current path from the conductor 303, through the conductor 296 and the contact 295 and the armature 298, thereby forming a shunt around the previously described path from the conductor 303 to the conductor 300; and the movement of the contact 295 away from the contact 294 will interrupt the current flow through the winding of the electromagnet 285, and thereupon the lever 193 will commence moving downwardly in response to the pull of the spring 194.

When the circuit A is now closed incident to the operation of the active one of the initiating stations therein, the attractive movement of the armature 131 of the mechanism A²′ will carry the arm 274 away from the contact 275, and will thus interrupt the energizing current path for magnet 297, but a holding current path through said magnet will, at this time, be maintained by the abnormal positioning of the moving device of mechanism B² caused by the continued abnormal conditioning of the locking member B¹, so that the initiating circuit B remains open.

Upon each succeeding break of the circuit A the holding current path through magnet 297 will be interrupted during resultant rotation of cylinder 168, and upon completion of each such rotation of said cylinder the magnet 285 will be so energized as to lift the lever 193 until the contact 288 is brought into engagement with the contact 287, whereupon the magnet 297 will be energized and the magnet 285 will be deenergized as hereinbefore just explained.

From the foregoing, it will be apparent that the functioning of the various parts will correspond to that of equivalent parts of the repeater shown in Fig. 1, as hereinbefore more fully described; the lifting of the lever 193 being accomplished by electromagnetic means, instead of being accomplished by mechanical means as in the case of Fig. 1.

Should the formulation of a signal be initiated by any one of the stations B⁵ or C⁵ at a time when the various parts and current paths are normally conditioned, the action of the repeater in responding thereto would similarly correspond to that of the repeater of Fig. 1 as hereinbefore more fully explained; it being evident that when the position of any moving device 131 is altered from normal to abnormal, the magnet 285 will raise the lever 193, and the armature 298 will thereupon act to cause deenergization of said magnet 285 so as to permit the downward movement of the lever 193; that when the moving devices 131 are normally positioned the magnets 285 and 297 will be deenergized; and that if one or more of the moving devices 131 are abnormally positioned for an extended period, the magnets 285 will nevertheless be energized (through the action of the cylinder 168) in response to each movement of any of the moving devices from normal to abnormal position.

The response of the repeater shown by Fig. 2 to concurrent signal formulation in two or more circuits will correspond to that of the repeater shown by Fig. 1, already described except that, in the event of overlapping concurrent signals, the repeater of Fig. 2 will not respond to any fragmentary portion thereof. For example, assuming that the formulation of signals is initiating in circuits A and B under such circumstances that the repeater will be controlled by circuit A throughout the formulation of its signal and that the repeater will relinquish control of and suspend responsiveness to circuit B,—the acting station B⁵ requiring a comparatively longer period for the transmission of its signal,—it will be apparent that the retarded operated device f″ will respond to signal impulses of both circuits A and B during concurrent action thereof; and that, after the completion of the signal of circuit A, said device will continue to act in response to the signal impulses of circuit B, and will not restore the locking members to their normal condition until the expiration of a period longer than the longest interval between the impulses of any signal during which interval no impulses are formulated by the circuit B. For this reason the repeater will not act to formulate any portion of the signal of circuit B in any of the other circuits, but will remain conditioned for response to signals of circuit A until a suitable interval has elapsed following the completion of the signal of circuit B, whereupon the repeater and the circuits connected thereto, will be restored to normal condition.

Should one of the initiating circuits be abnormally conditioned for an extended period, as by the breakage of a line conductor of circuit A, after the repeater had acted in response thereto, it would be restored to responsive relation to the other circuits as hereinbefore more fully explained; the energization of the magnet 297 being maintained by the continued abnormal positioning of the armature 131 of the originating mechanism of such abnormal circuits, the armature 149 of the restoring device associated therewith being maintained in attracted position, and the other parts of the repeater being normally positioned. Should a signal be formulated in one of the other circuits while any circuit is abnormally conditioned, as just described, the cylinder 168 would act in response to such other circuit, and would thereby cause effective energization of the electromagnet 285 in the manner hereinbefore more fully described.

*Applicability of embodiment of Fig. 2.*

In view of the foregoing functional characteristics of the type of repeater illustrated by Fig. 2 it is evident that such a type of repeater is suited for use under all conditions to which the type of repeater illustrated by Fig. 1, is suited, and is furthermore suited for use in connection with signal initiating stations, some of which will act to formulate their signal in a period substantially shorter than that required for the formulation of the signals of other of such stations.

*Summary of the method of operation of the embodiment illustrated by Fig. 2.*

1. Magnets 130 of panels 101' and 102' are normally effectively energized by batteries $A^7$ and $B^7$, respectively, but the current normally flowing in circuit C from battery $C^7$ is not strong enough to effectively energize magnet 130 of panel 103' or the magnets of bells $C^6$. The first signal impulse from any station $A^5$, by deenergizing magnet 130 of $A^{2\prime}$ and thus releasing armature 131, closes contact 133 and contacts 274 and 275 of $A^{2\prime}$, thereby energizing magnet 164 of $f'$ and magnet 285 of $f''$ from battery $F^7$. The energizing of magnet 164 releases cylinder 168, which is rotated, by clockwork or other means, nearly one complete revolution; the arm 169 being arrested by escapement ledge 166. The energization of magnet 285 attracts armature 284, thereby moving lever 193 so as to first engage contact 288 and then, at the end of its upward movement, to close contact 288 with contact 287.

2. During such rotation of cylinder 168, the following occurrences successively take place:

1st—Magnets 161 of the repeating make and break mechanisms $A^4$, $B^4$ and $C^4$ are energized from battery $F^7$ when pens 170 and 171 are connected by plate 179.

2nd—Resultant attraction of armatures 162 moves them into engagement with contacts 163, thus establishing shunt circuits through magnets 130 around contacts 119 and 120 of circuits A and B.

3rd—Upon engagement of contact 288 by lever 193, magnets 111 of $B^1$ and $C^1$ are energized from battery $F^7$ through the cooperation of current paths established through normally positioned armatures 131, of $B^{2\prime}$ and $C^{2\prime}$ with their associated contacts 132 and 133, respectively, and the path established between the abnormally positioned busy armature 131 and contact 133 of $A^{2\prime}$.

4th—Magnet 111 of locking member $A^1$ is not energized because the current path therethrough is interrupted at contact 132 of $A^{2\prime}$.

5th—The energization of magnets 111 of $B^1$ and $C^1$ causes closure of contacts 113 and 114, thereby rendering the energizing paths therethrough independent of the relationship between armatures 131 and contacts 132 and 133, of $A^{2\prime}$, $B^{2\prime}$ and $C^{2\prime}$, so that armatures 112 of $B^1$ and $C^1$ will thereafter be retained in abnormal or attracted position until said energizing paths are broken by the separation of lever 193 from contact 288.

6th—The movement of armatures 112 of $B^1$ and $C^1$, immediately following engagement of contact 114 by contact 113, will move contact 114 away from contact 115 for the purpose of preventing energization of magnet 111 of $A^1$ through the stick-up current paths of either $B^1$ or $C^1$, in the event of subsequent normal positioning of the busy armature 131 of $A^{2\prime}$ at a time when armature 131 of either $B^{2\prime}$ or $C^{2\prime}$ is normally positioned; and the engagement therewith of contact 114 will thereupon so retard the movement of contact 113 that armature 112 will move out of electrical connection therewith, so as to render magnet 164 unresponsive to subsequent movements of armatures 131 of $B^{2\prime}$ and $C^{2\prime}$.

7th—Further movement of armature 112 of $B^1$ to fully attracted position breaks current path which normally shunts contacts 162 and 163 of $B^4$, and corresponding action of $C^1$ establishes a new current path from battery $C^7$ through a portion of initiating circuit C which excludes resistance 203 and magnet 202, but includes magnet 130 of $C^{2\prime}$ and bells $C^6$, and is subject to interruption between contacts 162 and 163 of $C^4$.

8th—Magnet 202, when thus deenergized, releases its armature, thereby closing current path from battery 205 through trouble bell 204, causing said bell to sound.

9th—Upon establishment of such new path therethrough, the current flow through the bells $C^6$ is sufficient to cause them to sound.

10th—Further rotation of cylinder 168 moves plate 281 away from pens 282 and 283, thereby preventing closure elsewhere of the energizing path for magnet 297.

11th—During the time which elapses between the initial energization of the magnet 285 and the movement of the plate 281 away from the pens 282 and 283, as just described, the movement of the lever 193 may or may not move the contact 288 into engagement with the contact 287—dependent upon the characteristics of said magnet 285 and of the cylinder 168 and driving means therefor—so that the magnet 297 may be momentarily deenergized; but, in any event, the matter of whether or not such magnet 297 is effectively energized at this time has not significant bearing upon the general functional characteristics of the repeater as a whole.

12th—Such rotation of cylinder 168 also moves plate 181 away from pens 174 and 175, thereby interrupting the current path through circuit D, thus causing bells $D^6$ to sound.

13th—Additional rotation of cylinder 168 causes plate 180 to connect pens 172 and 173, thereby completing current path from battery $F^7$ through the winding 147 of magnet 146 of restoring device $A^3$, thereby energizing said magnet; but the current path through winding 147 of $B^3$ remains interrupted at contacts 134 and 135, and that of $C^3$ at contacts 143 and 144 and at contacts 128 and 126, so that said magnets remain deenergized.

14th—Armature 149 of $A^3$ moves in response to such energization of magnet 146, a current path being thereby completed through contact 151 from battery $F^7$ through winding 148 of said magnet, so that when plate 180 is moved away from pens 172 and 173, by further rotation of the cylinder, said magnet will remain energized by said winding 148, and its armature will remain in attracted or abnormal position so long as armature 131 of $A^{2\prime}$ remains in abnormal position.

15th—Such movement of armature 149 of $A^3$ separates contact 150 from 152, thereby interrupting current path through and deenergizing magnet 164 of $f'$, the armature of which then moves to retracted or normal position and carries ledge 166 out of, and ledge 167 into, the path of lever 169.

16th—If armature 131 of either $A^{2\prime}$ or $B^{2\prime}$ is still in retracted or abnormal position after cylinder 168 has rotated so as to again bring plate 281 into contact with pens 282 and 283, the magnet 297 will be energized, attracting armature 298, which acts to establish a stick circuit for said magnet and interrupts the current path through magnet 285. The lever 193 is thereupon moved downwardly by spring 194, subject to such retarding effect of the escapement associated therewith that said lever will not move out of engagement with contact 288 until the expiration of a time longer than the longest interval between the impulses of any signal.

17th—Ensuing rotation of cylinder 168 restores all plates carried thereby to normal position, and thereby interrupts the current path through magnets 161 of $A^4$, $B^4$ and $C^4$, the armatures of which then return to normal position, thus breaking the current paths controlled thereby.

18th—When said paths are thus broken, the current flow through circuits B and C is interrupted, thus deenergizing alarm bells $B^6$ and $C^6$, causing said bells $B^6$ to sound.

3. When circuit A is now again closed, by the active station $A^5$, magnet 130 of $A^{2\prime}$ is energized and its armature 131 moves contact 136 from contact 137; magnet 146 of $A^3$ is thereupon deenergized and its armature 149 retracted, thus restoring panel 101' to normal condition and completing the cycle of operations incident to one break and one make of any active station $A^5$.

4. Interference of other stations with the active $A^5$ is prevented as hereinbefore explained in detail.

5. When, as at the conclusion of the signal of the active station $A^5$, the previously busy moving device or armature 131 of $A^{2\prime}$ remains inactive for a time longer than the longest interval between the impulses of the signal of any of the stations $A^5$, $B^5$ and $C^5$, the lever 193 will be permitted, by the escapement associated therewith, to move away from contact 288, thus causing deenergization of magnets 111 of $B^1$ and $C^1$, and permitting their armatures 112 to return to normal position; thereby restoring operative relationship between moving devices of $B^{2\prime}$ and $C^{2\prime}$ and magnet 164 of $f'$.

The embodiment of Fig. 2 differs, in functional characteristics, from the embodiments of Figs. 3 and 4, and circuits A' and C' of Fig. 6, in that it provides reflex control of initiating circuits; differs from Figs. 4 and 5 and circuit C' of Fig. 6 in that is provides fully automatic elimination and restoration of responsiveness of faulty initiating circuits; and differs from Figs. 1, 4 and 5 in that it provides full non-interference between initiating circuits in the event of overlapping concurrent signals.

*Detailed description of embodiment of Fig. 3.*

In the illustrative embodiment of this invention which is diagrammatically shown by Fig. 3, the apparatus mounted upon the panels 101", 102" and 103" corresponds to the equivalent parts of the panels 101', 102' and 103' of Fig. 2 hereinbefore more fully described; except that the repeating mechanism contactors A⁴, B⁴ and C⁴ are omitted, and that the various contacts associated with the locking members, originating mechanisms and restoring devices of Fig. 2 and the bus bars 211 and interconnecting conductors 211' are omitted in Fig. 3.

As a matter of convenience in illustrating the bus bars 278 which are shown adjacent to the bus bars 208 in Fig. 2, are shown adjacent to the bus bars 210 in Fig. 3; and the circuit E of Fig. 1, which was omitted from Fig. 2 in order to provide more room for the illustration of the other parts, is again shown in Fig. 3. The locking members A¹', B¹' and C¹' of the panels 101", 102" and 103", respectively, each comprise an electromagnet 111, an armature 112, a flexible arm 113, and contacts 114 and 115, all of which are more fully hereinbefore described in connection with Fig. 1; but said locking members are not provided with the contacts 116 to 120 inclusive of the locking members A¹ and B¹ or the contacts 116 to 118 inclusive and 123 to 128 inclusive of the locking member C¹.

The originating mechanisms A²' and B²' of Figs. 2 and 3 are similar; but the originating mechanism C²'' of Fig. 3 lacks the contacts 143 and 144 of the originating mechanism C²' of Fig. 2. The free ends of the contacts 140 and 141 are connected by the insulating spacer 145' which projects into the path of the armature 131 so as to cause the actuation of said contacts thereby as hereinbefore more fully described.

The restoring devices A³' and B³' of Fig. 3 are similar to the devices A³ and B³ of Fig. 2, except in that the contacts 153 and 156 of the devices A³ and B³ of Figs. 1 and 2 are replaced in the devices A³' and B³' of Fig. 3 by the contacts 304 and 305, and the insulating spacer 306 is secured to the contact 304 and so disposed in relation to the armature 149 as to be engaged thereby to move said contact away from the contact 305 when said armature is in attracted position. The contact 304 is so formed as to tend to move into engagement with the contact 305.

The restoring device C³' is similar to in all respects the restoring devices A³' and B³'.

The repeating mechanism f'''' of Fig. 3 is similar to the repeating mechanism f' of Fig. 2 except in that said mechanism f'''' does not comprise the parts 170, 171, 179, 281, 282 and 283 of the mechanism f'; (although it does comprise parts 176, 177, 178, 182 and 183 corresponding with similarly designated parts of the device F of Fig. 1) and that the plate 180' provided upon the cylinder 168 of the device f'''' for engagement with the pens 172 and 173 is of such formation and so placed that said plate will engage said pens during the rotation of said cylinder very quickly after said cylinder has moved from the point at which the end of the arm 169 is in position to be engaged by the ledge 167, and so that said plate 180' will thereafter continue to engage said pens throughout the rotation of said cylinder 168 until the arm 169 has nearly reached the point at which it may be engaged by the ledge 166.

The retarded operated device f^iv of Fig. 3 comprises parts similar to those of the device f'' of Fig. 2 as follows: 186, 187, 188, 189, 190, 191, 192, 193, 194, 284 and 285, and said device f^iv also comprises contacts 195 and 196 and an insulating spacer 197 arranged in a manner corresponding to that of the similarly designated parts of the device F of Fig. 1.

Because of the omissions and changes of contacts and other parts, as just described, the repeater of Fig. 3 is not provided with conductors corresponding to the conductors of Fig. 2 which are designated as follows: 214 to 222 inclusive, 224 and 225, 227 to 234 inclusive, 253 and 254, 258 and 258', 270 to 273 inclusive, 291 to 293 inclusive, 296, 299 to 303 inclusive; the conductor 213 of Figs. 1 and 2 is replaced in Fig. 3 by the conductor 213' which extends from one end of the winding of the electro-magnet 130 of the originating mechanisms A² and B², to the terminals 105 and 107 respectively associated therewith; the conductor 226 of Figs. 1 and 2 is replaced by the conductor 226' which extends from one end of the winding of the electro-magnet 130 of the originating mechanism C²'' to the terminal 109; the conductor 243 of Figs. 1 and 2 is replaced by Fig. 3 by the conductor 243' which extends from the bus bar 207 of panel 103" to a terminal of the battery F⁷; the conductors 255 and 255' of Figs. 1 and 2 are replaced in Fig. 3 by conductor 255'' which extend from the conductors 251 and 252 to the contacts 134 and 137 of panels 101" and 102" and to the contacts 139 and 141 of panels 103"; and the conductors 259 of Figs. 1 and 2 is replaced in Fig. 3 by the conductor 259' which extends from the contact 136 to the contact 151; the conductors 279 of Fig. 2 are replaced by the conductors 307 of Fig. 3 which extends from the conductors 255″ of panels 101″, 102″ and 103″ to the arms 274 or 276 (as the case may be) associated with said respective panels; the conductors 280 of Fig. 2 are replaced by the conductors 308 of the respective panels of Fig. 3 which connect the contact 275 or 277 (as the case may be) to the contacts 305 of said respective panels; the conductors 290 of Fig. 2 are replaced by the conductor 290′ of Fig. 3 which connects one terminal of the electromagnet 285 to the bus bar 278; the contacts 294 and 295, the electromagnet 297 and the armature 298 of Fig. 2 are omitted in Fig. 3; the conductors 309 are added to Fig. 3 connecting the contacts 304 to the bus bars 278 of the respective panels; and the conductor 310 is added to Fig. 3 and connects an end of the winding of the electromagnet 285 to the conductor 241.

The armature and other moving parts are shown in their respective normal positions, and it will therefore be apparent that current paths are normally established as follows:—

In circuit A, from one terminal of the battery $A^7$, through the outside line conductors of said circuit to the terminal 104, thence through the conductor 212, the winding of electromagnet 130, the conductor 213′ and the terminal 105 to the other terminal of the battery $A^7$. The normal current paths of circuits B and C correspond with that just described for circuit A, and therefore need not be here repeated.

*Detailed description of operation of embodiment of Fig. 3.*

The operation of the repeater of Fig. 3 in connection with circuits as therein shown is as follows:

Assuming that the various parts and current paths are normally conditioned, should the formulation of a signal be initiated by one of the stations $A^5$, upon the first interruption of the circuit A incident to the formulation of such signal the bells $A^6$ will sound and the magnet 130 of the originating mechanism $A^{2\prime}$ will be deenergized; whereupon the associated armature 131 will move into engagement with the contact 133, thereby carrying the arm 274 into engagement with the contact 275 and permitting the contacts 134 and 136 to move into engagement with the contacts 135 and 137 respectively. Upon such movement of said armature 131 and its associated contacts, current paths will be established for the electromagnets 164 and 285 as hereinbefore more fully explained in connection with the repeaters of Figs. 1 and 2. The establishment of the current paths just referred to will cause the electromagnets 164 and 285 to be effectively energized and the armatures 165 and 284 will thereupon move to attracted position, thus permitting the cylinder 168 to rotate and permitting the contact 195 to move into engagement with the contact 196.

As a result of the engagement of contact 196 by contact 195, energizing current paths will be established for the magnets 111 of the locking members $B^{1\prime}$ and $C^{1\prime}$; whereupon the armatures 112 associated therewith will move into attracted position and thereby render the magnet 164 unresponsive to the armatures 131 of the originating mechanisms $B^{2\prime}$ and $C^{2\prime\prime}$. As a result of such rotation of the cylinder 168, the plate 180′ will be brought into engagement with the pens 172 and 173, and will thereby cause the restoring device $A^{3\prime}$ to act as and with the result hereinbefore more fully described in connection with the repeater of Fig. 1. As further results of such rotation of the cylinder 168, the bells $D^6$ and $E^6$ will be caused to sound as hereinbefore more fully described.

It will be apparent that the repeater of Fig. 3 will correspondingly respond to an initial signaling impulse formulated by any one of the stations $B^5$ or by any one of the stations $C^5$; and that, after having so acted, said repeater will cause similar response of the bells $D^6$ and $E^6$ to succeeding signaling impulses of any such active circuit.

Should the formulation of signals simultaneously start in two or more initiating circuits, the action of the repeater in Fig. 3 in response thereto would be similar to that of the repeaters of Figs. 1 and 2 as hereinbefore more fully described, as far as the response of the bells $D^6$ and $E^6$ is concerned; one initiating circuit being automatically selected by the repeater to control the circuits D and E, and the signal of the circuit so selected being correspondingly sounded by the bells of said circuit. Concurrent signals of non-controlling circuits will not be responded to by the repeater of Fig. 3, even should one of such signals materially overlap the signal of the controlling circuit, for the reasons more fully explained in connection with the repeater of Fig. 2; but non-controlling circuits will not in any event be subjected to the formulation therein of the signal of any controlling circuit.

*Applicability of embodiment of Fig. 3.*

In view of the functional characteristics of the repeater of Fig. 3, as just described, it is evident that this repeater is of the non-reflex type, that it is equally suited for use with initiating stations having open type or closed type code wheels and with circuits of the type of the circuits A and B or of the type of circuit C or of both of such types. It will also be evident that the repeater of Fig. 3 is adapted for use where the operating conditions are such that an attendant will not at all times be available for the purpose of rendering same unresponsive to circuits which are abnormally conditioned for an extended period.

*Summary of the method of operation of the embodiment illustrated by Fig. 3.*

1. Magnets 130 of panels 101″ and 102″ are normally effectively energized by batteries $A^7$ and $B^7$, respectively, but the current normally flowing in circuit C from battery $C^7$ is not strong enough to effectively energize magnet 130 of panel 103″. The first signal impulse from any station $A^5$, by deenergizing magnet 130 of $A^{2\prime}$ and thus releasing armature 131, closes contact 133 and contacts 274 and 275 of $A^{2\prime}$, thereby energizing magnet 164 of $f'''$ and magnet 285 of $f^{iv}$ from battery $F^7$. The energizing of magnet 164 releases cylinder 168, which is rotated, by clockwork or other means, nearly one complete revolution; the arm 169 being arrested by escapement ledge 166. The energizing of magnet 285 attracts armature 284, thereby moving lever 193 so as to permit contact 195 to close with contact 196.

2. During such rotation of cylinder 168, the following occurrences successively take place:

1st—Plate 180′ is moved into contact with pens 172 and 173, thereby completing current path from battery $F^7$ through the winding 147 of magnet 146 of the restoring device $A^{3\prime}$, thereby energizing said magnet; but the current path through winding 147 of $B^{3\prime}$ remains interrupted at contacts 134 and 135, and that of $C^3$ at contacts 139 and 140, respectively, so that said magnets remain deenergized.

2nd—Armature 149 of $A^{3\prime}$ moves in response to such energization of magnet 146, a current path being thereby completed through contact 151 from battery $F^7$ through winding 148 of said magnet, so that when plate 180′ is moved away from pens 172 and 173, by further rotation of the cylinder, said magnet will remain energized by said winding 148, and its armature will remain in attracted or abnormal position so long as armature 131 of $A^{2\prime}$ remains in abnormal position.

3rd—Such movement of armature 149 of $A^{3\prime}$ separates contact 150 from 152, thereby interrupting current path through and deenergizing magnet 164 of $f'''$, the armature of which then moves to retracted or normal position and carries ledge 166 out of, and ledge 167 into, the path of lever 169.

4th—Such movement of armature 149 of $A^{3\prime}$ also separates contact 304 from 305, and thus deenergizes magnet 285, thereby releasing lever 193, and allowing it to be moved downwardly by spring 194 subject to such retarding effect of the escapement connected therewith that said lever will not move contact 195 away from 196 until the expiration of a time longer than the longest interval between the impulses of any signal.

5th—Further rotation of cylinder 168 moves plate 181 away from pens 174 and 175, thereby interrupting the current path through circuit D, thus causing bells $D^6$ to sound; and plate 182 is, at the same time, moved away from pens 176 and 177, thereby interrupting the current path through circuit E, thus deenergizing magnet 198, the armature of which drops, closing current path from battery 201 through trouble bell 200, causing said bell to sound.

6th—Still further rotation of cylinder 168 causes plate 183 to connect pens 177 and 178, thereby completing current path from battery $E^7$ through circuit E, which path excludes magnet 198 and resistance 199, thereby allowing sufficient current to flow through said circuit to cause bells $E^6$ to sound.

7th—Ensuing rotation of cylinder 168 restores all plates carried thereby to normal position.

3. After the closing of contacts 195 and 196 of $f^{iv}$, the following occurrences successively take place:

1st—Magnets 111 of locking members $B^{1\prime}$ and $C^{1\prime}$ are energized from battery $F^7$ through the cooperation of current paths established through normally positioned armatures 131 of $B^{2\prime}$ and $C^{2\prime\prime}$ with their associated contacts 132 and 133, respectively, and the path established between the abnormally positioned busy armature 131 and contact 133 of $A^{2\prime}$.

2nd—Magnet 111 of $A^{1\prime}$ is not energized because the current path therethrough is interrupted at contact 132 of $A^{2\prime}$.

3rd—The energization of magnets 111 of $B^{1\prime}$ and $C^{1\prime}$ causes closure of contacts 113 and 114, thereby rendering the energizing paths therethrough independent of the relationship between armatures 131 and contacts 132 and 133, of $A^{2\prime}$, $B^{2\prime}$, and $C^{2\prime\prime}$, so that armatures 112 of $B^{1\prime}$ and $C^{1\prime}$ will thereafter be retained in abnormal or attracted position until said energizing paths are broken by the separation of contact 195 from contact 196.

4th—The movement of armatures 112 of $B^{1\prime}$ and $C^{1\prime}$, immediately following engagement of contact 114 by contact 113, will move contact 114 away from contact 115 for the purpose of preventing energization of magnet 111 of $A^{1\prime}$ through the stickup current paths of either $B^{1\prime}$ or $C^{1\prime}$, in the event of subsequent normal positioning of the busy armature 131 of $A^{2\prime}$ at a time when armature 131 of either $B^{2\prime}$ or $C^{2\prime\prime}$ is normally positioned; and the engagement therewith of contact 114 will thereupon so retard the movement of contact 113 that armature 112 will move out of electrical connection therewith, so as to render magnet 164 unresponsive to subsequent movements of armatures 131 of B²′ and C²″.

4. When circuit A is now again closed by the active station A⁵, magnet 130 of A²′ is energized and its armature 131 moves contact 136 from 137; magnet 146 of A³′ is thereupon deenergized and its armature 149 retracted, thus restoring panel 101″ to normal condition and completing the cycle of operations incident to one break and one make of any active station A⁵.

5. Interference of other stations with the active A⁵ is prevented as hereinbefore explained in detail.

6. When, as at the conclusion of the signal of the active station A⁵, the previously busy moving device or armature 131 of A²′ remains inactive for a time longer than the longest interval between the impulses of the signal of any of the stations A⁵, B⁵ and C⁵, the lever 193 will be permitted, by the escapement associated therewith, to move contact 195 from contact 196, thus causing deenergization of magnets 111 of B¹′ and C¹′ and permitting their armatures 112 to return to normal position; thereby restoring operative relationship between moving devices of B²′ and C²″ and magnet 164 of f‴.

The embodiment of Fig. 3 differs, in functional characteristics, from the embodiments of Figs. 1, 2 and 5 and circuit G of Fig. 6, in that it does not provide reflex control of initiating circuits; differs from Figs. 4 and 5 and circuit C′ of Fig. 6 in that it provides fully automatic elimination and restoration of responsiveness of faulty initiating circuits; and differs from Figs. 1, 4 and 5 in that it provides full non-interference between initiating circuits in the event of overlapping concurrent signals.

*Detailed description of embodiment of Fig. 4.*

In the illustrative embodiment of this invention which is diagrammatically shown by Fig. 4, the panel 101‴ has the locking member A¹′ comprising the electromagnet 111, the armature 112, the flexible arm 113, and the contacts 114 and 115; the originating mechanism A²‴ comprising the electromagnet 130, the armature 131, the front contact 132 and the back contact 133; the bus bars 206, 207 and 308; the terminals 104 and 105; the conductors 246, 247, 248, 260 and 264;—all of which correspond to the similarly designated parts of the repeaters of Figs. 1, 2 and 3; and the conductor 251′ connects the flexible arm 113 to the bus bar 207. The panels 102‴ and 103‴ are similarly equipped and wired.

Repeating mechanism is provided for controlling the circuits D and E, which mechanism comprises the contactors D⁴ and E⁴ arranged to control said circuits in response to the initiating circuits A, B and C in a manner corresponding to that in which the repeaters of Figs. 1, 2 and 3 control corresponding circuits through the repeating mechanism cylinder 168 and parts associated therewith.

The device F′ diagrammatically represents an electromagnetically controlled combined signal manifesting and retarded operative device consisting of a tape recorder of any desired well known construction which is controlled by an electromagnet 313 and comprises automatic paper feeding mechanism (not shown) arranged to automatically start whenever the electromagnet is energized and, when once started, to continue running until the expiration of a time longer than the longest interval between the impulses of any signal throughout which interval said magnet has remained deenergized. The pivoted insulated member 311 diagrammatically indicates a part moving with the paper feed controlling mechanism of the device F¹ and arranged to be quickly moved in one direction by the spring 312 whenever the electromagnet 313 is energized, and to be thereafter slowly restored to its normal position during deenergized periods of said electromagnet, such a part being illustrated in patent issued to me under date of Sept. 11th, 1923, No. 1,467,301. The contacts 195 and 196 are mounted in such relation to the member 311 that when said member is normally positioned the contact 195 will be separated from the contact 196, and so that, when said member is abnormally positioned, said contacts will engage.

The battery F⁷ is provided for the local current paths, one terminal of said battery being connected through the conductors 238 and 239 to one end of the winding of the electromagnet 313, the other end of said winding is connected through the conductor 314 to one end of the electromagnet winding of the contactor E⁴, the other end of said winding is connected through the conductor 315 to one end of the electromagnet winding of the contactor D⁴, the other end of the said last named winding is connected through the conductor 316 to the bus bar 208 of panel 103‴. The conductor 243′ connects the bus bar 207 to the terminal of battery F⁷, the conductor 241 connects the conductors 238 and 239 to the contact 195, and the conductor 242 connects the bus bar 206 to the contact 196.

The normally effective current paths of the circuits shown in Fig. 4 correspond with those of the repeaters of Figs. 1, 2 and 3 and therefore will not be again described at this time.

*Detailed description of operation of embodiment of Fig. 4.*

The operation of the repeater of Fig. 4 in connection with the circuits therein shown is as follows:

Assuming that the various parts and current paths are normally conditioned (all moving parts being positioned as shown) should the formulation of a signal be initiated by any initiating station, upon the first signaling impulse of the circuit in which such station is connected, the bells connected in such circuit will sound and the magnet 130 connected in such circuit will be abnormally conditioned; whereupon the armature 131 associated therewith will move to abnormal position and thereby establish a current path for the windings of the electromagnets of the contactors $D^4$ and $E^4$ and the electromagnet 313 as follows: from one terminal of the battery $F^7$, through conductors 238 and 239, the winding of the electromagnet 313, conductor 314, electromagnet winding of contactor $E^4$, conductor 315, electromagnet winding of contactor $D^4$, conductor 316 and bus bar 208 to the conductor 264 of the panel of the circuit in which a signal is being formulated; thence through the abnormally positioned armature 131 of such circuit to the contact 132 or 133 (as the case may be), thence through the conductor 260 or 261' (as the case may be), to the armature 112 of the locking member of such active circuit, through said armature and its associated arm 113, through the conductor 251', the bus bar 207 and the conductor 243' to the other terminal of the battery $F^7$.

As a result of the establishment of the current path just described, the magnets of the contactors $D^4$ and $E^4$ will be energized, thus breaking the circuit D and revising the current path of circuit E so as to cause the bells $D^6$ and $E^6$ to sound, and so as to de-energize magnet 198 and cause bell 200 to sound; and the electromagnet 313 will be energized, thus starting the paper feed of the device F' and causing the formulation of a suitable mark therein. Upon such starting of the paper feeding train of the device F', the member 311 will be so moved by the spring 312 as to move the contact 195 into engagement with the contact 196 and thereby establish an energizing current path for the locking members of inactive initiating circuits as follows: from one terminal of the battery $F^7$, through the conductors 238 and 241, through contacts 195 and 196, through conductor 242 and bus bar 206 and the interconnecting conductors 206' to the conductors 246 of the inactive panels; thence through the parallel connecting conductors 246 of such inactive panels, and through the associated magnets 111, conductors 247, contacts 114 and 115, conductors 248 or 248' (as the case may be), through the normally engaged contact 132 or contact 133, (as the case may be) through the normally positioned armatures 131 and conductors 264 to the bus bar 208; thence through said bar and interconnecting conductors 208' to conductor 264 of the active initiating circuit; thence through said conductor and its associated abnormally positioned armature 131 and the contact 132 or 133 (as the case may be), connected thereby, through the conductor 260 or 261' (as the case may be), to and through the armature 112 and arm 113, through conductor 251', bus bar 207 and conductor 243' to the other terminal of the battery $F^7$. Upon the energization of the electromagnets 111 of inactive circuits as just described, the armatures 112 associated therewith will move to locking position, and will thereby establish locking current paths as hereinbefore more fully explained.

It will be evident that the bells (if any) of such an initiating circuit, the bells $D^6$ and $E^6$, trouble bell 200, and the device F' will correctly respond to such a signal; and that said bells and device will be unresponsive to concurrent formulation of signals in other initiating circuits. After the conclusion of the formulation of such a signal of the controlling initiating circuit, as just described, the magnet 313 will remain deenergized for a period sufficient to permit movement of the member 311 such as will allow the contact 195 to move away from the contact 196, whereupon the locking members of inactive initiating circuits will be restored to normal.

Should the formulation of signals be simultaneously started in two or more initiating circuits, it is evident that the repeater of Fig. 4 will automatically select one of such circuits to control the circuits D and E and the device F', and that the signals of non-controlling initiating circuits (such as circuits B and C, when circuit A has been selected to control the repeater) will not interfere with the correct response of said circuits D and E and said device F' to the signal of such a controlling circuit.

Should a concurrent signal of a non-controlling initiating circuit substantially overlap that of a controlling circuit, it is evident that after the member 311 has been restored to its normal position following the conclusion of the signal of the controlling circuit, the repeater will be conditioned for response to any overlapping position of such non-controlling circuit.

Should an initiating circuit be abnormally conditioned for an extended period, it is evident that the repeater will be rendered unresponsive to all initiating circuits throughout such period, because of the absence of automatic restoring devices such as the devices $A^3$, $B^3$ and $C^3$ of Figs. 1 and 2, and devices $A^{3\prime}$, $B^{3\prime}$ and $C^{3\prime}$ of Fig. 3; and it is further evident that the bells of such initiating circuits will be responsive only to signals initiated therein, because of the absence of initiating circuit repeating mechanism such as the contactors A⁴, B⁴ and C⁴ of Figs. 1 and 2.

*Applicability of the embodiment of Fig. 4.*

In view of the functional characteristics of the repeater of Fig. 4, as just described, it is evident that this repeater is best adapted for use where the operating conditions are such that an attendant will at all times be available for the purpose of rendering such repeater unresponsive to circuits which are abnormally conditioned for an extended period and to non-controlling initiating circuits in which concurrent signals are likely to overlap those of a controlling circuit.

*Summary of the method of operation of the embodiment illustrated by Fig. 4.*

1. Magnets 130 of panels 101''' and 102''' are normally effectively energized by batteries A⁷ and B⁷, respectively, but the current normally flowing in circuit C from battery C⁷ is not strong enough to effectively energize magnet 130 of panel 103'''. The first signal impulse from any station A⁵ by de-energizing magnet 130 of A²'' and thus releasing armature 131, closes contact 133 of A²'', thereby establishing a current path from battery F⁷ through magnet 313 of F' and magnets of contactors D⁴ and E⁴.

2. Following the establishment of said current path, the following occurrences successively take place:

1st—The energization of magnet of contactor D⁴ attracts the armature associated therewith, thereby interrupting the current path through circuit D, thus causing bells D⁶ to sound; and the energization of magnet of contactor E⁴ attracts the armature associated therewith, thereby interrupting the current path through relay magnet 198 and resistance 199 and establishing a current path from battery E⁷ through circuit E, which current path excludes relay magnet 198 and resistance 199.

2nd—Thereupon, relay magnet 198 releases its armature, thereby establishing a current path from battery 201 through trouble bell 200, causing said bell to sound; and the exclusion of magnet 198 and resistance 199 allows sufficient current to flow through the remainder of circuit E to cause bells E⁶ to sound.

3rd—The energizing of magnet 313 causes release of member 311, which is then moved, as by spring 312, to close contacts 195 and 196, said member 311 being so controlled by the paper feeding mechanism of the register device F', that said member will not be thereafter moved to permit the separation of contact 195 from contact 196 until the expiration of a time longer than the longest interval between the impulses of any signal.

4th—The closing of contacts 195 and 196 establishes a current path from battery F⁷ for magnets 111 of B¹' and C¹' through the cooperation of current paths established through normally positioned armatures 131 of B²'' and C²''' with their associated contacts 132 and 133, respectively, and the path established between the abnormally positioned busy armature 131 and contact 133 of A²''; causing said magnets 111 to attract armatures 112 associated therewith.

5th—Magnet 111 of locking member A¹' is not energized because the current path therethrough is interrupted at contact 132 of A²''.

6th—The energization of magnets 111 of B¹' and C¹' causes closure of contacts 113 and 114, thereby rendering the energizing paths therethrough independent of the relationship between armatures 131 and contacts 132 and 133, of A²'', B²'' and C²''', so that armatures 112 of B¹' and C¹' will thereafter be retained in abnormal or attracted position until said energizing paths are broken by the separation of contact 195 from contact 196.

7th—The movement of armatures 112 of B¹' and C¹', immediately following engagement of contact 114 by contact 113, will move contact 114 away from contact 115 for the purpose of preventing energization of magnet 111 of A¹' through the stick-up current paths of either B¹' or C¹', in the event of subsequent normal positioning of the busy armature 131 of A²'' at a time when armature 131 of either B²'' or C²''' is normally positioned; and the engagement therewith of contact 114 will thereupon so retard the movement of contact 113 that armature 112 will move out of electrical connection therewith, so as to render magnet 313 unresponsive to subsequent movements of armatures 131 of B²'' and C²'''.

3. When circuit A is now again closed, by the active station A⁵, magnet 130 of A²'' is energized and its armature 131 thereupon moves away from contact 133 and thereby interrupts current path through magnet 313, and the magnets of contactors D⁴ and E⁴, thus restoring panel 101''' and circuits D and E to normal condition and completing the cycle of operations incident to one break and one make of any active station A⁵.

4. Interference of other stations with the active A⁵ is prevented as hereinbefore explained in detail.

5. When, as at the conclusion of the signal of the active station A⁵, the previously busy moving device or armature 131 of A²'' remains inactive for a time longer than the longest interval between the impulses of the signal of any of the stations A⁵, B⁵ and C⁵, the operation of the paper feeding mechanism of the device F' will, in a wellknown manner, cause movement of the member 311 to permit separation of contacts 195 and 196, thus causing deenergization of magnets 111 of B$^{1\prime}$ and C$^{1\prime}$, and permitting their armatures 112 to return to normal position; thereby restoring operative relationship between moving devices of B$^{2\prime\prime}$ and C$^{2\prime\prime\prime}$ and magnet 313 of F', together with magnets of contactors D$^4$ and E$^4$.

The embodiment of Fig. 4 differs, in functional characteristics, from the embodiments of Figs. 1, 2 and 5, and circuit G of Fig. 6, in that it does not provide reflex control of initiating circuits; differs from Figs. 1, 2, 3 and circuits A' and G of Fig. 6 in that it does not provide fully automatic elimination and restoration of responsiveness of faulty initiating circuits; and differs from Figs. 2, 3 and 6 in that it does not provide full non-interference between initiating circuits in the event of overlapping concurrent signals.

*Detailed description of embodiment of Fig. 5.*

In the illustrative embodiment of this invention which is diagrammatically shown by Fig. 5: the panel 101$^{iv}$ has the locking member A$^{1\prime\prime\prime}$ comprising the electromagnet 111, the armature 112, the flexible arm 113, and the contacts 114, 115, 119 and 120, together with the insulating spacer 122' carried by the contact 119; the originating mechanism A$^{2\prime\prime\prime}$ comprising the electromagnet 130, the armature 131, the front contact 132 and the back contact 133; the contactor A$^4$ comprising the electromagnet 161, the armature 162 and the front stop contact 163; the bus bars 206, 207, 208 and 211; the terminals 104 and 105; and the conductors 212, 213, 214, 220, 222, 246, 247, 248, 251', 260 and 264;—all of which correspond to the similarly designated parts of the repeaters of Figs. 1, 2, 3 and 4;—and the conductor 216' connects the conductors 213 and 214 to the armature 162, the conductor 219' connects the contact 119, and the conductors 220 and 222. The panel 102$^{iv}$ is similarly equipped and wired.

The panel 103$^{iv}$ has the locking member C$^{1\prime\prime\prime}$ comprising the electromagnet 111, the armature 112, the flexible arm 113, and the contacts 114, 115, 123, 124 and 125, and the insulating spacer 129'; the originating mechanism C$^{2\prime\prime\prime}$ comprising parts corresponding with those of the mechanisms A$^{2\prime\prime\prime}$ and B$^{2\prime\prime\prime}$; the contactor C$^4$ comprising parts corresponding with those of the mechanisms A$^4$ and B$^4$; the bus bars 206, 207, 208 and 211; the terminals 108, 109 and 110; the conductors 223, 224, 230, 246, 247, 248', 251', 261' and 264;—all of which correspond to the similarly designated parts of the repeaters of Figs. 1, 2, 3 and 4;—and the conductors 225' which connects contact 124 to the terminal 109, and the conductor 229' which connects the contact 125 to the armature 162.

The conductor 317 connects the bus bar 208 to the free end of the bus bar 211 of panel 101$^{iv}$. The contactors D$^4$ and E$^4$, the device F' and the battery F$^7$ are like the corresponding parts of the repeater of Fig. 4 and are similarly connected by corresponding conductors. The normally effective current paths of the circuits shown in Fig. 5 correspond with those of the repeaters hereinbefore more fully described.

*Detailed description of operation of embodiment of Fig. 5..*

The operation of the repeater of Fig. 5 in connection with the circuits therein shown is as follows:

Assuming that the various parts and current paths are normally conditioned (all moving parts being positioned as shown) should the formulation of a signal be initiated by any station, upon the first signaling impulse in the circuit in which such station is connected, the bells connected in such circuit will sound and the magnet 130 connected in such circuit will be abnormally conditioned; whereupon the armature 131 associated therewith will move into abnormal position and thereby establish a current path for the electromagnet 313 and the electromagnets of the contactors A$^4$, B$^4$, C$^4$, D$^4$ and E$^4$ as follows: from one terminal of the battery F$^7$, through conductors 238 and 239, winding of electromagnet 313, conductor 314, electromagnet winding of contactor E$^4$, conductor 315, electromagnet winding of contactor D$^4$, conductor 316' to the free end of the bus bar 211 of the panel 103$^{iv}$; thence through said bus bar and through the winding of electromagnet 161 serially included therein, through the interconnecting conductors 211' and the bus bars 211 and windings of electromagnets 161 of the panels 102$^{iv}$ and 101$^{iv}$; through the conductor 317 and the bus bars 208 and interconnecting conductors 208' to the panel of the active initiating circuit; thence through the conductor 264 and the abnormally positioned armature 131 of such panel, through the associated contact 132 or 133 (as the case may be), through the conductor 260 or 261' (as the case may be), through the armature 112, arm 113, conductor 251', bus bars 207, and the conductor 243', to the other terminal of the battery F$^7$.

As a result of the establishment of the current path just described, the magnets of the contactors A$^4$, B$^4$, C$^4$, D$^4$ and E$^4$ will be energized thus providing shunt current paths for the ciructis A and B and an alternative path for the circuit C as hereinbefore more fully explained, breaking the circuit D and revising the current path of circuit E so as to cause the bells D$^6$ and E$^6$ to sound; and the electromagnet 313 will be energized thus establishing an energized current path for the locking members of inactive circuits as hereinbefore more fully described in connection with the repeater of Fig. 4.

Upon the energization of the electromagnets 111 of inactive circuits incident to the initiating energization of the electromagnet 313 as just described, the armature 112 associated with said magnets will move to locking position and will thereby establish locking current paths as hereinbefore more fully explained. Such movement of said armatures will, in the cases of locking members such as $A^{1\prime\prime}$ and $B^{1\prime\prime}$ move the contacts 119 respectively associated therewith away from the cooperating contacts 120, and will thereby condition the initiating circuits connected thereto for response to their contactors (as, for example, the contactors $A^4$ and $B^4$) and in the case of the locking member $C^{1\prime\prime}$, such movement of the armature 112 will move the contact 123 away from the contact 124 and into engagement with the contact 125, thus similarly conditioning circuits such as the circuit C for response to their associated contactors such as the contactor $C^4$.

Upon the restoration to normal position of the armature 131 associated with the active initiating circuit, the current path through the contactors $A^4$, $B^4$, $C^4$, $D^4$ and $E^4$ will be interrupted, and thereupon the armatures of said contactors will be restored to normal position.

From the foregoing it will be seen that the signal of an active initiating circuit will be formulated in all non-controlling initiating circuits (such as circuits B and C, when circuit A has been selected to control the repeater) and in the circuits D and E, and will be manifested by the device F'. Inasmuch as the circuits A and B are not broken by the action of the repeater of Fig. 5 until the armature 131 of the controlling circuit is restored to normal position the initiating stations provided in circuits such as the circuits A and B of repeaters of this type should have closed type break-wheels, and those of circuits such as the circuit C should have open type break-wheels.

During the formulation of a signal in a controlling initiating circuit of the repeater of Fig. 5, said repeater will be unresponsive to concurrent formulation of signals in other initiating circuits; but initiating stations of non-controlling circuits, if equipped with non-interfering and succession mechanism, will delay transmission of their signals until after the completion of the signal of the controlling circuit.

Should the formulation of signals be simultaneously started in two or more initiating circuits, the repeater of Fig. 5 will automatically select one of such circuits, to control said repeater and the other circuits connected thereto. The signals of non-controlling initiating circuits will not interfere with the correct response of such repeater and the otherwise inactive initiating circuits subject to control thereby to the signal of such controlling circuit; and this repeater will not relinquish control of a non-controlling initiating circuit even if mutilation of the signal formulated by a signal initiating station connected therein will otherwise result from the action of said repeater (as, for example, through lack of effective non-interference mechanism in such a station). For this reason, signals of non-controlling circuits will not overlap unless formulated by initiating stations which lack effective non-interference mechanism.

Should an initiating circuit be abnormally conditioned for an extended period, the repeater of Fig. 5 will be rendered unresponsive to all other initiating circuits throughout such period, because of the absence of automatic restoring devices such as the devices $A^3$, $B^3$ and $C^3$ of Figs. 1, 2 and 3.

*Applicability of the embodiment of Fig. 5.*

In view of the functional characteristics of the repeater of Fig. 5, as just described, it is evident that this repeater is of the reflex type,—i. e., having facilities for at times formulating signals in circuits which may at other times be controlling circuits,—and is best adapted for use in connection with initiating stations having closed type break-wheels if connected by circuits of the type of circuits A and B, and having open type break-wheels if connected by circuits of the type of circuit C, and where the operating conditions are such that an attendant will at all times be available for the purpose of rendering such repeater unresponsive to circuits which are abnormally conditioned for an extended period.

*Summary of the method of operation of the embodiment illustrated by Fig. 5.*

1. Magnets 130 of panels $101^{iv}$ and $102^{iv}$ are normally effectively energized by batteries $A^7$ and $B^7$, respectively, but the current normally flowing in circuit C from battery $C^7$ is not strong enough to effectively energize magnet 130 of panel $103^{iv}$. The first signal impulse from any station $A^5$ by de-energizing magnet 130 of $A^{2\prime\prime}$ and thus releasing armature 131, closes contact 133 of $A^{2\prime\prime}$, thereby establishing a current path from battery $F^7$ through magnet 313 of F' and magnets of contactors $A^4$, $B^4$, $C^4$, $D^4$ and $E^4$.

2. Following the establishment of said current path, the following occurrences successively take place:

1st—The energization of magnets 161 of $A^4$, $B^4$ and $C^4$ causes their armatures 162 to move into engagement with their contacts 163, thus establishing shunt circuits through magnets 130 around contacts 119 and 120 in circuits A and B; the energization of the magnet $D^4$ causes interruption of circuit D and consequent sounding of bells $D^6$; and energization of magnet $E^4$ causes interruption of the current path through relay magnet 198 and resistance 199 and causes establishment of a current path from battery $E^7$ through circuit E, which current path excludes said magnet and resistance.

2nd—Thereupon, relay magnet 198 releases its armature, thereby establishing a current path from battery 201 through trouble bell 200, causing said bell to sound; and the exclusion of said magnet and resistance allows sufficient current to flow through the remainder of circuit E to cause bells $E^6$ to sound.

3rd—The energizing of magnet 313 causes release of member 311, which is then moved, as by spring 312, to close contacts 195 and 196, said member 311 being so controlled by the paper feeding mechanism of the register device F', that said member will not be thereafter moved to permit the separation of contact 195 from contact 196 until the expiration of a time longer than the longest interval between the impulses of any signal.

4th—The closing of contacts 195 and 196 establishes a current path from battery $F^7$ for magnets 111 of $B^{1''}$ and $C^{1''}$ through the cooperation of current paths established through normally positioned armatures 131 of $B^{2''}$ and $C^{2'''}$ with their associated contacts 132 and 133, respectively, and the path established between the abnormally positioned busy armature 131 and contact 133 of $A^{2''}$; causing said magnets 111 to attract armature 112 associated therewith.

5th—Magnet 111 of locking member $A^{1''}$ is not energized because the current path therethrough is interrupted at contact 132 of $A^{2''}$.

6th—The energization of magnets 111 of $B^{1''}$ and $C^{1''}$ causes closure of contacts 113 and 114, thereby rendering the energizing paths therethrough independent of the relationship between armatures 131 and contacts 132 and 133, of $A^{2''}$, $B^{2''}$ and $C^{2'''}$, so that armatures 112 of $B^{1''}$ and $C^{1''}$ will thereafter be retained in abnormal or attracted position until said energizing paths are broken by the separation of contact 195 from contact 196.

7th—The movement of armatures 112 of $B^{1''}$ and $C^{1''}$, immediately following engagement of contacts 114 thereof by their associated contacts 113, will move said contacts 114 away from said contacts 115 for the purpose of preventing energization of magnet 111 of $A^{1''}$ through the stick-up current paths of either $B^{1''}$ or $C^{1''}$, in the event of subsequent normal positioning of the busy armature 131 of $A^{2''}$ at a time when armature 131 of either $B^{2''}$ or $C^{2'''}$ is normally positioned; and the engagement therewith of said contacts 114 will thereupon so retard the movement of said contacts 113 that said armatures 112 will move out of electrical connection therewith, so as to render magnet 313 unresponsive to subsequent movements of armatures 131 of $B^{2''}$ and $C^{2'''}$.

8th—Further movement of armature 112 of $B^{1''}$ to fully attracted position breaks current path which normally shunts contacts 162 and 163 of $B^4$, and corresponding action of $C^{1''}$ establishes a new current path from battery $C^7$ through a portion of initating circuit C which excludes resistance 203 and magnet 202, but includes magnet 130 of $C^{2'''}$ and bells $C^6$, and is subject to interruption between contacts 162 and 163 of $C^4$.

9th—Magnet 202, when thus deenergized, releases its armature, thereby closing current path from battery 205 through trouble bell 204, causing said bell to sound.

10th—Upon establishment of such new path therethrough, the current flow through the bells $C^6$ is sufficient to cause them to sound.

3. When circuit A is now again closed, by the active station $A^5$, magnet 130 of $A^{2''}$ is energized and its armature 131 thereupon moves away from contact 133 and thereby interrupts current path through magnet 313, and magnets of contactors $A^4$, $B^4$, $C^4$, $D^4$ and $E^4$, the armatures of which then return to normal position, thus breaking the current paths previously established therethrough. When said paths are thus broken, the current flow through circuits B, C, D and E is interrupted, thus deenergizing alarm bells $B^6$, $C^6$, $D^6$ and $E^6$, causing said bells $B^6$ and $D^6$ to sound; thus restoring panel $101^{1v}$ and circuits D and E to normal condition and completing the cycle of operations incident to one break and one make of any active station $A^5$.

4. Interference of other stations with the active $A^5$ is prevented as hereinbefore explained in detail.

5. When, as at the conclusion of the signal of the active station $A^5$, the previously busy moving device or armature 131 of $A^{2''}$ remains inactive for a time longer than the longest interval between the impulses of the signal of any of the stations $A^5$, $B^5$ and $C^5$, the operation of the paper feeding mechanism of the device F' will, in a wellknown manner, cause movement of the member 311 to permit separation of contacts 195 and 196, thus causing deenergization of magnets 111 of $B^{1''}$ and $C^{1''}$, and permitting their armatures 112 to return to normal position; thereby restoring operative relationship between moving devices of $B^{2''}$ and $C^{2'''}$ and magnet 313 of F', together with magnets of contactors $A^4$, $B^4$, $C^4$, $D^4$ and $E^4$.

The embodiment of Fig. 5 differs, in functional characteristics, from the embodiments of Figs. 3, 4 and circuits A' and C' of Fig. 6 in that it provides reflex control of initiating circuits; differs from Figs. 1, 2 and 3 and circuits A and G of Fig. 6 in that it does not provide fully automatic elimination and restoration of responsiveness of faulty initiating circuits; and differs from Figs 2, 3 and 6 in that it does not provide full non-interference between initiating circuits in the event of overlapping concurrent signals.

*Detailed description of embodiment of Fig. 6.*

In the illustrative embodiment of this invention, which is diagrammatically shown by Fig. 6, the panel 101$^v$ has the locking member A$^1$ (which is similar to the locking member A$^1$ of Figs. 1 and 2;) the originating mechanism A$^{2\prime}$ (which is similar to mechanism A$^{2\prime}$ of Figs. 2 and 3); and the restoring device A$^{3\prime\prime}$ comprising the electromagnet 146, having windings 147 and 148, the armature 149, arm 150, stop contacts 151 and 152, and contact 155; and the conductors 212, 214', 220', 246, 247, 248, 249, 250, 251, 252, 253, 254, 255, 256, 257, 258, 259, 260, 261, 262, 263, 264, 279 and 280; and the bus bars 206, 207, 208, 209, 210, 211 and 278; all of which conductors and bus bars correspond with similarly designated conductors and bus bars of the repeaters of preceding figures, conductors 214' extending from contact 120 to one end of the winding of the magnet 130, and conductor 220' extending from contact 119 to terminal 105.

The panel 102$^v$ has the locking member B$^{1\prime\prime\prime\prime}$ comprising the electromagnet 111, the armature 112, flexible arm 113, and the contacts 114, 115, 116, 118, 119 and 120, together with the insulating spaces 122; the originating mechanism B$^{2\prime\prime\prime}$ comprising the electromagnet 130, the armature 131, the front contact 132, the back contact 133, the contacts 134 and 135, the flexible arm 274 and the contact 275; the restoring device B$^3$ (corresponding to the restoring devices A$^3$ and B$^3$ of Figs. 1 and 2); and the contactor B$^4$ (corresponding to the contactors A$^4$ and B$^4$ of the repeaters of Figs 1, 2 and 5) and the conductors 212, 213, 214, 215, 216, 217, 218, 219, 220, 221, 222, 246, 247, 248, 249, 250, 251, 252, 253, 254, 255', 256, 257, 259, 260, 262, 263, 264, 279 and 280, and bus bars corresponding to those of panel 101$^v$.

The panel 103$^v$ has the locking member C$^{1\prime\prime\prime\prime}$ comprising the electromagnet 111, the armature 112, the flexible arm 113, the contacts 114, 115, 123 and 124, and the insulating spacer 129' carried by the contact 123; the originating mechanism C$^{21v}$ comprising the electromagnet 130, the armature 131, front contact 132, and back contact 133, flexible arm 276, and contact 277, the conductors 223, 224, 225', 246, 247, 248', 251, 252, 261', 264, 279 and 280'; and bus bars corresponding to those of panel 102$^v$; all of which parts correspond with those of the repeaters of preceding figures which are similarly designated, the conductor 280' extending from the conductors 251 and 252 to the contact 277.

The adjoining ends of the bus bars of the panels are connected by conductors 206', 207' . . . as in the case of the repeaters of the preceding figures, and free ends of the bus bars 210 and 211 of the panel 101$^v$ are connected by the conductor 231.

The repeating mechanism f' and the retarded operative device f'' comprise parts and are connected by conductors corresponding with those of the similarly designated parts of the repeater of Fig. 2.

*Detailed description of operation of embodiment of Fig. 6.*

The operation of the repeater of Fig. 6 is as follows:

Assuming that the various parts and current paths are normally conditioned (as indicated by the drawing) should the formulation of a signal be initiated by one of the stations A$^5$, upon the first signaling impulse of the circuit A' incident to the formulation of such signal, the magnet 130 of the originating mechanism A$^2$ will be deenergized; whereupon the associated armature 131 will move into engagement with its back contact 133, thereby carrying the arm 274 into engagement with the contact 275, and permitting the contacts 134 and 136 to move into engagement with the contacts 135 and 137 respectively. The windings of the electromagnets 164 and 285 will be energized through current paths and with results corresponding with those hereinbefore more fully described in connection with the repeaters of Figs. 1 and 2. The rotation of the cylinder 168 incident to the energization of the electromagnet 164 just referred to, will carry the plate 179 into engagement with the pens 170 and 171, thereby effecting energization of the electromagnet 161 of the contactor B$^4$ and causing the armature 162 associated therewith to move into engagement with its stop contact 163; and the energization of the electromagnet 111 of the locking member B$^{1\prime\prime\prime\prime}$, incident to the energization of the electromagnet 285, just referred to, will cause the armature 112 to move to attracted position and thereby move the contact 119 away from the contact 120 so as to leave the circuit G subject to the control of the contactor B$^4$ so long as the restoring device B$^3$ remains in normal position, and the remaining action of the various parts of the panel 102$^v$ will correspond to those of the panel 102' of Fig. 2 in response to a signal of the panel 101' of said figure, as hereinbefore more fully described.

Upon the initial energization of the electromagnet 285, hereinbefore referred to, the electromagnet 111 of the locking member C¹'''' will be energized and will cause the armature 112 associated therewith to move the spacer 129' to carry the contact 123 away from the contact 124 and thereby interrupt the circuit C' so as to render the magnet 130 of said circuit unresponsive to the initiating stations C⁵ connected therein. Inasmuch as the lever 193 will remain in engagement with the contact 288 after the initial energization of the magnet 285 incident to the formulation of a signal in the circuit A' until the termination of a period longer than the longest interval between impulses of any signal during which period the magnet 285 has not been energized, it is evident that the circuit C' will remain broken at the locking member C¹'''' throughout the formulation of the signal of the circuit A' and for a suitable period thereafter.

Should the formulation of a signal be similarly initiated in circuit C' under like circumstances, a similar reaction upon circuits A' and G will ensue.

Should a signal be formulated in circuit G, the magnet 285 will be energized in response to the impulses of such signal, and the circuits A' and C' will therefore be held open by the locking members A¹ and C¹'''' respectively, throughout and for a suitable period following the completion of the formulation of such a signal, but the electromagnet 164 will not be energized incident to the formulation of any signal of the circuit G and the circuit D will therefore not be effected by the formulation of signals of the circuit G although such circuit D will respond to signals formulated in circuits A' and C'.

Assuming that the initiating stations A⁵ have effective non-interference and succession mechanism, and that the stations C⁵ have corresponding mechanism, it is evident that absolute non-interference and succession functions will be maintained between the initiating circuits and the responsive circuits (as typified by the circuit D) and that in the event of concurrent signal formulation, one of such signals will first be responded to by the circuits D and G and thereupon the signal of the other of such initiating circuits will be responded to by said circuits D and G; both of such responses being complete and without mutilation of the respective signals.

Assuming that the circuit G of the repeater shown in this figure is connected to another signaling system having an automatic repeater or other mechanism or devices capable of both formulation of and response to signals and having, collectively, non-interference and succession functions of a repeater inferior to that, for example, of Fig. 1; should the formulation of signals be simultaneously started in circuits A' and G; so long as the formulation of the signals of such circuits proceed in unison the repeating mechanism f' would act in response to the circuit A', and the electromagnets 111 of the locking members A¹ and B¹''' will remain deenergized. If action in unison is first interrupted by a closure and break of the circuit A' during an open circuit period of the circuit G, the locking member B¹'''' and the restoring device B³ will act so as to render the circuit G unresponsive to its contactor B⁴, as hereinbefore more fully explained, and the circuit D will respond to the complete signal of the circuit A'; and such circuit G will remain unresponsive to the repeater until the magnet 285 has remained deenergized for the required period during which both the circuits A' and G have remained in normal condition. Should unison of action be first interrupted by a closure of circuit G during an open circuit period of the circuit A', the repeater will be rendered unresponsive to the circuit A' and such circuit will be held open until after the expiration of the desired period following the conclusion of the signal of the circuit G, when the circuit A' will be again closed and its waiting succession station will again undertake the formulation of its signal.

*Applicability of the embodiments of Fig. 6.*

In view of the functions of the repeater of Fig. 6, as just described, it is evident that this repeater is suited for use where the operating conditions involve exceptional characteristics such as, for example, where there is a local fire alarm system for an institution comprising one or more circuits of manually operable non-interference and succession initiating stations, such as indicated by the circuit A' and the stations A⁵; a circuit connecting a plurality of automatically controlled initiating stations (as, for example, thermostatically controlled stations) each comprising a main line tripping magnet and formulating mechanism as represented by the circuit C' and the initiating stations C⁵; a connection to a municipal fire alarm system which should respond to alarms in either the manually operable or automatically operable local initiating stations as represented by circuit G; and local manifesting devices such as the bells D⁶ of the circuit D which should respond only to the signals of local circuits such as the circuits A' and C';—the conditions in the municipal fire alarm circuit G being such that it is important to prevent interference with signals in such circuit should any be in course of transmission when an attempt is made to cause the formulation of a signal by a local station, so that the succession feature of local stations on the various circuits may be fully utilized with relation to one another and with relation to signals of the municipal circuit G; and such that in the event of the simultaneous starting signals in one or more of the local circuits, and in the municipal circuit from a formulating source lacking fully effective non-interference and succession mechanism, the responsiveness of the municipal circuit will be automatically terminated should such circuit fail to respond to a signaling impulse of one of the local circuits or should a signaling impulse be formulated in the municipal circuit during inaction of the local circuit, to the end that signals of such a municipal circuit will not be interfered with through the action of the repeater even though such signals are being formulated by a device lacking fully effective non-interference mechanism.

It is also evident that the repeater of Fig. 6 is adapted for use where the operating conditions are such that an attendant will not be available at all times for the purposes of rendering such repeater unresponsive to circuits which are abnormally conditioned for an extended period and to a non-controlling initiating circuit in which concurrent signals may overlap those of a controlling circuit.

*Summary of the method of operation of the embodiment illustrated by Fig. 6.*

1. Magnets 130 of panels $101^v$ and $102^v$ are normally effectively energized by battery $A^7$ and the current source of circuit G, respectively, but the current normally flowing in circuit $C'$ from battery $C^7$ is not strong enough to effectively energize magnet 130 of panel $103^v$. The first signal impulse from any station $A^5$, by deenergizing magnet 130 of $A^{2\prime}$ and thus releasing armature 131, closes contact 133 and contacts 274 and 275 of $A^{2\prime}$, thereby energizing magnet 164 of $f'$ and magnet 285 of $f''$ from battery $F^7$. The energizing of magnet 164 releases cylinder 168, which is rotated by clockwork or other means, nearly one complete revolution; the arm 169 being arrested by escapement ledge 166. The energizing of magnet 285 attracts armature 284, thereby moving lever 193 so as to first engage contact 288 and then, at the end of its upward movement, to close contact 288 with contact 287.

2. During such rotation of cylinder 168, the following occurrences successively take place:

1st—Magnet 161 of the repeating make and break mechanism $B^4$ is energized from battery $F^7$ when pens 170 and 171 are connected by plate 179.

2nd—Resultant attraction of armature 162 moves it into engagement with contact 163, thus establishing a shunt circuit through magnet 130 around contacts 119 and 120 of circuit G.

3rd—Upon engagement of contact 288 by lever 193, magnets 111 of $B^{1\prime\prime\prime\prime}$ and $C^{1\prime\prime\prime\prime}$ are energized from battery $F^7$, through the cooperation of current paths established through normally positioned armatures 131, of $B^{2\prime\prime\prime\prime}$ and $C^{21v}$ with their associated contacts 132 and 133, respectively, and the path established between the abnormally positioned busy armature 131 and contact 133 of $A^{2\prime}$.

4th—Magnet 111 of locking member $A^1$ is not energized because the current path therethrough is interrupted at contact 132 of $A^{2\prime}$.

5th—The energization of magnets 111 of $B^{1\prime\prime\prime\prime}$ and $C^{1\prime\prime\prime\prime}$ causes closure of contacts 113 and 114, thereby rendering the energizing paths therethrough independent of the relationship between armatures 131 and contacts 132 and 133, of $A^{2\prime}$, $B^{2\prime\prime\prime\prime}$ and $C^{21v}$, so that armatures 112 of $B^{1\prime\prime\prime\prime}$ and $C^{1\prime\prime\prime\prime}$ will thereafter be retained in abnormal or attracted position until said energizing paths are broken by the separation of lever 193 from contact 288.

6th—The movement of armatures 112 of $B^{1\prime\prime\prime\prime}$ and $C^{1\prime\prime\prime\prime}$, immediately following engagement of contact 114 by contact 113, will move contact 114 away from contact 115 for the purpose of preventing energization of magnet 11 of $A^1$ through the stick-up current paths of either $B^{1\prime\prime\prime\prime}$ or $C^{1\prime\prime\prime\prime}$, in the event of subsequent normal positioning of the busy armature 131 of $A^{2\prime}$ at a time when armature 131 of either $B^{2\prime\prime\prime\prime}$ or $C^{21v}$ is normally positioned; and the engagement therewith of contact 114 will thereupon so retard the movement of contact 113 that armature 112 will move out of electrical connection therewith, so as to render magnet 164 unresponsive to subsequent movements of armatures 131 of $B^{2\prime\prime\prime\prime}$ and $C^{21v}$.

7th—Further movement of armature 112 of $B^{1\prime\prime\prime\prime}$ to fully attracted position breaks current path which normally shunts contacts 162 and 163 of $B^4$, and corresponding action of $C^{1\prime\prime\prime\prime}$ interrupts initiating circuit $C'$ between contact 123 and 124.

8th—Magnet 202, when thus deenergized, releases its armature, thereby closing current path from battery 205 through trouble bell 204, causing said bell to sound.

9th—Further rotation of cylinder 168 moves plate 281 away from pens 282 and 283, thereby interrupting the current path through the winding of magnet 285.

10th—The deenergizing of magnet 285 releases lever 193, allowing said lever to be moved downwardly by spring 194 subject to the retarding effect of the escapement connected therewith.

11th—Such rotation of cylinder 168 also moves plate 181 away from pens 174 and 175, thereby interrupting the current path through circuit D, thus causing bells D⁶ to sound.

12th—Additional rotation of cylinder 168 causes plate 180 to connect pens 172 and 173, thereby completing current path from battery F⁷ through the winding 147 of magnet 146 of restoring device A³'', thereby energizing said magnet; but the current path through winding 147 of B³ remains interrupted at contacts 134 and 135, so that said magnet remains deenergized.

13th—Armature 149 of A³'' moves in response to such energization of magnet 146, a current path being thereby completed through contact 151 from battery F⁷ through winding 148 of said magnet, so that when plate 180 is moved away from pens 172 and 173, by further rotation of the cylinder, said magnet will remain energized by said winding 148, and its armature will remain in attracted or abnormal position so long as armature 131 of A²' remains in abnormal position.

14th—Such movement of armature 149 of A³'' separates contact 150 from 152, thereby interrupting current path through and deenergizing magnet 164 of f', the armature of which then moves to retracted or normal position and carries ledge 166 out of, and ledge 167 into, the path of lever 169.

15th—If armature 131 of A²' is still in retracted or abnormal position after cylinder 168 has rotated so as to again bring plate 281 into contact with pens 282 and 283, the magnet 285 will be energized; but inasmuch as lever 193 carrying armature 284 will have been prevented, by the escapement connected therewith, from assuming a position where it does not close contacts 288 and 287, a current path is established through magnet 297, attracting armature 298, which acts to establish a stick circuit for said magnet and interrupts the current path through magnet 285. The lever 193 is thereupon moved downwardly by spring 194, subject to such retarding effect of the escapement associated therewith, that said lever will not move out of engagement with contact 288 until the expiration of a time longer than the longest interval between the impulses of any signal.

16th—Ensuing rotation of cylinder 168 restores all plates carried thereby to normal position, and thereby interrupts the current path through magnet 161 of B⁴, the armature of which then returns to normal position, thus breaking the current path controlled thereby.

17th—When said path is thus broken, the current flow through circuit G is interrupted, thus causing response of signaling devices connected therein.

3. When circuit A is now again closed, by the active station A⁵, magnet 130 of A²' is energized and its armature 131 moves contact 136 from 137; magnet 146 of A³'' is thereupon deenergized and its armature 149 retracted, thus restoring panel 101ᵛ to normal condition; and the current path through magnet 297 being broken by the separation of contacts 274 and 275, said magnet 297 is deenergized and armature 298 retracted, thus restoring the current paths associated therewith to normal condition and completing the cycle of operations incident to one break and one make of any active station A⁵.

4. Interference of other stations with the active A⁵ is prevented as hereinbefore explained in detail.

5. When, as at the conclusion of the signal of the active station A⁵, the previously busy moving device or armature 131 of A²' remains inactive for a time longer than the longest interval between the impulses of the signal of any of the stations A⁵ and C⁵, the lever 193 will be permitted, by the escapement associated therewith, to move away from contact 288, thus causing deenergization of magnets 111 of B¹'''' and C¹'''', and permitting their armatures 112 to return to normal position; thereby restoring operative relationship between moving devices of B²'''' and C²¹ᵛ and magnet 164 of f'.

The embodiment of Fig. 6 differs, in functional characteristics, as to circuits A' and C', from the embodiments of Figs. 1, 2 and 5, in that they do not provide reflex control of initiating circuits; as to circuit G, from the embodiments of Figs. 3 and 4, in that it provides reflex control of the initiating circuits; as to circuits A' and G, from the embodiments of Figs. 4 and 5, in that they provide fully automatic elimination and restoration of responsiveness of faulty initiating circuits; as to circuit C', from the embodiments of Figs. 1, 2 and 3, in that it does not provide fully automatic elimination and restoration of responsiveness of faulty initiating circuits; and as to circuits A', C' and G, from the embodiments of Figs. 1, 4 and 5, in that said circuits provide full non-interference between initiating circuits in the event of overlapping concurrent signals.

Embodiments of this invention suited to other operating conditions and for accomplishing differing functions than those hereinbefore described will readily suggest themselves to those skilled in this art, in the light of the foregoing examples, and it is therefore evident that this invention is not limited to the embodiments illustrated by the accompanying drawings and hereinbefore described; but that this invention may be variously embodied, and that various parts may be added, omitted or changed in form or arrangement; and that mechanically actuated instrumentalities and electromagnetically actuated instrumentalities may be interchanged (as for example, by the substitution of the armature 284, magnet 285, plate 281 and pens 282 and 283 of Fig. 2 for the cam 184 and arm 185 of Fig. 1, for effecting actuation of the lever 193 incident to rotation of the cylinder 168) without departing from the spirit of this invention.

What I therefore claim and desire to secure by Letters Patent of the United States of America is:—

1. In a repeater: a plurality of originating magnets; a moving device for each magnet; repeating mechanism arranged for response to activity of any moving device or devices; restoring mechanism comprising restoring members independently movable for at times suspending the responsive relationship of said repeating mechanism to respective ones of said moving devices; restore-controlling mechanism comprising means controlled by movement of any moving device from its normal position for effecting actuation of the restoring members associated with all other moving devices then in abnormal position; and means arranged for response to each moving device to avoid restoring actuation of the restoring member associated therewith other than when such moving device is in an abnormal position.

2. In a repeater: a plurality of originating mechanisms each comprising a moving device; locking mechanism for all originating mechanisms comprising an independently movable locking member for each originating mechanism, and involving means associated with each originating mechanism for preventing locking action of its associated locking member when the moving device of such originating mechanism is out of its normal position, and lock controlling mechanism comprising means controlled by an initial movement of any moving device out of its normal position for simultaneously effecting actuation of the locking members associated with all originating mechanisms then remaining in normal positions; means controlled by the diverse positions of busy moving devices for effecting actuation of remaining unactuated locking members associated with originating mechanisms whose moving devices are in normal position while that of another is in abnormal position; and means controlled by each moving device for preventing action of the locking member associated therewith when it is the final moving device returned to normal position.

3. In a repeater: a plurality of originating mechanisms each comprising a moving device, locking mechanism for all originating mechanisms comprising an independently movable locking member for each originating mechanism and lock controlling mechanism comprising means responsive to movement of any moving device from its normal to its abnormal position, repeating mechanism so associated with respective locking members as to be effective only when the locking member is abnormally positioned and retarded operative mechanism for said lock controlling mechanism for effecting restoration of all actuated locking members only after all moving members have remained inactive for a period longer than the longest interval between responses thereof to any signal.

4. In a repeater: a plurality of originating mechanisms each comprising a moving device, locking mechanism for all originating mechanisms comprising an independently movable locking member for each originating mechanism and lock controlling mechanism comprising means responsive to movement of any moving device from its normal to its abnormal position, repeating mechanism responsive to each movement of any moving device from normal to abnormal position while the locking member associated with that device is normally positioned, and retarded operative mechanism for said lock controlling mechanism for effecting restoration of all actuated locking members only after all moving members have remained inactive for a period longer than the longest interval between responses thereof to any signal.

5. In a repeater: a plurality of originating mechanisms each comprising a moving device; locking mechanism for all originating mechanisms comprising an independently movable locking member for each originating mechanism, and involving means associated with each originating mechanism for preventing locking action of its associated locking member when the moving device of such originating mechanism is out of its normal position, and lock controlling mechanism comprising means responsive to movement of any device from its normal to its abnormal position; repeating mechanism so associated with respective locking members as to be effective only when the locking member is abnormally positioned; and retarded operative mechanism for said lock controlling mechanism for effecting restoration of all actuated locking members only after all moving members have remained inactive for a period longer than the longest interval between response thereof to any signal.

6. In a repeater: a plurality of originating mechanisms each comprising a moving device; locking mechanism comprising independently movable locking members for individual originating mechanism and involving means associated with each originating mechanism for preventing locking action of its associated locking member when the moving device of such originating mechanism is out of its normal position, and lock controlling mechanism comprising means controlled by movement of any moving device from its normal to its abnormal position by simultaneously effecting actuation of the locking members associated with all originating mechanisms then in normal position; repeating mechanism so associated with respective locking members as to be effective only when the locking member is abnormally positioned; and retarded operative mechanism for said lock controlling mechanism for effecting restoration of all actuated locking members only after all moving members have remained inactive for a period longer than the longest interval between responses thereof to any signal.

7. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means controlled by movement of any moving device out of its normal position for simultaneously effecting actuation of the locking members associated with all originating mechanisms then in normal position; means controlled by each moving device for preventing actuation of the locking member associated therewith when it is the final moving device returned to normal position; repeating mechanism for moving devices comprising independent circuit controllers for the current paths of individual originating magnets, each circuit controller being so associated with its corresponding member as to be effective only when the locking member is abnormally positioned; and retarded operative mechanism for said lock controlling mechanism for effecting the restoration of all actuated locking members only after the lock controlling mechanism has remained inactive for a period longer than the longest interval between responses thereof to any signal.

8. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means controlled by an initial movement of any moving device out of its normal position for simultaneously effecting actuation of the locking members associated with all originating mechanisms then remaining in normal position; means controlled by each moving device for preventing actuation of the locking member associated therewith when it is the final moving device returned to normal position; repeating mechanism for moving devices comprising independent circuit controllers for the current paths of individual originating magnets, each circuit controller being so associated with its corresponding locking member as to be effective only when the locking member is abnormally positioned; and retarded operative mechanism for said lock controlling mechanism for effecting restoration of all actuated locking members only after the lock controlling mechanism has remained inactive for a period longer than the longest interval between responses thereof to any signal.

9. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means controlled by an initial movement of any moving device out of its normal position for simultaneously effecting actuation of the locking members associated with all originating mechanisms then remaining in normal position; means controlled by each moving device for preventing actuation of the locking member associated therewith when it is the final moving device returned to normal position; repeating mechanism for all moving devices comprising an independent circuit controller for the current path of each originating magnet, each circuit controller being so associated with its corresponding locking member as to be effective only when the locking member is abnormally positioned; and retarded operative mechanism for said lock controlling mechanism for effecting restoration of all actuated locking members only after the lock controlling mechanism has remained inactive for a period longer than the longest interval between responses thereof to any signal.

10. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means controlled by an initial movement of any moving device out of its normal position for simultaneously effecting actuation of the locking members associated with all originating mechanisms then remaining in normal position; means controlled by the diverse positions of busy moving devices for effecting actuation of remaining unactuated locking members associated with originating mechanisms whose moving devices are in normal position while that of another is in abnormal position; means controlled by each moving device for preventing actuation of the locking member associated therewith when it is the final moving device returned to normal position; and repeating mechanism for all moving devices comprising an independent circuit controller for the current path of each originating magnet, each circuit controller being so associated with its corresponding locking member as to be effective only when the locking member is abnormally positioned.

11. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means controlled by movement of any moving device out of its normal position for simultaneously effecting actuation of the locking members associated with all originating mechanisms then in normal position; means controlled by the diverse positions of busy moving devices for effecting actuation of remaining inactuated locking members associated with originating mechanisms whose moving devices are in normal position while that of another is in abnormal position; means controlled by each moving device for preventing actuation of the locking member associated therewith when it is the final moving device returned to normal position; repeating mechanism for all moving devices comprising an independent circuit controller for the current path of each originating magnet, each circuit controller being so associated with its corresponding locking member as to be effective only when the locking member is abnormally positioned; and retarded operative mechanism for said lock controlling mechanism for effecting restoration of all actuated locking members only after the lock controlling mechanism has remained inactive for a period longer than the longest interval between responses thereof to any signal.

12. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means controlled by an initial movement of any moving device out of its normal position for simultaneously effecting actuation of the locking members associated with all originating mechanisms then remaining in normal position; means controlled by the diverse positions of busy moving devices for effecting actuation of remaining unactuated locking members associated with originating mechanisms whose moving devices are in normal position while that of another is in abnormal position; means controlled by each moving device for preventing actuation of the locking member associated therewith when it is the final moving device returned to normal position; repeating mechanism for all moving devices comprising an independent circuit controller for the current path of each originating magnet, each circuit controller being so associated with its corresponding locking member as to be effective only when the locking member is abnormally positioned; and retarded operative mechanism for said lock controlling mechanism for effecting restoration of all actuated locking members only after the lock controlling mechanism has remained inactive for a period longer than the longest interval between responses thereof to any signal.

13. In a repeater: a plurality of originating mechanisms each comprising a moving device; locking mechanism for all originating mechanisms comprising an independently movable locking member for each originating mechanism and involving means associated with each originating mechanism for preventing locking action of its associated locking member when the moving device of such originating mechanism is out of its normal position, and lock controlling mechanism comprising means responsive to movement of any moving device from its normal to its abnormal position, and arranged to simultaneously effect actuation of the locking members associated with all originating mechanisms in normal position upon initial actuation thereof; means controlled by the diverse positions of busy moving devices for effecting actuation of remaining unactuated locking members associated with originating mechanisms whose moving devices are in normal position while that of another is in abnormal position; means controlled by each moving device for preventing actuation of the locking member associated therewith when it is the final moving device returned to normal position; repeating mechanism for all moving devices comprising an independent circuit controller for the current path of each originating magnet, each circuit controller being so associated with its corresponding locking member as to be effective only when the locking member is abnormally positioned; and retarded operative mechanism for said lock controlling mechanism for effecting restoration of all actuated locking members only after the lock controlling mechanism has remained inactive for a period longer than the longest interval between responses thereof to any signal.

14. In a repeater: a plurality of originating mechanisms, one for each initiating circuit; a plurality of locking mechanisms, one for each originating mechanism; each of said mechanisms having an electromagnet and a moving device associated therewith movable from a normal to an abnormal position; a retarded operative device common to all of said mechanisms; and means, including said electromagnets and said moving devices together with other conductors, connecting said mechanisms and said retarded operative device so that the moving device of any one of said locking mechanisms may be moved to abnormal position only when the moving device of the originating mechanism associated therewith is normally positioned at a time when the moving device of some other of said originating mechanisms is abnormally positioned, and so that when the moving device of any of said locking mechanisms has been so moved to abnormal position, such moving device will remain in such abnormal position until the moving devices of all of said originating mechanisms have remained in normal position for more than a predetermined duration of time.

15. In a repeater: a plurality of originating mechanisms, one for each initiating circuit; a plurality of locking mechanisms, one for each originating mechanism; a plurality of repeating mechanisms, one for each responsive circuit; each of said mechanisms having an electromagnet and a moving device associated therewith movable from a normal to an abnormal position; a retarded operative device common to all of said mechanisms; and means, including said electromagnets and said moving devices together with other conductors, connecting said mechanisms and said retarded operative device so that the moving device of any one of said locking mechanisms may be moved to abonrmal position only when the moving device of the originating mechanism associated therewith is normally positioned at a time when the moving device of some other of said originating mechanisms is abnormally positioned, so that when the moving device of any of said locking mechanisms has been so moved to abnormal position, such moving device will remain in such abnormal position until the moving device of all of said originating mechanisms have remained in normal position for more than a predetermined duration of time, and so that during each actuation of said retarded operative device said repeating mechanisms will be abnormally conditioned.

16. In a repeater: a plurality of originating mechanisms, one for each initiating circuit; a plurality of locking mechanisms, one for each originating mechanism; a plurality of repeating mechanisms, one for each responsive circuit; each of said mechanisms having an electromagnet and a moving device associated therewith movable from a normal to an abnormal position; an electromagnetically controlled retarded operative device arranged for response to activity of the moving device or devices of any originating mechanism or mechanisms; and means, including said electromagnets and said moving devices together with other conductors, connecting said mechanisms and said retarded operative device so that the moving device of any one of said locking mechanisms may be moved to abnormal position only when the moving device of the originating mechanism associated therewith is normally positioned at a time when the moving device of some other of said originating mechanisms is abnormally positioned, so that when the moving device of any of said locking mechanisms has been so moved to abnormal position, such moving device will remain in such abnormal position until the moving device of all of said originating mechanisms have remained in normal position for more than a predetermined duration of time, and so that during each actuation of said retarded operative device said repeating mechanisms will be abnormally conditioned.

17. In a repeater: a plurality of originating mechanisms one for each initiating circuit; a plurality of locking mechanisms, one for each originating mechanism; a plurality of restoring mechanisms, one for each set of originating and locking mechanisms; each of said mechanisms having an electromagnet and a moving device associated therewith movable from a normal to an abnormal position; a retarded operative device common to all of said mechaisms; and means, including said electromagnets and said moving devices together with other conductors, connecting said mechanisms and said retarded operative device so that the moving device of any of said locking mechanisms may be moved to abnormal position only when the moving device of the originating mechanism associated therewith is normally positioned at a time when the moving device of some other of said originating mechanisms is abnormally positioned, so that when the moving device of any of said locking mechanisms has been so moved to abnormal position, such moving device will remain in such abnormal position until the moving devices of all of said originating mechanisms have remained in normal position for more than a predetermined duration of time, and so as to provide for the joint control of any of said restoring mechanisms by the respective sets of originating and locking mechanisms associated therewith.

18. In a repeater: a plurality of originating mechanisms, one for each initiating circuit; a plurality of locking mechanisms, one for each originating mechanism; a plurality of restoring mechanisms, one for each set of originating and locking mechanisms; each of said mechanisms having an electromagnet and a moving device associated therewith movable from a normal to an abnormal position; an electromagnetically controlled retarded operative device; and conductors interconnecting said mechanisms and said device, the connections provided for such conductors being so arranged as to provide for the control of said device in common by said originating mechanisms each subject to the positioning of its associated locking mechanism. so arranged that activity of said restoring mechanisms may effect suspension of control of said device by individual ones of said originating mechanism, so arranged as to connect individual restoring mechanisms with respective sets of originating and locking mechanisms in such manner that the condition of any one of said restoring mechanisms will be changed from normal to abnormal only immediately following abnormal conditioning of the associated originating mechanism, and so arranged that the condition of such restoring mechanism will not be changed from abnormal to normal while either the originating or the locking mechanism associated therewith is abnormally conditioned.

19. In a repeater: a plurality of originating mechanisms, one for each initiating circuit; a plurality of locking mechanisms, one for each originating mechanism; a plurality of restoring mechanisms, one for each set of originating and locking mechanisms; a plurality of repeating mechanisms, one for each responsive circuit; each of said mechanisms having an electromagnet and a moving device associated therewith movable from a normal to an abnormal position; a retarded operative device common to all of said mechanisms; and means, including said electromagnets and said moving devices together with other conductors, connecting said mechanisms and said retarded operative device so that the moving device of any one of said locking mechanisms may be moved to abnormal position only when the moving device of the originating mechanism associated therewith is normally positioned at a time when the moving device of some other of said originating mechanisms is abnormally positioned, so that when the moving device of any of said locking mechanisms has been so moved to abnormal position, such moving devices will remain in such abnormal position until the moving devices of all of said originating mechanisms have remained in normal position for more than a predetermined duration of time, so as to provide for the joint control of any of said restoring mechanisms by the respective sets of originating and locking mechanisms associated therewith, and so that during each actuation of said retarded operative device said repeating mechanisms will be abnormally conditioned.

20. In a repeater: a plurality of originating mechanisms, one for each initiating circuit; a plurality of locking mechanisms, one for each originating mechanism; each of said mechanisms having an electromagnet and a moving device associated therewith movable from a normal to an abnormal position; an electromagnetically controlled retarded operative device arranged for response to activity of the moving device or devices of any originating mechanism or mechanisms; and means, including said electromagnets and said moving devices together with other conductors, connecting said mechanisms and said retarded operative device so that the moving device of any one of said locking mechanisms may be moved to abnormal position only when the moving device of the originating mechanism associated therewith is normally positioned at a time when the moving device of some other of said originating mechanisms is abnormally positioned, and so that when the moving device of any of said locking mechanisms has been so moved to abnormal position, such moving device will remain in such abnormal position until the moving devices of all of said originating mechanisms have remained in normal position for more than a predetermined duration of time.

21. In a repeater: a plurality of originating mechanisms, one for each initiating circuit; a plurality of locking mechanisms, one for each originating mechanism; each of said mechanisms having an electromagnet and a moving device associated therewith movable from a normal to an abnormal position; and means including contacts operable by said moving devices and conductors connecting said contacts, magnets and moving devices, to be rendered effective whenever the moving device associated with any originating mechanism moves from normal to abnormal position for abnormally conditioning current paths through those locking mechanism electromagnets whose associated originating and locking mechanism moving devices are not then abnormally positioned.

22. In a repeater: a plurality of originating mechanisms, one for each initiating circuit; a plurality of locking mechanisms, one for each originating mechanism; a plurality of repeating mechanisms, one for each responsive circuit; each of said mechanisms having an electromagnet and a moving device associated therewith movable from a normal to an abnormal position; a retarded operative device common to all of said mechanisms; means including contacts operable by the moving devices of said originating and locking mechanisms and conductors connecting said contacts and magnets of said originating and locking mechanisms, to be rendered effective whenever the moving device associated with any originating mechanism moves from normal to abnormal position for abnormally positioning current paths through those locking mechanism electromagnets whose associated originating and locking mechanism moving devices are not then abnormally positioned; and means involving portions of said last named means and including contacts operable by the moving devices of said originating and locking mechanisms and conductors connecting said contacts and the magnets of said repeating mechanisms with certain of the contacts of said last named means, to cause abnormal conditioning of said repeating mechanism during each actuation of said retarded operative device.

23. In a repeater: a plurality of originating mechanisms, one for each initiating circuit; a plurality of locking mechanisms, one for each originating mechanism; each of said mechanisms having an electromagnet and a moving device associated therewith movable from a normal to an abnormal position; means including said magnets and moving devices for abnormally conditioning a current path through the magnet of each locking mechanism whose associated originating mechanism moving device is not abnormally positioned upon the movement of the moving device of any other originating mechanism from normal to abnormal position; a plurality of restoring devices, one for each set of originating mechanism, each having an electromagnet and an armature therefor; and means involving said first named means, providing for the joint control of any of said restoring devices by the sets of originating and locking mechanisms respectively associated therewith.

24. In a repeater: a plurality of originating mechanisms, one for each initiating circuit; a plurality of locking mechanisms, one for each originating mechanism; each of said mechanisms having an electromagnet and a moving device associated therewith movable from a normal to an abnormal position; means including said magnets and moving devices for abnormally conditioning a current path through the magnet of each locking mechanism whose associated originating mechanism moving device is not abnormally positioned upon the movement of the moving device of any other originating mechanism from normal to abnormal position; a plurality of individual repeating mechanisms, one for each responsive circuit; a common repeating mechanism responsive to movement of the moving devices of said originating mechanisms from normal to abnormal position; a plurality of restoring devices, one for each set of originating and locking mechanisms, each having an electromagnet and an armature therefor; and means, involving said first named means, providing for the joint control of any of said restoring devices by the sets of originating and locking mechanisms respectively associated therewith and by said common repeating mechanism.

25. In a repeater: a plurality of originating mechanisms, one for each initiating circuit; a plurality of locking mechanisms, one for each originating mechanisms; each of said mechanisms having an electromagnet and a moving device associated therewith movable from a normal to an abnormal position; means including said magnets and said moving devices for abnormally conditioning a current path through the magnet of each locking mechanism whose originating mechanism moving device is not abnormally positioned upon the movement of the moving device of any other originating mechanisms from normal to abnormal position; an electromagnetically controlled retarded operated device arranged for response to activity of the moving device or devices of any originating mechanism or mechanisms; and means, involving said first named means, whereby the electromagnets of said locking mechanisms will be abnormally conditioned only following an initial actuation of said retarded operative device and prior to the expiration of a time when said device has not acted for a period greater than the longest interval between impulses in any signal for which the repeater is intended.

26. In a repeater: a plurality of originating mechanisms, one for each initiating circuit; a plurality of locking mechanisms, one for each originating mechanisms; each of said mechanisms having an electromagnet and a moving device associated therewith movable from a normal to an abnormal position; means including said magnets and moving devices for abnormally conditioning a current path through the magnet of every locking mechanism whose originating mechanism moving device is not abnormally positioned upon the movement of the moving device of any other originating mechanism from normal to abnormal position; an electromagnetically controlled retarded operative device arranged for response to activity of the moving device or devices of any originating mechanism or mechanisms; means, involving said first named means, providing for the control of said device in common by said originating mechanisms each subject to the positioning of its associated locking mechanism; and means involving said first and second named means whereby the electromagnets of said locking mechanisms will be abnormally conditioned only following an initial actuation of said retarded operative device and prior to the expiration of the time when said device has not acted for a period greater than the longest interval between impulses in any signal for which the repeater is intended.

27. In a repeater: a plurality of originating mechanisms, one for each initiating circuit; a plurality of locking mechanisms, one for each originating mechanism; each of said mechanisms having an electromagnet and a moving device associated therewith movable from a normal to an abnormal position; means including said magnets and moving devices for abnormally conditioning a current path through the magnet of each locking mechanism whose originating mechanism moving device is not abnormally positioned upon the movement of the moving device of any other originating mechanism from normal to abnormal position; an electromagnetically controlled combined retarded operative device and common repeating mechanism arranged for response to activity of the moving device or devices of any originating mechanism or mechanisms; means, involving said first named means, providing for the control of said device in common by said originating mechanisms, each subject to the positioning of its associated locking mechanisms; a plurality of individual repeating mechanisms, one for each responsive circuit; and means whereby said individual repeating mechanism will be abnormally conditioned during each actuation of said common repeating mechanisms.

28. In a repeater: a repeating mechanism for a responsive circuit; a responsive mechanism; each of said mechanisms having an electromagnet and a moving device associated therewith movable from a normal to an abnormal position; means for rendering said repeating mechanism responsive to desired signal initiations; a restoring mechanism, having an electromagnet and a moving device associated therewith movable from a normal to an abnormal position; and means whereby the condition of said responsive circuit can be altered by the action of said repeating mechanism only when said restoring mechanism is normally conditioned, and whereby said restoring mechanism will be abnormally conditioned whenever the moving device of said responsive mechanism is abnormally positioned during a period when said repeating mechanism is abnormally positioned.

29. In a repeater: a plurality of independent sections each adapted for individual or collective use and each comprising,—an electromagnet for inclusion in a desired signal originating circuit; a moving device controlled by said magnet and involving means for controlling energy from a suitable source; media arranged for association with corresponding media of other like sections, when mounted in intended relation thereto, so as to provide an operatively continuous relationship between such sections; means, including said media, for conducting energy from such a suitable source to the controlling means of said moving device; and a locking member arranged for operation by energy from such a source to suspend control of such energy by the controlling means of any of said sections only when the moving device of such section is normally positioned at a time when the moving device of another section mounted in cooperative relationship therewith is abnormally positioned.

30. In a repeater: a plurality of independent sections each adapted for individual or collective use and each comprising,—an electromagnet for inclusion in a desired signal originating circuit; a moving device controlled by said magnet and involving means for controlling energy from a suitable source; means for conducting energy from such a suitable source to the controlling means of said moving device; and a locking member arranged for operation by energy from such a source to at times suspend control of such energy by said controlling means.

31. In a repeater: a plurality of independent sections each adapted for individual or collective use and each comprising,—an electromagnet for inclusion in a desired signal originating circuit; a moving device controlled by said magnet and involving means for controlling energy from a suitable source; a restoring device having an electromagnet and an armature therefor; means responsive to the positioning of said moving device for controlling the energization of said last named electromagnet; means for subjecting energy from such a suitable source to control by the controlling means of said moving device; and means, including said restoring device, arranged to at times suspend the effectiveness of the control of such energy by said controlling means.

32. In a repeater: a plurality of independent sections each adapted for individual or collective use and each comprising,—an electromagnet for inclusion in a desired signal originating circuit; a moving device controlled by said magnet and involving means for controlling energy from a suitable source a restoring device having an electromagnet and an armature therefor; means responsive to the positioning of said moving device for controlling the energization of said last named electromagnet; and means for subjecting energy from such a suitable source to control by the controlling means of said moving device, and involving means so communicating with said moving device and with said restoring device that the control of such energy by said moving device can be accomplished only upon movement thereof from normal to abnormal position and so that when the control of such energy has been so accomplished, its control by said moving device will be suspended by said restoring device until said moving device has resumed its normal position.

33. In an independent unit section for a repeater: an electromagnet for inclusion in a desired signal originating circuit: a moving device controlled by said magnet and involving means for controlling energy from a suitable source; media arranged for association with corresponding media of other like sections, when mounted in intended relation thereto, so as to provide for joint control, by the controlling means of sections so associated, of energy from such a source; and means, involving said media, arranged to at times suspend the effectiveness of the control of such energy by said controlling means.

34. In an independent unit section for a repeater: a moving device involving means for controlling energy from a suitable source; means whereby said device may be rendered responsive to signal initiating mechanism; a restoring device; means responsive to the positioning of said moving device for controlling the actuation of said restoring device; media arranged for association with corresponding media of other like sections, when mounted in intended relation thereto, so as to provide for joint control, by the controlling means of sections so associated, of energy from such a source; and means, involving said restoring device and said media, arranged to at times suspend the effectiveness of the control of such energy by said controlling means.

35. In an independent unit section for a repeater: a moving device involving means for controlling energy from a suitable source; means whereby said device may be rendered responsive to signal initiating mechanism; media arranged for association with corresponding media of other like sections, when mounted in intended relation thereto, so as to provide for joint control, by the controlling means of sections so associated, of energy from such a source; and a locking member so arranged and associated with said media as to act to suspend control of such energy of said moving device only when said device is normally positioned at a time when the moving device of some other section so associated is abnormally positioned.

36. In an independent unit section for a repeater: an electromagnet for inclusion in a desired signal originating circuit; a moving device controlled by said magnet and involving means for controlling energy from a suitable source; a restoring member; media arranged for association with corresponding media of other like sections, when mounted in intended relation thereto so as to provide for joint control, by the controlling means and restoring members so associated, of energy from such a source; and means, involving said first named means and said media, arranged so as to enable co-operative relationship with any suitable restore controlling mechanism to be so effected that, when a plurality of such sections are associated in cooperating relation, movement of the moving device of any associated section from normal position will effect functional actuation of said restoring member only when said first named moving device is abnormally positioned.

37. In an independent unit section for a repeater: a moving device involving means for controlling energy from a suitable source; means whereby said device may be rendered responsive to signal initiating mechanism; a restoring device having an electromagnet and an armature therefor; media arranged for association with corresponding media of other like sections, when mounted in intended relation thereto, so as to provide for joint control, by the controlling means and restoring members so associated, of energy from such a source; and means, including said media, for subjecting energy from such a suitable source to control by the controlling means of said moving device, and involving means so communicating with said moving device and with said restoring device that the control of such energy by said moving device can be accomplished only upon movement thereof from normal to abnormal position and so that when the control of such energy has been so accomplished, its control by said moving device will be suspended by said restoring device until said moving device has resumed its normal position.

38. In an independent unit section for a repeater: an originating mechanism comprising a moving device involving means for controlling energy from a suitable source, and means whereby said device may be rendered responsive to signal initiating mechanism; media arranged for association with corresponding media of other like sections, when mounted in intended relation thereto, so as to provide for joint control, by the controlling means of sections so associated, of energy from such a source and of an extraneous lock controlling mechanism; a locking member so associated with said media that it may derive energy therefrom to cause action of said member to effect suspension of the control exercised by said moving device and to avoid such suspension when said moving device is abnormally positioned; means involving said media and so arranged that, when associated with corresponding media of other like sections, such a source of energy, and a suitable lock controlling mechanism, an initial action of such controlling mechanism will occur in response to abnormal positioning of the moving device of any section whose media is so associated and thereby simultaneously effect actuation of the locking members of all such sections whose originating mechanisms are then normally conditioned, means arranged for control by the diverse positions of busy moving devices of such sections for effecting actuation of said locking member when it has remained unactuated at a time when said moving device is in normal position while that of another of such sections is in abnormal position; and means controlled by said moving device for preventing action of said locking member when its moving device is the final one of several sections to be returned to normal position.

39. In an independent unit section for a repeater: an originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause abnormal conditioning of an extraneous retarded operative device; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned; and means involving said media for effecting abnormal positioning of said locking member during abnormal conditioning of said retarded operative device.

40. In an independent unit section for a repeater: an originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause actuation of an extraneous lock controlling mechanism; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned; and means involving said media for effecting actuation of said locking member upon actuation of a lock controlling mechanism.

41. In an independent unit section for a repeater: an originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause abnormal conditioning of an extraneous retarded operative device upon abnormal positioning of any moving device of such cooperating sections; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned, said locking member so associated with said originating mechanism as to avoid abnormal positioning thereof when said moving device is abnormally positioned; and means involving said media for effecting restoration of said locking member only in response to such an extraneous retarded operative device.

42. In an independent unit section for a repeater: an originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause abnormal conditioning of an extraneous retarded operative device upon abnormal positioning of any moving device of such cooperating sections; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned, said locking member so associated with said originating mechanism as to avoid abnormal positioning thereof when said moving device is abnormally positioned; and means involving said media for effecting abnormal positioning of said locking member during abnormal conditioning of said retarded operative device and for effecting restoration of said locking member only in response to such an extraneous retarded operative device.

43. In an independent unit section for a repeater: on originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause actuation of an extraneous lock controlling mechanism upon abnormal positioning of any moving device of such cooperating sections; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned, said locking member so associated with said originating mechanism as to avoid abnormal positioning thereof when said moving device is abnormally positioned; and means involving said media for effecting actuation of said locking member upon actuation of a lock controlling mechanism when said moving device is normally positioned and for preventing actuation of said locking member in response to said lock controlling mechanism when said moving device is a final one of those of several associated sections returned to normal position.

44. In an independent unit section for a repeater: an originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause actuation of an extraneous lock controlling mechanism having a retarded operative device upon initial abnormal positioning of any moving device of such cooperating sections; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned, said locking member so associated with said originating mechanism as to avoid abnormal positioning thereof when said moving device is abnormally positioned; and means involving said media for effecting actuation of said locking member upon actuation of a lock controlling mechanism when said moving device is normally positioned and for preventing actuation of said locking member in response to said lock controlling mechanism when said moving device is a final one of those of several associated sections returned to normal position.

45. In an independent unit section for a repeater: an originating mechanism comprising a moving device movable from a normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source so as to be adapted to cause actuation of an extraneous lock controlling mechanism upon initial abnormal positioning of any moving device of such cooperating sections; repeating mechanism so associated with said media that it may be thereby rendered responsive to abnormal positionings of moving devices of such cooperating sections; a locking member movable from a normal to an abnormal position and so associated with said repeating mechanism as to render such response of said repeating mechanism effective only when said locking member is abnormally positioned, said locking member so associated with said originating mechanism as to avoid abnormal positioning thereof when said moving device is abnormally positioned; and means involving said media and arranged for effecting actuation of said locking member upon actuation of a lock controlling mechanism when said moving device is normally positioned, for control by the diverse positioning of busy moving devices of a plurality of such cooperating sections to effect actuation of the locking members of such cooperating sections whose moving devices are normally positioned while the moving device of some other of such cooperating sections is abnormally positioned, and for preventing actuation of said locking member in response to said lock controlling mechanism when said moving device is a final one of those of several associated sections returned to normal position.

46. In an independent unit section for a repeater: an originating mechanism; a locking mechanism; each of said mechanisms having an electromagnet and a moving device associated therewith movable from a normal to an abnormal position; and bus bars and conductors connecting said mechanisms, said bus bars arranged for association with corresponding bus bars of other like sections, when mounted in intended relation thereto, so as to provide an operatively continuous current path from section to section such that whenever the moving device associated with any originating mechanism moves from normal to abnormal position, current paths will be abnormally conditioned through the electromagnets associated with locking mechanisms whose moving devices are not already abnormally positioned and which locking mechanisms are associated with originating mechanisms the moving devices of which are not then abnormally positioned.

47. In an independent unit section for a repeater; an originating relay, a locking relay, a repeating relay, a restoring relay, a suitable plurality of bus bars adapted for cooperation with corresponding bus bars of like sections when mounted in intended relation thereto, and conductors suitably connecting said relays and said bus bars.

48. In an independent unit section for a repeater; an originating relay, a locking relay, a plurality of bus bars adapted for cooperation with corresponding bus bars of like sections when mounted in intended relation thereto so as to provide suitable current paths for electromagnetically controlling a retarded operative device for causing response thereof to originating relays of such sections, and conductors suitably connecting said relays and said bus bars so that the control of such a retarded operative device by said originating relay will be subject to the positioning of said locking relay.

49. In an independent unit section for a repeater; an originating relay, a locking relay, bus bars adapted for establishing connections with corresponding bus bars of like sections when mounted in intended relation thereto so as to provide suitable operatively continuous current paths from section to section for electromagnetically controlling a retarded operative device in common by a plurality of such sections in response to the originating relays and subject to the positioning of the respective locking relays thereof, a restoring relay for suspending such controlling relation of said originating relay, and conductors connecting said restoring relay and said locking relay so that the condition of said restoring relay will be changed from normal to abnormal only immediately following abnormal conditioning of said originating relay and so that the condition of said restoring relay will not be changed from abnormal to normal while either said originating relay or said locking relay is abnormally conditioned.

50. In an independent unit section for a repeater; an originating relay, a locking relay, a repeating relay, and conductors so arranged is to facilitate establishing connections with a retarded operative device and with corresponding conductors of like sections when mounted in intended relation thereto so as to be operatively continuous from section to section.

51. In an independent unit section for a repeater; an originating relay, a locking relay, and conductors so arranged as to facilitate establishing connections with a retarded operative device and with corresponding conductors of like sections when mounted in intended relation thereto so as to be operatively continuous from section to section.

52. In an independent unit section for a repeater; an originating relay, a locking relay, a restoring relay, bus bars adapted for cooperation with corresponding bus bars of like sections when mounted in intended relation thereto so as to be operatively continuous from section to section, and conductors suitably connecting said relays and said bus bars.

53. In an independent unit section for a repeater; a suitably controlled moving device, a restoring device, and media for establishing connections with a source of energy and with corresponding media of like sections when mounted in intended relation thereto so as to be operatively continuous from section to section and to cause suitable relative functioning of said devices.

54. In an independent unit section for a repeater; an originating relay, a locking relay, a repeating relay, and media for establishing connections with an electromagnetically controlled retarded operative device and with corresponding media of like sections when mounted in intended relation thereto so as to be operatively continuous from section to section, said media comprising means adapted to abnormally condition repeating relays of such sections whenever any originating relay is abnormally conditioned.

55. In an independent unit section for a repeater; an originating relay; a locking relay; a restoring relay; bus bars arranged for association with corresponding bus bars of other like sections, when mounted in intended relation thereto, in such manner as to provide media of operative interconnection between sections whose bus bars are so associated; and conductors interconnecting said relays and said bus bars in such manner as to provide current paths whereby governing of a retarded operative device may be effected by the originating relays of sections whose bus bars are so associated subject to the conditioning of their respective locking relays and for the control of the locking relays of such sections by such a device, and whereby the condition of current paths arranged for governing said restoring relays may be changed from normal to abnormal only when said originating relay is abnormally conditioned and from abnormal to normal only when neither said originating nor said locking relay is abnormally positioned.

56. In a repeater: a plurality of originating mechanisms each comprising an electromagnet and circuit controlling means responsive thereto; comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during abnormal positioning of said member; locking mechanism; lock controlling mechanism comprising an electromagnetically controlled retarded operative device having a circuit controller quickly moved from normal to abnormal position thereof upon change of its controlling magnet from normal to abnormal condition and restored to normal position only after the expiration of a period longer than the longest interval between impulses of any signal during which period the condition of said controlling magnet is not changed from normal to abnormal; an independently operable electromagnetically controlled circuit restoring device for each originating mechanism; repeating mechanism for controlling signal responsive circuits; and a plurality of conductors so arranged as to provide interconnections between portions of the circuit controlling means of the individual ones of said originating mechanisms and portions of the circuit changing devices and circuit restoring devices associated respectively therewith, between portions of said circuit controlling means, collectively, and the electromagnet of said retarded operative device, and between the circuit controller of said retarded operative device and all of said locking mechanism electromagnets,—whereby current paths will be available for causing the electromagnetic condition of said retarded operative device to be changed from normal to abnormal upon each change from normal to abnormal condition of the circuit controlling means of any originating mechanism whose associated circuit changing and restoring devices are normally conditioned, for causing the condition of the locking mechanism electromagnets to be changed from normal to or maintained in abnormal condition only when said circuit controller is moved from normal position, and whereby current paths will be available for abnormally conditioning each locking mechanism electromagnet through the first named one of the current paths of the circuit changing device of such mechanism only when both the circuit controlling means and the restoring device associated with such magnets are either normally conditioned or are abnormally conditioned at a time when the movable member of another circuit changing device is normally positioned while the circuit controlling means associated therewith is abnormally conditioned.

57. In a repeater: a plurality of originating mechanisms each comprising an electromagnet and circuit controlling means responsive thereto; locking mechanism comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during the abnormal positioning of said member; lock controlling mechanism comprising an electromagnetically controlled retarded operative device having a circuit controller quickly moved from normal to abnormal position thereof upon change of its controlling magnet from normal to abnormal condition and restored to normal position only after the expiration of a period longer than the longest interval between impulses of any signal during which period the condition of said controlling magnet is not changed from normal to abnormal; an independently operable electromagnetically controlled circuit restoring device for each originating mechanism; repeating mechanism for controlling signal responsive circuits; and a plurality of conductors so arranged as to provide interconnections between portions of the circuit controlling means of the individual ones of said originating mechanisms and portions of the circuit changing devices and circuit restoring devices associated respectively therewith, between portions of said circuit controlling means, collectively, and the electromagnet of said retarded operative device, and between the circuit controller of said retarded operative device and all of said locking mechanism electromagnets,—whereby current paths will be available for causing the electromagnetic condition of said retarded operative device to be changed from normal to abnormal upon each change from normal to abnormal condition of the circuit controlling means of any originating mechanism, for causing the condition of the locking mechanism electromagnets to be changed from normal to or maintained in abnormal condition only when said circuit controller is moved from normal position, and whereby current paths will be available for abnormally conditioning each locking mechanism electromagnet through the first named one of the current paths of the circuit changing device of such mechanism only when both the circuit controlling means and the restoring device associated with such magnets are either normally conditioned or are abnormally conditioned at a time when the movable member of another circuit changing device is normally positioned while the circuit controlling means associated therewith is abnormally conditioned.

58. In a repeater: a plurality of originating mechanisms each comprising an electromagnet and circuit controlling means responsive thereto; locking mechanism comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during abnormal positioning of said member; lock controlling mechanism comprising an electromagnetically controlled retarded operative device having a circuit controller quickly moved from normal to abnormal position thereof upon change of its controlling magnet from normal to abnormal condition and restored to normal position only after the expiration of a period longer than the longest interval between impulses of any signal during which period the condition of said controlling magnet is not changed from normal to abnormal; repeating mechanism for controlling signal responsive circuits; and a plurality of conductors so arranged as to provide interconnections between portions of the circuit controlling means of the individual ones of said originating mechanisms and portions of the circuit changing devices associated respectively therewith, between portions of said circuit controlling means, collectively, and the electromagnet of said retarded operative device, and between the circuit controller of said retarded operative device and all of said locking mechanism electromagnets,—whereby current paths will be available for causing the electromagnetic condition of said retarded operative device to be changed from normal to abnormal upon each change from normal to abnormal condition of the circuit controlling means of any originating mechanism, whose associated circuit changing device is normally conditioned, for causing the condition of the locking mechanism electromagnets to be changed from normal to or maintained in abnormal condition only when said circuit controller is moved from normal position, and whereby current paths will be available for abnormally conditioning each locking mechanism electromagnet through the first named one of the current paths of the circuit changing device of such mechanism only at a time when the movable member of another circuit changing device is normally positioned while the circuit controlling means associated therewith is abnormally conditioned.

59. In a repeater: a plurality of originating mechanisms each comprising an electromagnet and circuit controlling means responsive thereto; locking mechanism for all originating mechanisms comprising an independently operable electromagnetically controlled circuit changing device for each originating mechanism; lock controlling mechanism comprising an electromagnetically controlled retarded operative device having a circuit controller quickly moved from normal to abnormal position thereof upon change of its controlling magnet from normal to abnormal condition and restored to normal position only after the expiration of a period longer than the longest interval between impulses of any signal during which period the condition of said controlling magnet is not changed from normal to abnormal; an independently operable circuit restoring device for each originating mechanism, each comprising an electromagnet and an armature therefor movable from a normal to an abnormal position; repeating mechanism for the current paths of all originating mechanism magnets comprising concurrently operable electromagnetically controlled contactors and electromagnetically controlled mechanism for controlling a plurality of current paths so that the condition of one of said paths will be altered for a substantially uniform period whenever the electromagnetic condition of said mechanism is changed from normal to abnormal, and so that a second one of said paths will be altered for a period starting subsequent to the commencement and ended prior to the completion of the period of each alteration of such one of said paths; and a plurality of conductors so arranged as to provide interconnections between portions of the circuit controlling means of the individual ones of said originating mechanisms and portions of the circuit changing devices and circuit restoring devices associated respectively therewith, between portions of said circuit controlling means, collectively, and the electromagnets of said retarded operative device and said repeating mechanism, between the circuit controller of said retarded operative device and all of said locking mechanism electromagnets, between the contactors respectively associated with each originating magnet and the first named one of said current paths controlled by said repeating mechanism, between the electromagnet of each restoring device and the second named one of said current paths controlled by said repeating mechanism, between said restoring device and portions of the circuit changing devices and of the circuit controlling means associated therewith, and between the electromagnet of each originating mechanism and the contactors respectively associated therewith,—whereby current paths will be available for causing abnormal conditioning of said contactors in response to abnormal conditioning of the first named one of said current paths controlled by said repeating mechanism, for causing the conditioning of individual ones of said restoring device electromagnets to be changed from normal to abnormal only when the originating mechanism circuit controlling means associated therewith is abnormally conditioned and said second named current path controlled by said repeating mechanism is abnormally conditioned, for maintaining abnormal conditioning of individual ones of said restoring device electromagnets when the armature associated therewith is abnormally positioned and either the circuit changing device or the circuit controlling means associated therewith is abnormally conditioned, and for causing the condition of each originating magnet to be changed from normal to abnormal by the contactors respectively associated therewith only when its associated restoring device is normally conditioned and its associated circuit changing device is abnormally conditioned.

60. In a repeater: a plurality of originating mechanisms each comprising an electromagnet and circuit controlling means responsive thereto; locking mechanism comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during abnormal positioning of said member; lock controlling mechanism comprising an electromagnetically controlled retarded operative device having a circuit controller quickly moved from normal to abnormal position thereof upon change of its controlling magnet from normal to abnormal condition and restored to normal position only after the expiration of a period longer than the longest interval between impulses of any signal during which period the condition of said controlling magnet is not changed from normal to abnormal; an independently operable circuit restoring device for each originating mechanism, each comprising an electromagnet and an armature therefor movable from a normal to an abnormal position; repeating mechanism for the current paths of all originating mechanism magnets comprising concurrently operable electromagnetically controlled contactors and electromagnetically controlled mechanism for controlling a plurality of current paths so that the condition of one of said paths will be altered for a substantially uniform period whenever the electromagnetic condition of said mechanism is changed from normal to abnormal, and so that a second one of said paths will be altered for a period starting subsequent to the commencement and ending prior to the completion of the period of each alteration of such first named one of said paths; and a plurality of conductors so arranged as to provide interconnections between portions of the circuit controlling means of the individual ones of said originating mechanisms and portions of the circuit changing devices and circuit restoring devices associated respectively therewith, between portions of said circuit controlling means, collectively, and the electromagnets of said retarded operative device and said repeating mechanism, between the circuit controller of said retarded operative device and all of said locking mechanism electromagnets, between the contactors respectively associated with each originating magnet and the first named one of said current paths controlled by said repeating mechanism, between the electromagnet of each restoring device and the second named one of said current paths controlled by said repeating mechanism, between said restoring device and portions of the circuit changing devices and of the circuit controlling means associated therewith, and between the electromagnet of each originating mechanism and the contactors respectively associated therewith,—whereby current paths will be available for causing the electromagnetic condition of said retarded operative device to be changed from normal to abnormal upon each change from normal to abnormal condition of the circuit controlling means of any originating mechanism whose associated circuit changing and restoring devices are normally conditioned, for causing the conditioning of the locking mechanism electromagnets to be changed from normal to or maintained in abnormal condition only when said circuit controller is moved from normal position, whereby current paths will be available for abnormally conditioning each locking mechanism electromagnet through the first named one of the current paths of the circuit changing device of such mechanism only when both the circuit controlling means and the restoring device associated with said magnets are either normally conditioned or are abnormally conditioned at a time when the movable member of another circuit changing device is normally positioned while the circuit controlling means associated therewith is abnormally conditioned, for causing abnormal conditioning of said contactors in response to abnormal conditioning of the first named one of said current paths controlled by said repeating mechanism, for causing the conditioning of individual ones of said restoring device electromagnets to be changed from normal to abnormal only when the originating mechanism circuit controlling means associated therewith is abnormally conditioned and said second named current path controlled by said repeating mechanism is abnormally conditioned, for maintaining abnormal conditioning of individual ones of said restoring device electromagnets when the armature associated therewith is abnormally positioned and either the circuit changing device or the circuit controlling means associated therewith is abnormally conditioned, and for causing the condition of each originating magnet to be changed from normal to abnormal by the contactors respectively associated therewith only when its associated restoring device is normally conditioned and its associated circuit changing device is abnormally conditioned.

61. In a repeater: a plurality of originating mechanisms each comprising an electromagnet and circuit controlling means responsive thereto; locking mechanism comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during abnormal positioning of said member; an electromagnetically controlled combined retarded operative and repeating device for controlling a plurality of current paths so that the condition of one of said paths will be altered whenever the electromagnetic condition of said combined device is changed from normal to abnormal, and so that a second one of said paths will be altered upon an initial change of said electromagnetic condition from normal to abnormal and so that such alteration will thereafter continue until said electromagnetic condition has not been so changed for a period longer than the longest interval between the impulses of any signal; and a plurality of conductors so arranged as to provide interconnections between portions of the circuit controlling means of the individual ones of said originating mechanisms and portions of the circuit changing devices associated respectively therewith, between portions of said circuit controlling means, collectively, and the electromagnet of said combined device, and between the second named one of said combined-device-controlled current paths and all of said locking mechanism electromagnets,—whereby current paths will be available for causing the electromagnetic condition of said combined device to be changed from normal to abnormal upon each change from normal to abnormal condition of the circuit controlling means of an originating mechanism whose associated circuit changing device is normally conditioned, for causing the condition of the locking mechanism electromagnets to be changed from normal to or maintained in abnormal condition only when said second named combined-device-controlled current path is abnormally conditioned, and whereby current paths will be available for abnormally conditioning each locking mechanism electromagnet through the first named one of the current paths of the circuit changing device of such mechanism only when the circuit controlling means associated with such magnet is either normally conditioned or is abnormally conditioned at a time when the movable member of another circuit changing device is normally positioned while the circuit controlling means associated therewith is abnormally conditioned.

62. In a repeater: a plurality of originating mechanisms each comprising an electromagnet and circuit controlling means responsive thereto; locking mechanism for all originating mechanisms comprising an independently operable electromagnetically controlled circuit changing device for each originating mechanism; an independently operable circuit restoring device for each originating mechanism, each comprising an electromagnet and an armature therefor movable from a normal to an abnormal position; repeating mechanism for the current paths of all originating mechanism magnets comprising concurrently operable electromagnetically controlled contactors; an electromagnetically controlled combined-retarded operative and repeating device for controlling a plurality of current paths so that the condition of one of said paths will be altered for a substantially uniform period whenever the electromagnetic condition of said combined device is changed from normal to abnormal, so that a second one of said paths will be altered for a period starting subsequent to the commencement and ending prior to the completion of the period of each alteration of said first named path, and so that a third one of said paths will be altered upon an initial change of said electromagnetic condition from normal to abnormal and so that such alteration will thereafter continue until said electromagnetic condition has not been so changed for a period longer than the longest interval between the impulses of any signal; and a plurality of conductors so arranged as to provide interconnections between portions of the circuit controlling means of the individual ones of said originating mechanisms and portions of the circuit changing devices and circuit restoring devices associated respectively therewith, between portions of said circuit controlling means, collectively, and the electromagnet of said combined device, between the third named one of said combined-device-controlled current paths and all of said locking mechanism electromagnets, between the contactors respectively associated with each originating magnet and the first named one of said current paths controlled by said combined device, between the electromagnet of each restoring device and the second named one of said current paths controlled by said combined device, between said restoring device and portions of the circuit changing device and of the circuit controlling means associated therewith, and between the electromagnet of each originating mechanism and the contactors respectively associated therewith,—whereby current paths will be available for causing abnormal conditioning of said contactors upon abnormal conditioning of the first named one of said current paths controlled by said combined device, for causing the condition of individual ones of said restoring device electromagnets to be changed from normal to abnormal only when the originating mechanism circuit controlling means associated therewith is abnormally conditioned and said second named current path controlled by said combined device is abnormally conditioned, for maintaining abnormal conditioning of individual ones of said restoring device electromagnets when the armature associated therewith is abnormally positioned and either the circuit changing device or the circuit controlling means associated therewith is abnormally conditioned, and for causing the condition of each originating magnet to be changed from normal to abnormal by the contactors respectively associated therewith only when its associated restoring device is normally conditioned and its associated circuit changing device is abnormally conditioned.

63. In a repeater: a plurality of originating mechanisms each comprising an electromagnet and circuit controlling means responsive thereto; locking mechanism comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during abnormal positioning of said member; an independently operable circuit restoring device for each originating mechanism, each comprising an electromagnet and an armature therefor movable from a normal to an abnormal position; repeating mechanism for controlling signal responsive circuits comprising concurrently operable electromagnetically controlled contactors; an electromagnetically controlled combined retarded operative and repeating device for controlling a plurality of current paths so that the condition of one of said paths will be altered for a substantially uniform period whenever the electromagnetic condition of said combined device is changed from normal to abnormal, so that a second one of said paths will be altered for a period starting subsequent to the commencement and ending prior to the completion of the period of each alteration of said first named path, and so that a third one of said paths will be altered upon an initial change of said electromagnetic condition from normal to abnormal and so that such alteration will thereafter continue until said electromagnetic condition has not been so changed for a period longer than the longest interval between the impulses of any signal; and a plurality of conductors so arranged as to provide interconnections between portions of the circuit controlling means of the individual ones of said originating mechanisms and portions of the circuit changing devices and circuit restoring devices associated respectively therewith between portions of said circuit controlling means, collectively, and the electromagnet of said combined device, between the third named one of said combined-device controlled current paths and all of said locking mechanism electromagnets, between said contactors and the first named one of said current paths controlled by said combined device, between the electromagnet of each restoring device and the second named one of said current paths controlled by said combined device, and between said restoring device and portions of the circuit changing device and of the circuit controlling means associated therewith,—whereby current paths will be available for causing the electromagnetic condition of said combined device to be changed from normal to abnormal upon each change from normal to abnormal condition of the circuit controlling means of any originating mechanism whose associated circuit changing and restoring devices are normally conditioned, for causing the condition of the locking mechanism electromagnets to be changed from normal to or maintained in abnormal condition only when said third named one of said combined-device-controlled current paths is abnormally conditioned, and whereby current paths will be available for abnormally conditioning each locking mechanism electromagnet through the first named one of the current paths of the circuit changing device of such mechanism only when both the circuit controlling means and the restoring device associated with such magnets are either normally conditioned or are abnormally conditioned at a time when the movable member of another circuit changing device is normally positioned while the circuit controlling means associated therewith is abnormally conditioned, for causing abnormal conditioning of said contactors upon abnormal conditioning of the first named one of said current paths controlled by said combined device, for causing the condition of individual ones of said restoring device electromagnets to be changed from normal to abnormal only when the originating mechanism circuit controlling means associated therewith is abnormally conditioned and said second named current path controlled by said combined device is abnormally conditioned, and for maintaining abnormal conditioning of individual ones of said restoring device electromagnets when the armature associated therewith is abnormally positioned and either the circuit changing device or the circuit controlling means associated therewith is abnormally conditioned.

64. In a repeater: a plurality of originating mechanisms each comprising an electromagnet and circuit controlling means responsive thereto; locking mechanism comprising, for each originating mechanism, an electromagnet and a circuit changing device having a member movable in response to said magnet, said device arranged to subject said magnet to control through only one of two current paths while said member is normally positioned, to subject said magnet to control through both of said paths during movement of said member, and to subject said magnet to control only through the other of said paths during abnormal positioning of said member; an independently operable circuit restoring device for each originating mechanism, each comprising an electromagnet and an armature therefor movable from a normal to an abnormal position; repeating mechanism for the current paths of all originating mechanism magnets comprising concurrently operable electromagnetically controlled contactors; an electromagnetically controlled combined retarded operative and repeating device for controlling a plurality of current paths so that the condition of one of said paths will be altered for a substantially uniform period whenever the electromagnetic condition of said combined device is changed from normal to abnormal, so that a second one of said paths will be altered for a period starting subsequent to the commencement and ending prior to the completion of the period of each alteration of said first named path, and so that a third one of said paths will be altered upon an initial change of said electromagnetic condition from normal to abnormal and so that such alteration will thereafter continue until said electromagnetic condition has not been so changed for a period longer than the longest interval between the impulses of any signal; and a plurality of conductors so arranged as to provide interconnections between portions of the circuit controlling means of the individual ones of said originating mechanisms and portions of the circuit changing devices and circuit restoring devices associated respectively therewith, between portions of said circuit controlling means, collectively, and the electromagnet of said combined device, between the third named one of said combined-device-controlled current paths and all of said locking mechanism electromagnets, between the contactors respectively associated with each originating magnet and the first named one of said current paths controlled by said combined device, between the electromagnet of each restoring device and the second named one of said current paths controlled by said combined device, between said restoring device and portions of the circuit changing device and of the circuit controlling means associated therewith, and between the electromagnet of each originating mechanism and the contactors respectively associated therewith,—whereby current paths will be available for causing the electromagnetic condition of said combined device to be changed from normal to abnormal upon each change from normal to abnormal condition of the circuit controlling means of any originating mechanism whose associated circuit changing and restoring devices are normally conditioned, for causing the condition of the locking mechanism electromagnets to be changed from normal to or maintained in abnormal condition only when said third named one of said combined-device-controlled current paths is abnormally conditioned, and whereby current paths will be available for abnormally conditioning each locking mechanism electromagnet through the first named one of the current paths of the circuit changing device of such mechanism only when both of the circuit controlling means and the restoring device associated with such magnets are either normally conditioned or are abnormally conditioned at a time when the movable member of another circuit changing device is normally positioned while the circuit controlling means associated therewith is abnormally conditioned, for causing abnormal conditioning of said contactors upon abnormal conditioning of the first named one of said current paths controlled by said combined device, for causing the condition of individual ones of said restoring device electromagnets to be changed from normal to abnormal only when the originating mechanism circuit controlling means associated therewith is abnormally conditioned and said second named current path controlled by said combined device is abnormally conditioned, for maintaining abnormal conditioning of individual ones of said restoring device electromagnets when the armature associated therewith is abnormally positioned and either the circuit changing device or the circuit controlling means associated therewith is abnormally conditioned, and for causing the condition of each originating magnet to be changed from normal to abnormal by the contactors respectively associated therewith only when its associated restoring device is normally conditioned and its associated circuit changing device is abnormally conditioned.

65. In an independent unit section for a repeater: an originating mechanism comprising a moving device movable from normal to an abnormal position and involving means for controlling energy from a suitable source and means whereby said device may be rendered responsive to signal initiating mechanism; media arranged for association with corresponding media of other like sections, when mounted in intended relation thereto, so as to provide for joint control, by the controlling means of sections so associated, of energy from such a source; repeating mechanism so associated with said media that it may be thereby rendered responsive to abnormal positionings of moving devices of such cooperating sections; and a locking member movable from a normal to an abnormal position and so associated with said repeating mechanism as to render such response of said repeating mechanism effective only when said locking member is abnormally positioned.

66. In an independent unit section for a repeater: an originating relay; a locking relay; a restoring relay; bus bars arranged for association with corresponding bus bars of other like sections, when mounted in intended relation thereto, in such manner as to provide media of operative intercommunication between sections whose bus bars are so associated; and conductors interconnecting said relays and said bus bars in such manner as to provide current paths whereby governing of restore controlling mechanism may be effected by the originating relays of sections whose bus bars are so associated, subject to the conditioning of their respective locking relays, and whereby the conditioning of current paths arranged for governing said restoring relay may be changed from normal to abnormal only when said originating relay is abnormally positioned at a time when interconnection between certain of said bus bars are varied as by such restore controlling mechanism, and from abnormal to normal only when neither said originating nor said locking relay is abnormally positioned.

In witness whereof, I hereunto subscribe my name, this 26th day of February 1921.

CLARENCE E. BEACH.